United States Patent
Steiner, III et al.

(10) Patent No.: US 12,497,732 B2
(45) Date of Patent: Dec. 16, 2025

(54) POLYMER-AEROGEL/FIBER AND POLYMER-AEROGEL/TEXTILE COMPOSITES AND RELATED SYSTEMS AND METHODS

(71) Applicants: Aerogel Technologies, LLC, Hopkinton, MA (US); Lukla Inc., Portland, OR (US)

(72) Inventors: Stephen A. Steiner, III, Milwaukee, WI (US); Ryan T. Nelson, Fort Collins, CO (US); Moriah C. Buckwalter, South Weymouth, MA (US); Justin S. Griffin, Watertown, MA (US); Jeffrey Nash, Park City, UT (US)

(73) Assignees: Aerogel Technologies, LLC, Hopkinton, MA (US); Lukla Inc., Portland, OR (US)

( * ) Notice: Subject to any disclaimer, the term of this patent is extended or adjusted under 35 U.S.C. 154(b) by 532 days.

(21) Appl. No.: 17/768,115

(22) PCT Filed: Oct. 9, 2020

(86) PCT No.: PCT/US2020/055150
§ 371 (c)(1),
(2) Date: Apr. 11, 2022

(87) PCT Pub. No.: WO2021/072323
PCT Pub. Date: Apr. 15, 2021

(65) Prior Publication Data
US 2024/0295069 A1    Sep. 5, 2024

Related U.S. Application Data

(60) Provisional application No. 62/914,298, filed on Oct. 11, 2019, provisional application No. 62/914,354, filed on Oct. 11, 2019.

(51) Int. Cl.
*D06M 15/59* (2006.01)
*D04B 1/16* (2006.01)
(Continued)

(52) U.S. Cl.
CPC .............. *D06M 15/59* (2013.01); *D04B 1/16* (2013.01); *D04B 21/16* (2013.01); *D06B 3/02* (2013.01);
(Continued)

(58) Field of Classification Search
CPC .... D06M 15/59; D06M 11/79; D06M 15/564; D06M 23/16; D06M 2101/32;
(Continued)

(56) References Cited

U.S. PATENT DOCUMENTS 5,684,907 A * 11/1997 Sprehn .................... G02B 6/02
                                                            385/125
5,786,059 A *  7/1998 Frank ..................... D04H 1/435
                                                            442/364
(Continued)

FOREIGN PATENT DOCUMENTS

CN      107709424 A    2/2018
CN      108330561 A    7/2018
(Continued)

OTHER PUBLICATIONS

Office Action for CN Application No. 202080070390.3 dated Oct. 29, 2024.
(Continued)

*Primary Examiner* — Michael Zhang
(74) *Attorney, Agent, or Firm* — Wolf, Greenfield & Sacks, P.C.

(57) ABSTRACT

The present disclosure generally relates to polymer-aerogel/fiber composite materials, polymer-aerogel/textile composite materials, and systems and methods for producing them.
(Continued)

The gel material can comprise, in some embodiments, a network of polymer. The fiber and/or textile material can comprise at least one of any natural, synthetic, and/or mineral fiber. In some cases, certain combinations of materials, solvents, and/or processing steps may be synergistically employed so as to enable manufacture of materials suitable for use in apparel, soft goods, and other consumer applications which may benefit from the properties of a polymer-aerogel/fiber composite and/or the polymer-aerogel/textile composite.

15 Claims, 45 Drawing Sheets

(51) Int. Cl.
| | | |
|---|---|---|
| D04B 21/16 | (2006.01) | |
| D06B 3/02 | (2006.01) | |
| D06B 3/10 | (2006.01) | |
| D06M 11/79 | (2006.01) | |
| D06M 15/564 | (2006.01) | |
| D06M 23/16 | (2006.01) | |
| D06M 101/32 | (2006.01) | |
| D06M 101/34 | (2006.01) | |
| D06N 3/00 | (2006.01) | |
| D06N 3/12 | (2006.01) | |
| D06N 3/14 | (2006.01) | |

(52) U.S. Cl.
CPC ............ *D06B 3/10* (2013.01); *D06M 11/79* (2013.01); *D06M 15/564* (2013.01); *D06M 23/16* (2013.01); *D06N 3/0006* (2013.01); *D06N 3/0009* (2013.01); *D06N 3/0011* (2013.01); *D06N 3/0043* (2013.01); *D06N 3/0088* (2013.01); *D06N 3/12* (2013.01); *D06N 3/125* (2013.01); *D06N 3/147* (2013.01); *D06M 2101/32* (2013.01); *D06M 2101/34* (2013.01); *D06M 2200/30* (2013.01); *D06N 2201/02* (2013.01); *D06N 2201/0263* (2013.01); *D06N 2201/042* (2013.01); *D06N 2205/04* (2013.01); *D06N 2209/065* (2013.01); *D06N 2209/067* (2013.01); *D06N 2209/14* (2013.01)

(58) Field of Classification Search
CPC D06M 2101/34; D06M 2200/30; D04B 1/16; D04B 21/16; D06B 3/02; D06B 3/10; D06N 3/0006; D06N 3/0009; D06N 3/0011; D06N 3/0043; D06N 3/0088; D06N 3/12; D06N 3/125; D06N 3/147

See application file for complete search history.

(56) References Cited

U.S. PATENT DOCUMENTS

| | | |
|---|---|---|
| 6,905,031 B1 | 6/2005 | Miller et al. |
| 7,071,287 B2 | 7/2006 | Rhine et al. |
| 7,078,359 B2 | 7/2006 | Stepanian et al. |
| 7,780,890 B2 | 8/2010 | Lee et al. |
| 8,974,903 B2 | 3/2015 | Meador et al. |
| 9,309,369 B1 | 4/2016 | Meador |
| 9,434,832 B1 | 9/2016 | Meador |
| 9,512,287 B2 | 12/2016 | Rhine et al. |
| 9,593,206 B2 | 3/2017 | White et al. |
| 10,358,539 B1 | 7/2019 | Meador |
| 10,563,035 B2 | 2/2020 | Steiner, III et al. |
| 10,836,880 B2 | 11/2020 | Yang et al. |
| 2004/0132845 A1 | 7/2004 | Rhine et al. |
| 2005/0131163 A1* | 6/2005 | Rhine ............... C08G 73/1028 423/439 |
| 2006/0246806 A1 | 11/2006 | Rhine et al. |
| 2007/0259979 A1 | 11/2007 | Lee |
| 2014/0134907 A1 | 5/2014 | Kissell et al. |
| 2014/0166572 A1 | 6/2014 | Snyder |
| 2014/0287641 A1 | 9/2014 | Steiner, III |
| 2016/0380244 A1 | 12/2016 | Evans et al. |
| 2020/0071481 A1* | 3/2020 | Yang ..................... C08J 5/043 |

FOREIGN PATENT DOCUMENTS

| | | |
|---|---|---|
| CN | 110114390 A | 8/2019 |
| EP | 3 201 133 A2 | 8/2017 |
| WO | WO 2006/024010 A2 | 3/2006 |
| WO | WO 2016/054524 A2 | 4/2016 |
| WO | WO 2018/078512 A1 | 5/2018 |
| WO | WO 2018/200827 A1 | 11/2018 |
| WO | WO 2021/072234 A1 | 4/2021 |

OTHER PUBLICATIONS

Office Action for CN Application No. 202080070390.3 dated Mar. 15, 2023.
Office Action for CN Application No. 20280070390.3 dated Jan. 24, 2024.
Office Action for CN Application No. 20280070390.3 dated Jun. 8, 2024.
Extended European Search Report for EP Application No. 20874493.8 dated Mar. 19, 2024.
International Search Report and Written Opinion for International Application No. PCT/US2020/055150 mailed Jan. 29, 2021.
International Preliminary Report on Patentability (Chapter 1) for International Application No. PCT/US2020/055150 mailed Apr. 21, 2022.
Liu et al., Formation mechanisms and morphological effects on multi-properties of carbon nanotube fibers and their polyimide aerogel-coated composites. Compos Sci Technol. Sep. 29, 2015;117:114-20.
Zhang et al., Multifunctional, marvelous polyimide aerogels as highly efficient and recyclable sorbents. RSC Adv. Jan. 15, 2015;5(17):12592-6.
Office Action for CA Application No. 3,156,273 dated Oct. 9, 2025.

* cited by examiner

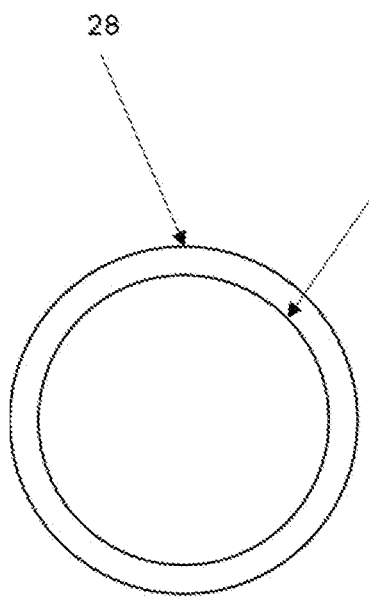
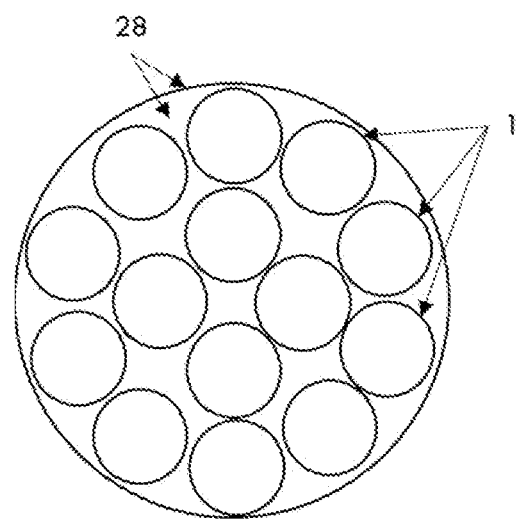
FIG. 15A
FIG. 15B
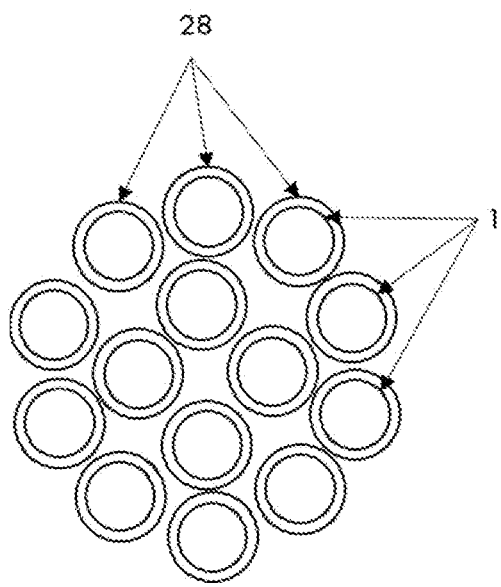
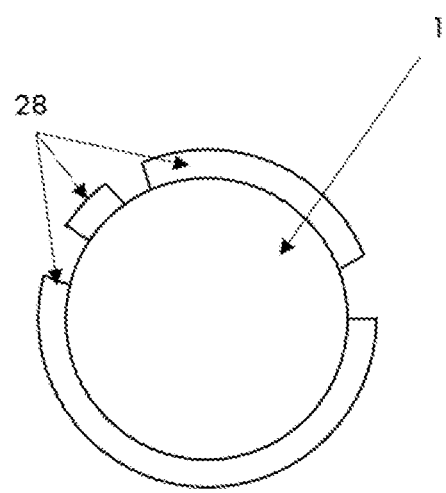
FIG. 15C
FIG. 15D

POLYMER-AEROGEL/FIBER AND POLYMER-AEROGEL/TEXTILE COMPOSITES AND RELATED SYSTEMS AND METHODS

RELATED APPLICATIONS

This application is a national stage filing under 35 U.S.C. § 371 of International Application No. PCT/US2020/055150, filed Oct. 9, 2020, and entitled "Polymer-Aerogel/Fiber and Polymer-Aerogel/Textile Composites, and Related Systems and Methods", which claims priority under 35 U.S.C. § 119(e) to U.S. Provisional Patent Application No. 62/914,298, filed Oct. 11, 2019, and entitled "Polymer-Aerogel/Fiber and Polymer-Aerogel/Textile Composites, and Related Systems and Methods," and to U.S. Provisional Patent Application No. 62/914,354, filed Oct. 11, 2019, and entitled "Insulative Polyimide-Aerogel/Fiber Composites for Apparel and Methods of Production," each of which is incorporated herein by reference in its entirety for all purposes.

TECHNICAL FIELD

Aspects described herein relate to polymer-aerogel/fiber and polymer-aerogel/textile composites and methods of their production.

SUMMARY

The present disclosure relates to composites of polymer aerogels and fibers, and polymer aerogels and textiles, and methods for producing such composites. The aerogel materials can provide, in accordance with certain embodiments, insulative properties. The subject matter of the present invention involves, in some cases, interrelated products, alternative solutions to a particular problem, and/or a plurality of different uses of one or more systems and/or articles.

It has been appreciated that combining polymer aerogel materials with fibers or textiles, such as those used in apparel articles, can yield composite fibers or textiles with improved properties that are not achievable by the polymer aerogel, fiber, or textile alone. In some cases, the resulting composite exhibits materials properties desirable for use in applications including, but not limited to, apparel, footwear, soft goods, aviation interiors, automotive, aerospace, construction, and architecture.

In some embodiments, a polymer-aerogel/fiber composite may be prepared wherein the fiber is single-stranded. In certain embodiments, a polymer-aerogel/fiber composite may comprise a single-stranded fiber, and a circumferential volume surrounding the exterior surface of the single-stranded fiber may contain polymer aerogel.

In some embodiments, a polymer-aerogel/fiber composite may be prepared wherein the fiber is multi-stranded. In certain embodiments, in the composite, some or all of the interstitial spaces between the strands that make up the fiber and/or some or all of the circumferential volume surrounding the exterior cross-sectional envelope of the fiber may contain polymer aerogel.

In some embodiments, a polymer-aerogel/textile composite is prepared wherein the textile is a knit textile. In some other embodiments, a polymer-aerogel/textile composite is prepared wherein the textile is a woven textile. In still further embodiments, a polymer-aerogel/textile composite is prepared wherein the textile is a nonwoven textile. In certain embodiments, in the composite, some or all of the interstitial spaces within the fibers that make up the textile and/or some or all of the spaces between the fibers that make up the textile may contain polymer aerogel.

In an illustrative embodiment, a composition is provided. The composition comprises a polymer-aerogel/fiber composite or a polymer-aerogel/textile composite in which the polymer aerogel comprises a polyimide. In certain preferred embodiments, the polyimide is derived from oxydianiline, dimethylbenzidine, bisaniline-m, and biphenyl dianhydride. In certain preferred embodiments, the fiber comprises a polyester, a polyamide, and/or cotton.

In some embodiments, a polymer-aerogel/fiber composite or polymer-aerogel/textile composite exhibits a lower thermal conductivity than the native fiber or textile alone, respectively. In some embodiments, the polymer-aerogel/fiber composite, a textile comprising the polymer-aerogel/fiber composite, or a textile comprising the polymer-aerogel/textile composite maintains a low thermal conductivity when subjected to a compressive load whereas the thermal conductivity of the native fiber, a textile comprising the native fiber alone, or a textile comprising the native textile alone, respectively, increases when subjected to the same compressive load. In some embodiments, the thermal conductivity of the polymer-aerogel/fiber composite, a textile comprising the polymer-aerogel/fiber composite, or a textile comprising polymer-aerogel/textile composite when in the presence of moisture or when wetted by liquid water is lower than that of the native fiber or a textile comprising native fiber alone, respectively, under the same conditions.

In certain embodiments, a composition is provided. The composition comprises, in certain embodiments, a polymer-aerogel/fiber composite or polymer-aerogel/textile composite with mechanical strength and flexibility suitable for incorporation into, and use in applications including, but not limited to, apparel, footwear, soft goods, aviation interiors, automotive, aerospace, construction, and architecture. In certain embodiments, the polymer-aerogel/fiber composite or polymer-aerogel/textile composite is highly hydrophobic and able to withstand normal consumer care laundering. In certain embodiments, the polymer-aerogel/fiber composite or polymer-aerogel/textile composite can be integrated into a textile using industry-standard manufacturing equipment.

In an illustrative embodiment, a textile incorporating the polymer-aerogel/fiber composite or the polymer-aerogel/textile composite allows water vapor and other gases to pass through the textile while liquid water transport through the textile is inhibited relative to a textile made from the native fiber alone or the native textile alone, respectively. In a further embodiment, a textile incorporating the polymer-aerogel/fiber composite or the polymer-aerogel/textile composite may inhibit flow of air passing through the textile relative to a textile made from the native fiber alone or the native textile alone, respectively. In some embodiments, textiles comprising a polymer-aerogel/fiber composite or polymer aerogel/textile composite may exhibit a lower thermal conductivity than a comparable textile made with the native fiber alone or the native textile alone, respectively. In some embodiments, textiles comprising a polymer-aerogel/fiber composite or polymer-aerogel/textile composite may be suitable for use in applications that require thermal insulating, wind protection, water protection, and vapor permeability functions, such as apparel, footwear, soft goods, aviation interiors, automotive, aerospace, construction, and architecture.

In some embodiments, a method for fabricating a polymer-aerogel/fiber or polymer-aerogel/textile composite is provided. In some embodiments, the fiber or textile is prepared to facilitate the incorporation of polymer aerogel onto and/or into the fiber or textile to produce a polymer-aerogel/fiber or polymer-aerogel/textile composite.

In some embodiments, a method for incorporating polymer aerogel precursor sol onto and/or into a fiber or textile is provided.

In accordance with certain embodiments, a method for incorporating a polymer-aerogel-precursor sol onto and/or into a fiber or textile and causing the sol to undergo gelation on and/or within the fiber or textile is provided.

In a further embodiment, a method for forming a polymer gel on and/or within a fiber or textile in which two components that separately will not form a gel are combined to produce a polymer gel on and/or within a fiber or textile is provided. In some embodiments, the amount of polymer-aerogel/fiber or polymer-aerogel/textile composite that can be produced in a single batch may be limited by the gel time of the polymer aerogel precursor. In some embodiments, a method for forming a polymer gel that employs mixing of two separate components that form the polymer gel within a specific amount of time is provided which may be amenable for production of large volumes of polymer-aerogel/fiber or polymer-aerogel/textile composite, for example, by enabling production of polymer-aerogel/fiber or polymer-aerogel/textile composite in a continuous process, such as, in a roll-to-roll fashion.

In certain embodiments, a polymer-gel/fiber composite or polymer-gel/textile composite may be submerged in a solvent bath to exchange the pore fluid composition within the polymer-gel with another pore fluid.

In some embodiments a polymer-gel/fiber composite or polymer-gel/textile composite may be further processed to make a polymer-aerogel/fiber composite or polymer-aerogel/textile composite. In some embodiments, a process for making a polymer-aerogel/fiber or polymer-aerogel/textile composite via a supercritical extraction method is provided. In some further embodiments, a process for making a polymer-aerogel/fiber composite or polymer-aerogel/textile composite at atmospheric pressure is provided. In certain embodiments, this process may be performed in a continuous process such as in a roll-to-roll fashion.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 15A depicts a cross-sectional area of a single-stranded fiber wherein the liquid solution comprising a polymer-aerogel-precursor has formed a continuous polymer gel on and/or within the fiber after a period of time, forming a polymer-gel/fiber composite in accordance with some embodiments.

FIG. 15B depicts a cross-sectional area of a multi-stranded fiber wherein the liquid solution comprising a polymer-aerogel-precursor has formed a polymer gel on and/or within the space between the strands of the fiber after a period of time, forming a polymer-gel/fiber composite in accordance with some embodiments.

FIG. 15C depicts a cross-sectional area of a multi-stranded fiber wherein the liquid solution comprising a polymer-aerogel-precursor has formed a conformal coating of polymer gel that surrounds each of the strands of the fiber, forming a polymer-gel/fiber composite in accordance with some embodiments.

FIG. 15D depicts a cross-sectional area of a single-stranded fiber wherein the liquid solution comprising a polymer-aerogel-precursor has formed a discontinuous polymer gel on and/or within the fiber after a period of time, forming a polymer-gel/fiber composite in accordance with some embodiments.

DETAILED DESCRIPTION

Figure 25A:
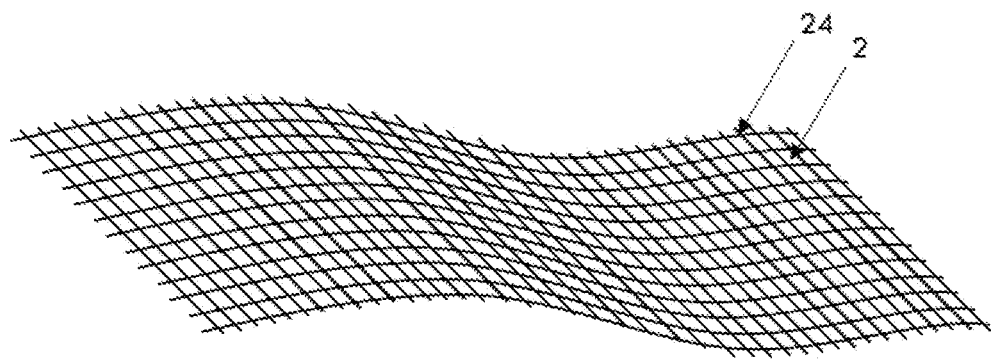
FIG. 25A depicts an example of a polymer-aerogel/textile composite, comprising: a textile; and polymer aerogel material that may be found infiltrating a space between the fibers of the textile and/or infiltrating pores within the fibers that make up the textile, in accordance with some embodiments.

The present disclosure relates generally to composites of polymer aerogel and fibers and composites of polymer aerogel and textiles and methods for producing such composites. Certain embodiments of the present invention pertain to a set of compositions of matter comprising polymer-based aerogel materials composited with traditional textile fibers or textiles, and methods for making said composites. As provided herein, such composites are referred to generally as polymer-aerogel/fiber composites or polymer-aerogel/textile composites, respectively. For the purposes of this disclosure, the terms "polymer-aerogel/fiber composite", "composite fiber", and "fiber composite", are used interchangeably throughout the specification and claims. For the purposes of this disclosure, the terms "polymer-aerogel/ textile composite", "composite textile", and "textile composite" are used interchangeably throughout the specification and claims. In some embodiments, a polymer-aerogel/ fiber composite comprises a fiber and a polymer aerogel material over an external surface of the fiber. In certain embodiments, a polymer-aerogel/fiber composite comprises a fiber and a polymer aerogel material infiltrating pores within the fiber. In some embodiments, a polymer-aerogel/ fiber composite comprises a fiber and a polymer aerogel material that is both over an external surface of the fiber as well as infiltrating pores within the fiber. Those of ordinary skill in the art are familiar with fibers, which are elongated strands of material that can be arranged (e.g., knit, woven, etc.) into fabrics and other textiles. In some embodiments, the fiber is or comprises a single-stranded fiber (e.g., a monofilament fiber). For example, in FIG. 1a polymer-aerogel/fiber composite comprises a polymer aerogel (2) over an external surface of a fiber (1) that is single-stranded, shown in cross-sectional view. In some embodiments, the fiber is or comprises a multi-stranded fiber (e.g., a yarn, a thread, a spun fiber, etc.). For example, in FIG. 2A a polymer-aerogel/fiber composite comprises a polymer aerogel (2) over an external surface and infiltrating the pores of a fiber (1) comprising multiple strands, shown in a cross-sectional view. In another example, in FIG. 2B a polymer-aerogel/fiber composite comprises a polymer aerogel (2) that conformally coats the strands of multi-stranded fiber (1), shown in a cross-sectional view. In some embodiments, a polymer-aerogel/textile composite comprises a textile and a polymer aerogel material over an external surface of the textile. In certain embodiments, a polymer-aerogel/textile composite comprises a textile and a polymer aerogel material infiltrating pores within the textile. In some embodiments, a polymer-aerogel/textile composite comprises a textile and a polymer aerogel material that is both over an external surface of the textile as well as infiltrating pores within the textile. For example, in FIG. 25A a polymer-aerogel/textile composite comprises a polymer aerogel (2) infiltrating the pores of a textile (24). In another example, in FIG. 25B a polymer-aerogel/textile composite comprises a polymer aerogel (2) over an exterior surface of a textile (24). Those of ordinary skill in the art are familiar with textiles, which are manufactured from fibers into constructions such as a woven, knit or non-woven. In some embodiments, the textile comprises a woven textile. In some other embodiments, the textile comprises a knit textile. In some further embodiments, the textile comprises a nonwoven textile. For example, in FIG. 25C a textile composite (25) comprises a knit textile. In another example, in FIG. 25D a textile composite (25) comprises a woven textile. In another example, in FIG. 25E a textile composite (25) comprises a non-woven textile.

Those of ordinary skill in the art are familiar with woven, knit, and non-woven textiles. The term knit refers to a non-random structure held together mechanically with yarn by interlocking series of loops from one or more yarns or from a set of yarns. Types of knits may include, but are not limited to: flat knit, circular knit, warp knit, or engineered knit. Types of warp knits may include, but are not limited to: tricot, raschel, or lace. Types of circular single knits may include, but are not limited to: jersey, jacquard, terry cloth, velour, fleece, French terry, or piquet. Types of circular double knit may include, but are not limited to: interlock, rib, or jacquard. The term woven refers to a non-random structure held together mechanically by interlacing two yarns so they cross each other at right angles to produce a fabric with warp yarns running lengthwise and weft yarns run from side to side. Types of weaves may include, but are not limited to: plain, basket, twill, satin, dobby, jacquard, crepe, double-cloth, pile or combinations thereof. The term non-woven refers to a structure as being made up of fibers that do not have a woven or interlaced architecture. Types of non-wovens may include, but are not limited to: carded-web, spun-lace, spun-bond, melt-blown, needle-punch, fusible and felt.

As used herein, the term "textile" includes both a textile that has not yet been made into or otherwise incorporated into a garment as well as a textile that has already been made into or otherwise incorporated into a garment. In some embodiments, a textile may be processed to produce a polymer-aerogel/textile composite prior to being made a garment. In some embodiments, a textile may already comprise a garment when it is processed to produce a polymer-aerogel/textile.

As provided herein, polymer-aerogel/fiber composites and polymer-aerogel/textile composites are distinguished from fiber-reinforced aerogel composites such as blankets and boards found in industry, wherein, for example, a lofty batting is infiltrated with aerogel.

In some embodiments, the fiber comprises a multi-stranded fiber that comprises porosity between its constituent strands, i.e., is a porous multi-stranded fiber. Porosity of a multi-stranded fiber refers to spaces between the constituent strands of the fiber. In some embodiments, some or all of the porosity of a multi-stranded fiber may become occupied by aerogel when used in a polymer-aerogel/fiber composite. In some embodiments, the porosity of the fiber influences the amount of polymer aerogel that can be incorporated onto and/or into the fiber. In certain embodiments, the porosity of the fiber serves as a volume for uptake of polymer-aerogel precursor solution.

In certain embodiments, when the fiber is wound onto a spool, the spool of fiber comprises its own porosity due to interfiber porosity. Porosity of a spool of fiber refers to the spaces between the fibers wound onto the spool and the porosity of said fiber. In some embodiments, some or all of the porosity of a spool of fiber may become occupied by aerogel when that spool of fiber is made into a polymer-aerogel/fiber composite. In an illustrative embodiment, a porous spool of fiber comprising a porous multi-stranded fiber is prepared, and the porosity of the spool of fiber serves as a volume for uptake of polymer-aerogel-precursor solution.

For the purposes of this disclosure, the terms "polymer-aerogel precursor solution" and "liquid solution comprising polymer-aerogel-precursor" are used interchangeably throughout the specification and the claims.

In some embodiments the textile comprises a knit, woven, or nonwoven that comprises its own porosity. Porosity of a textile refers to the space between the fibers that make up textile as well as the porosity of the fibers that make up the textile. In certain embodiments, the porosity of the textile serves as a volume for uptake of polymer-aerogel precursor solution. In some embodiments, a fiber is selected for the base substrate of the polymer-aerogel/fiber composite. In some embodiments the fiber comprises a manufactured fiber such as, but not limited to, a synthetic fiber and/or a cellulosic fiber. In certain embodiments, the fiber comprises a synthetic fiber such as, but not limited to, polyester, polyamide, polyimide, acrylic, spandex and/or other commonly used fibers. In certain embodiments, the fiber comprises a cellulosic fiber such as, but not limited to, bamboo, acetate and/or rayon. In certain embodiments, the fiber comprises a natural fiber such as, but not limited to, cotton, wool, and/or silk. In some preferred embodiments, the fiber comprises a polyester, a polyamide, or cotton. In certain embodiments, the fiber comprises an industrial fiber such as, but not limited to, glass, carbon, para-aramid, or meta-aramid. In some embodiments, the fiber comprises a fire resistant fiber such as, but not limited to, fire resistant polyester. In some embodiments, the fiber comprises a self extinguishing fiber such as, but not limited to, cotton. For example, In FIG. 1, the fiber (1) in the composite fiber may comprise a polyester, a polyamide, a cotton, and/or other types of fibers. In some embodiments, the fiber comprises a blend of one or more fiber types. For example, In FIG. 2A, the multi-stranded fiber (1) in the composite fiber may comprise a blend of a polyester, a polyamide, a cotton, and/or other types of fibers. In some embodiments, the fiber comprises a bi-component or multi-component fiber, in which two or more synthetic fiber types are co-extruded in a single fiber.

In accordance with certain embodiments, many of the mechanical properties of the polymer aerogel such as strength, modulus, elasticity, and radius of curvature can be important for determining a suitable polymer aerogel for incorporation into a polymer-aerogel/fiber composite or polymer-aerogel/textile composite. In some embodiments, the aerogel has suitable mechanical properties that allow for the incorporation of the polymer-aerogel/fiber composite into, e.g., textiles and/or that allow for the use of the polymer-aerogel/fiber composite in target applications, e.g., apparel and soft goods. As a non-limiting example, if the aerogel is too weak and/or brittle, such as may be the case for a silica aerogel, much of the aerogel may easily abrade off of the fiber or textile relative to a polymer aerogel.

In an illustrative embodiment, a composition is provided. The composition includes, in some embodiments, a polymer-aerogel/fiber composite in which the polymer aerogel comprises polyimide. In certain embodiments this polyimide comprises polyimide backbones derived from oxydianiline, dimethylbenzidine, bisaniline-m, and biphenyl dianhydride. In some embodiments, a polymer-aerogel/fiber composite in which the polymer aerogel comprises polyimide has specific advantages over other compositions such as, but not limited to, suitable mechanical properties as described above, non-flammability, high temperature tolerance, low thermal conductivity, and hydrophobicity.

In an illustrative embodiment, a composition is provided. The composition includes a polymer-aerogel/fiber composite in which the polymer aerogel comprises polyurea. In certain embodiments this polyurea comprises polyurea backbones derived from the reaction of isocyanate with in-situ-formed amines. In some embodiments, a polymer-aerogel/fiber composite in which the polymer aerogel comprises polyurea has specific advantages relative to other compositions such as, but not limited to, suitable mechanical properties as described above, simplified chemistry, low cost, low thermal conductivity, and hydrophobicity.

In some embodiments, a textile is selected for the base substrate of the polymer-aerogel/textile composite. In some embodiments the textile comprises a manufactured fiber such as, but not limited to, a synthetic fiber and/or a cellulosic fiber. In certain embodiments, the textile comprises a synthetic fiber such as, but not limited to, polyester, polyamide, polyimide, acrylic, spandex and/or other commonly used fibers. In certain embodiments, the textile comprises a cellulosic fiber such as, but not limited to, bamboo, acetate and/or rayon. In certain embodiments, the textile comprises a natural fiber such as, but not limited to, cotton, wool, and/or silk. In some preferred embodiments, the textile comprises a polyester, a polyamide, and/or cotton. For example, In FIG. 25B, the textile (24) in the textile composite may comprise a polyester, a polyamide, a cotton, and/or other types of fibers. In some embodiments, the textile may comprise a blend of two or more fiber types. For example, In FIG. 25B, the textile (24) in the textile composite may comprise a blend of a polyester, a polyamide, a cotton, and/or other types of fibers. In certain embodiments, the textile comprises an industrial fiber such as, but not limited to, glass, carbon, para-aramid, or meta-aramid. In some embodiments, the textile comprises a fire resistant fiber such as, but not limited to, a fire-resistant polyester. In some embodiments, the textile comprises a self-extinguishing fiber such as, but not limited to, cotton. In some embodiments, the textile comprises a bi-component or multi-component fiber. In some embodiments, the textile comprises a blend of two or more of the aforementioned fiber compositions.

In an illustrative embodiment, a composition is provided. The composition includes, in accordance with certain embodiments, a polymer-aerogel/textile composite in which the polymer aerogel comprises polyimide. In certain embodiments this polyimide comprises polyimide backbones derived from oxydianiline, dimethylbenzidine, bisaniline-m, and biphenyl dianhydride.

In an illustrative embodiment, a composition is provided. The composition includes, according to certain embodiments, a polymer-aerogel textile composite in which the polymer aerogel comprises polyurea. In certain embodiments this polyurea comprises polyurea backbones derived from a reaction of isocyanate with in-situ-formed amines.

In some embodiments the aerogel in a polymer-aerogel/fiber composite or polymer-aerogel/textile composite is mechanically bound to the fiber or textile, for example, an aerogel that is geometrically intertwined with a fiber or textile. In certain embodiments, the aerogel in a polymer-aerogel/fiber composite or polymer-aerogel/textile composite is chemically bonded to the fiber or textile, for example, an aerogel that is covalently bonded to the fiber or textile. In some embodiments, the aerogel in a polymer-aerogel/fiber composite or polymer-aerogel/textile composite may be bound to the fiber or textile by a combination of chemical and mechanical attachment.

In some embodiments, the mass fraction of polymer-aerogel in the polymer-aerogel/fiber composite is greater than 1%, greater than 5%, greater than 10%, greater than 15%, greater than 20%, greater than 25%, greater than 30%, greater than 35%, or greater than 50%. For example, In FIG. 1, the polymer aerogel (2) may comprise a certain percentage of the total mass of the fiber composite shown. In some embodiments, the polymer aerogel in a polymer-aerogel/fiber composite comprises a polyimide. In some embodiments, the mass fraction of polyimide-aerogel in the polymer-aerogel/fiber composite is greater than 1%, greater than 5%, greater than 10%, greater than 15%, greater than 20%, greater than 25%, greater than 30%, greater than 35%, or greater than 50%. For example, In FIG. 1, the polymer aerogel (2) may comprise a polyimide, which may comprise a certain percentage of the total mass of the fiber composite shown. In some embodiments, the mass fraction of polymer-aerogel in the polymer-aerogel/textile composite is greater than 1%, greater than 5%, greater than 10%, greater than 15%, greater than 20%, greater than 25%, greater than 30%, greater than 35%, or greater than 50%. For example, in FIG. 25B, the polymer aerogel (2) may comprise a certain percentage of the total mass of the textile composite shown. Mass fraction of aerogel loaded onto the fiber or textile can be measured by comparing the mass of the native fiber or textile and the mass of the polymer-aerogel/fiber or polymer-aerogel/textile composite. In some embodiments, when the polymer-aerogel/fiber composite is formed into a mat, as defined herein, the volume fraction that is aerogel is less than 1%, less than 5%, less than 10%, less than 15%, or between 15%-100%. The volume fraction of aerogel in the mat is calculated by taking the known mass fraction of aerogel in the composite, multiplied by the density of the composite mat as measured under 0.31 psi (giving the effective aerogel density in the mat), and this amount is then divided by the known bulk density of the monolithic aerogel material.

Figure 3:
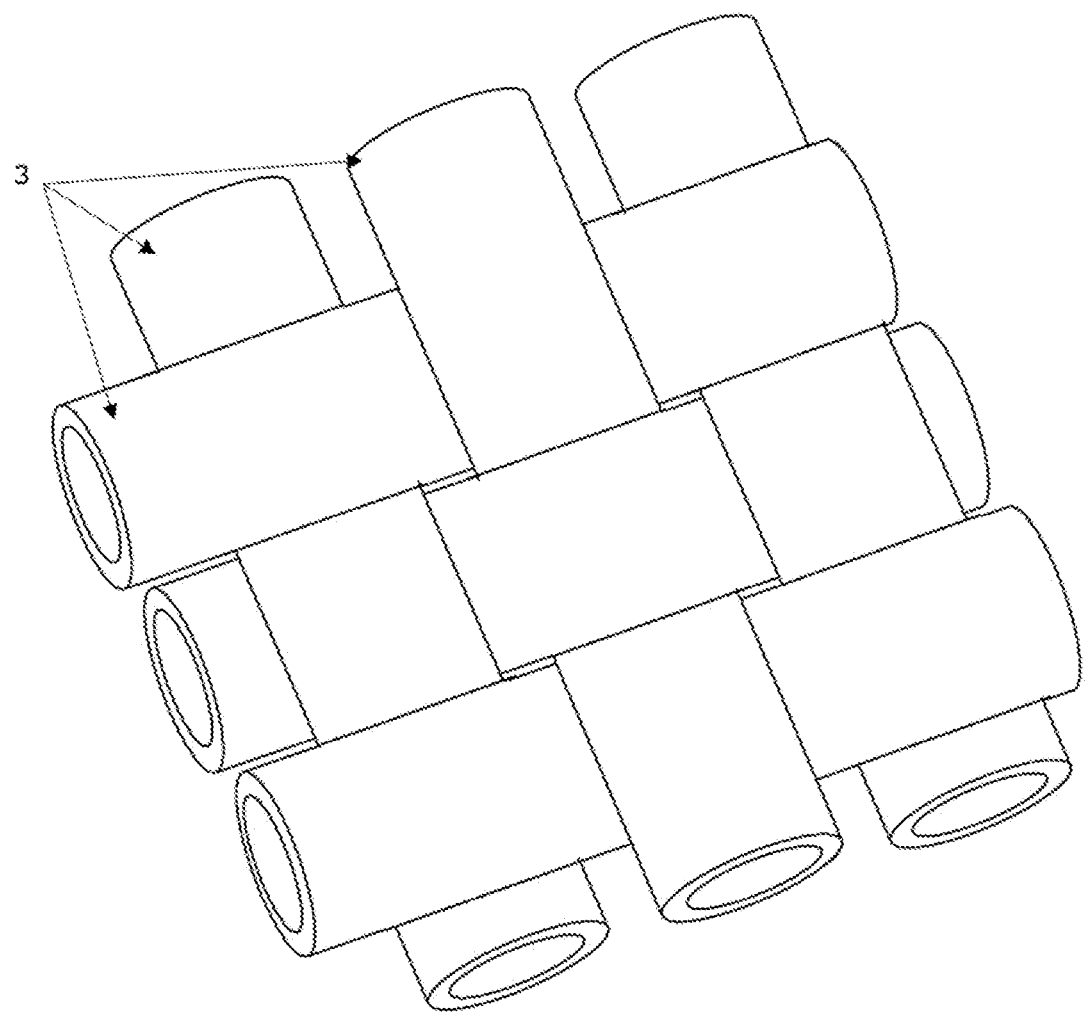
FIG. 3 depicts a material wherein the polymer-aerogel/fiber composite has been incorporated into a textile in accordance with some embodiments.
Figure 4:
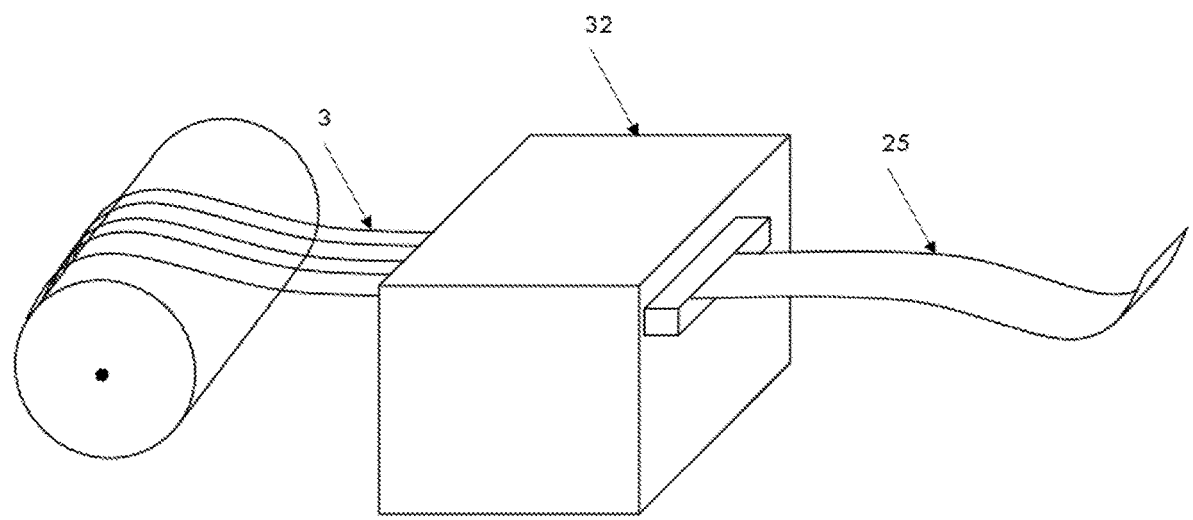
FIG. 4 depicts a standard industrial manufacturing process wherein the polymer-aerogel/fiber composite can be incorporated into a textile in accordance with some embodiments.

In some embodiments, the polymer-aerogel/fiber composite is incorporated into a textile. In some embodiments, polymer-aerogel/fiber composites may be woven, knit, or otherwise incorporated into a textile. This textile may comprise a woven structure, knit structure, a non-woven structure, or a combination thereof. In some embodiments, the composite fibers described herein make up at least 1 wt %, at least 5 wt %, at least 10 wt %, at least 25 wt %, at least 50 wt %, or at least 99% of a textile comprising composite fiber. In some embodiments, the composite fibers described herein make up 100% of a textile comprising composite fiber. In some embodiments, the composite fiber can be knit into a textile using standard commercial knitting equipment. For example, In FIG. 3, a polymer-aerogel/fiber composite (3) is incorporated into a textile. In another example, as shown in FIG. 4, a fiber composite (3) is knit into a textile comprising the fiber composite (31) using commercial knitting equipment (32). In some embodiments, the composite fiber may be knit using equipment such as, but not limited to, a single cylinder circular knitting machine.

In some embodiments a polymer-aerogel/fiber composite may exhibit any minimum radius of curvature suitable to be knit, woven, or otherwise incorporated into a textile. In some embodiments, the polymer-aerogel/fiber composite may exhibit a minimum radius of curvature of less than 0.1 mm, less than 0.25 mm, less than 0.5 mm, less than 1 mm, less than 5 mm or less than 1 cm.

In some embodiments, a polymer-aerogel/textile composite may exhibit any suitable minimum radius of curvature. In some embodiments, this radius of curvature may be suitable for incorporating the textile composite into apparel. In some preferred embodiments, the polymer-aerogel/fiber composite may exhibit a minimum radius of curvature of less than 0.1 mm, less than 0.25 mm, less than 0.5 mm, less than 1 mm, less than 5 mm or less than 1 cm.

In certain embodiments, a polymer-aerogel/fiber or polymer-aerogel/textile composite can exhibit mechanical strength and flexibility appropriate for incorporation into, and use in, for example, apparel applications. In some preferred embodiments, a polymer-aerogel/fiber or polymer-aerogel/textile composite is highly hydrophobic and able to withstand normal consumer care laundering following the procedure outlined in the AATCC LP1 standard for home laundering.

In certain embodiments, a polymer-aerogel/fiber composite may exhibit a suitable breaking force. Breaking force may be determined following the procedure outline in the ASTM D2256 Standard Test Method for Tensile Properties of Yarns by the Single-Strand Method or any other suitable standard. In some embodiments, the polymer-aerogel/fiber composite may exhibit a breaking force within 10%, 15%, 20%, 25%, 30%, 40%, 50%, 60%, 70%, 75%, 80%, 85%, 90%, 95%, 100%, 110%, 120%, 130%, 140%, or 150% of the breaking force of the native fiber.

Figure 5:
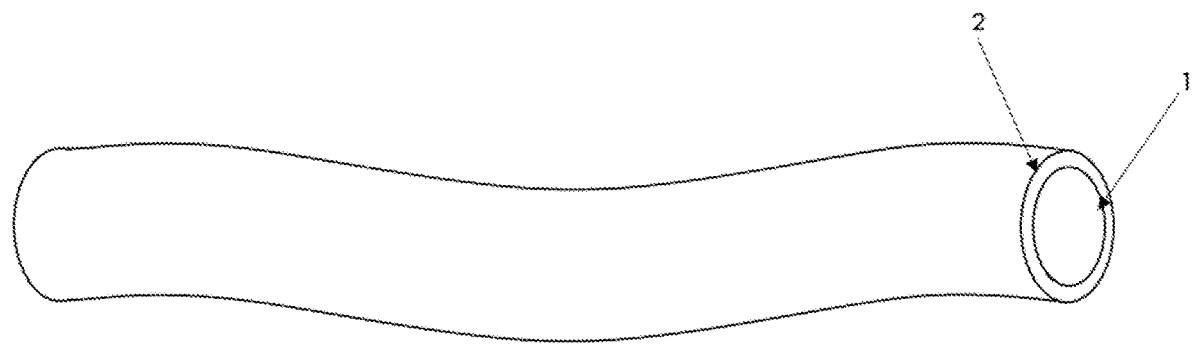
FIG. 5 depicts a polymer-aerogel/fiber composite wherein the polymer aerogel material is substantially continuous along a length of the fiber in accordance with some embodiments.
Figure 6A:
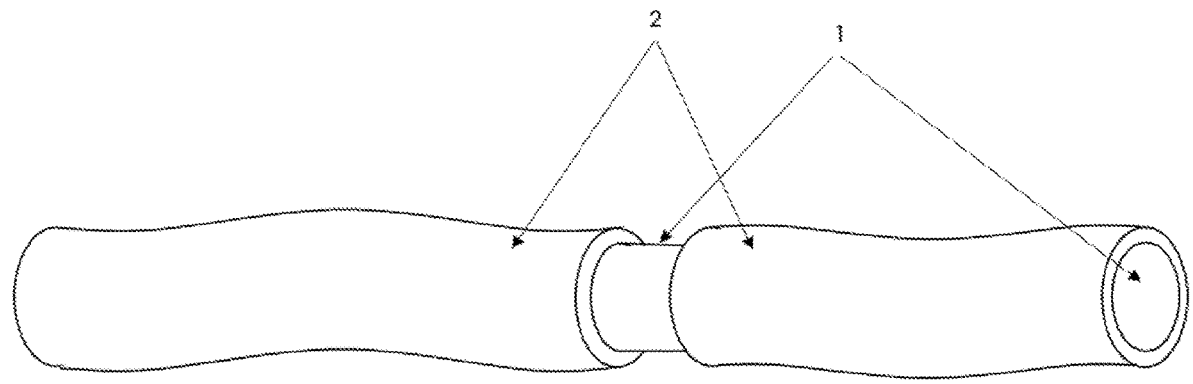
FIG. 6A depicts an example of a polymer-aerogel/fiber composite wherein the polymer aerogel material is discontinuous along a length of the fiber in accordance with some embodiments.
Figure 6B:
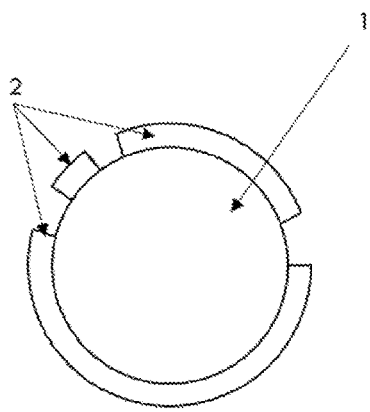
FIG. 6B depicts an example of a polymer-aerogel/fiber composite wherein the polymer aerogel material is discontinuous around a single stranded fiber, or around any given strand of a multi-stranded fiber, in any given cross-section of the composite in accordance with some embodiments.

In some embodiments, the distribution of polymer aerogel material on the fiber is substantially continuous along a length of the composite fiber. For example, In FIG. 5, the polymer aerogel (2) in the fiber composite is substantially continuous along a length of the fiber (1). In some embodiments, the aerogel may conformally coat some or all of the fiber and/or some or all of the strands of a multi-stranded fiber. In some embodiments, the polymer aerogel material is discontinuous along a length of the composite fiber. For example, in FIGS. 6A and 6B, the polymer aerogel (2) in the fiber composite is substantially discontinuous along a length of the fiber (1), as shown in a 3 dimensional and cross-sectional views, respectively. This is to say that along the length of the polymer-aerogel/fiber composite the amount of aerogel in any given cross-sectional area of the composite varies. In one example, aerogel is nearly uniformly distributed along the length of a fiber.

In some embodiments, the polymer aerogel in a polymer-aerogel/fiber composite comprises a polyimide. In some embodiments, the distribution of polyimide aerogel material on the fiber is substantially continuous along a length of the composite fiber. In some embodiments, the polyimide aerogel material is discontinuous along a length of the composite fiber.

In some embodiments, the distribution of polymer aerogel material on the textile is substantially continuous over the surface of any given cross-section of the composite textile. For example, in FIG. 26, the polymer aerogel (2) in the textile composite is substantially continuous over the surface of the textile (25). In some embodiments, the aerogel may conformally coat some or all of the fibers making up a textile and/or some or all of the strands of the multi-stranded fibers making up a textile. In some embodiments, the polymer aerogel material is substantially discontinuous over the surface of any given cross-section of the composite textile. For example, in FIG. 27A and FIG. 27B, the polymer aerogel (2) in the textile composite is substantially discontinuous over the surface of the textile (25), as shown in a cross-sectional view. This is to say that over the surface of any given cross-section of the composite textile the amount of aerogel varies.

In some embodiments, the polymer aerogel in a polymer-aerogel/textile composite comprises a polyimide. In some embodiments, the distribution of polyimide aerogel material on the textile is substantially continuous over the surface of any given cross-section of the composite textile. In some embodiments, the polyimide aerogel material is discontinuous over the surface of any given cross-section of the composite textile.

Figure 7A:
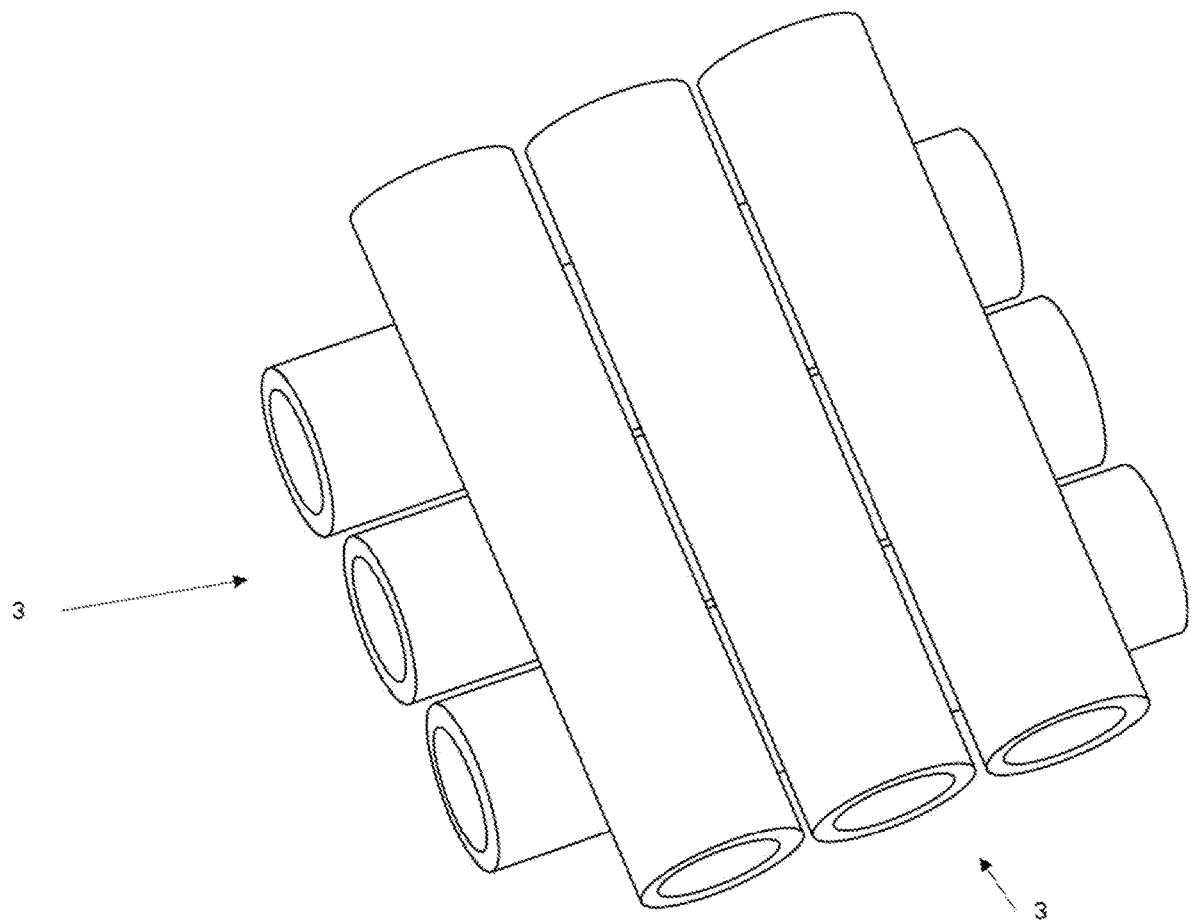
FIG. 7A depicts a section of a configuration of a two-layer mat comprising polymer-aerogel/fiber composite in accordance with some embodiments.

In some embodiments, thermal conductivity of a polymer-aerogel/fiber composite or native fiber is measured. In some embodiments, the polymer-aerogel/fiber composite or native fiber is prepared for this measurement by forming a mat. A mat is defined herein as being one or more layers or plies of oriented native fiber or polymer-aerogel/fiber composite. A mat may comprise a single-ply mat or a multi-ply mat. A single-ply mat comprises fibers that are oriented parallel to one another on a flat horizontal surface, and distributed uniformly across that surface orthogonal the fiber orientation such that there is contact between adjacent fibers, and a single-ply mat of uniform thickness is realized. A multi-ply mat comprises two or more of these single plies arranged on top of one another, the fibers in each ply being oriented orthogonal to the neighboring plies, such that a multi-ply mat of fiber is realized. For example, as shown in FIG. 7A a sample section of a mat is shown that comprises two plies of polymer-aerogel/fiber composite (3). In some embodiments, a textile comprising the polymer-aerogel/fiber composite or a native fiber can be prepared and the thermal conductivity of a single layer or multiple layers of the textile can be measured. In some embodiments, thermal conductivity of a polymer-aerogel/textile composite or native textile can be measured as a single layer or multiple layers. The thermal conductivity of a mat or textile may be measured by the methods described herein. The thermal conductivity of a mat or textile comprising a polymer-aerogel/fiber composite, can be compared to a comparably constructed mat or textile which comprises the native fiber alone, respectively. The thermal conductivity of a textile comprising a polymer-aerogel/textile composite can be compared to a comparably constructed textile comprising the native fiber alone.

Figure 7B:
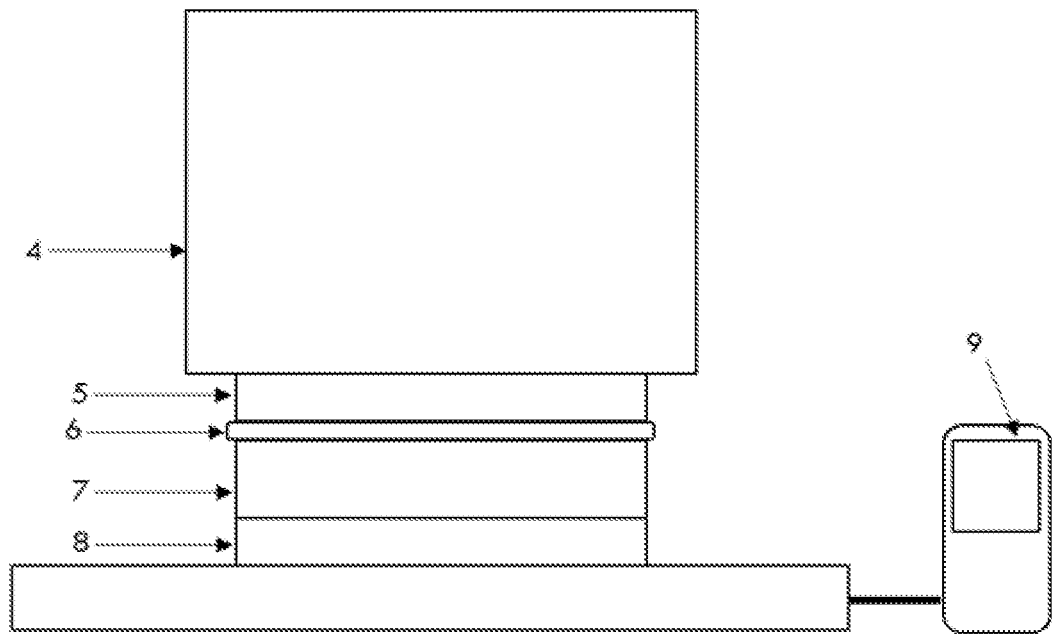
FIG. 7B depicts a method for measuring thermal conductivity in accordance with the Calibrated Hot Plate (CHP) method described herein, in accordance with some embodiments.
Figure 7C:
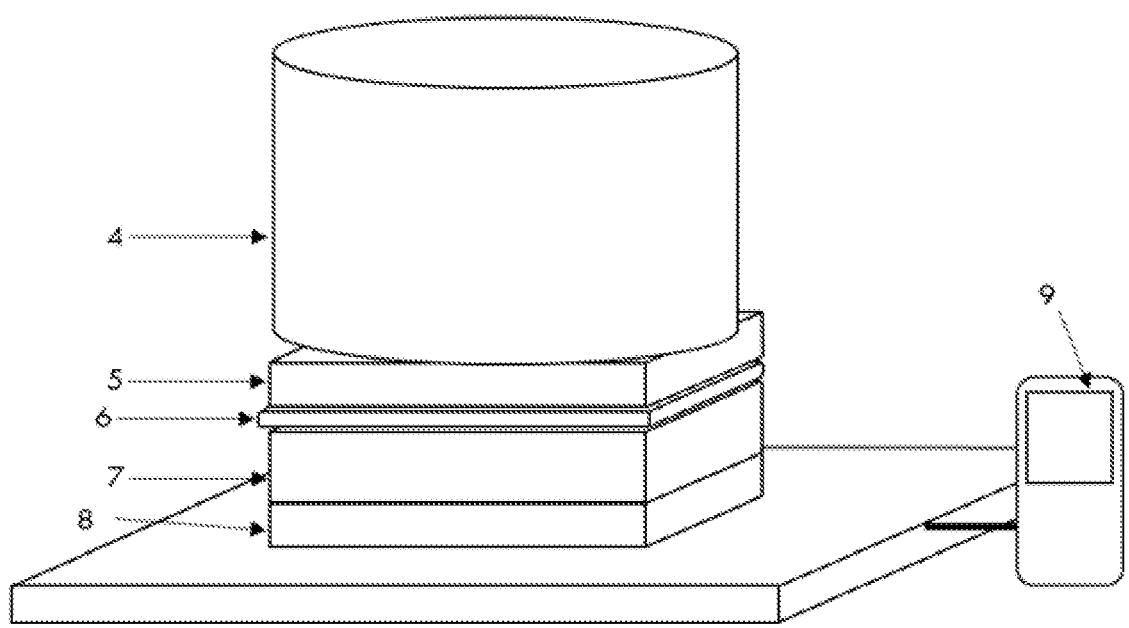
FIG. 7C depicts a 3-dimensional view of the method depicted in FIG. 7B.

In some embodiments, a polymer-aerogel/fiber composite exhibits a thermal conductivity of less than 80 mW/m-K or less than 40 mW/m-K when the composite is made into a mat as defined herein, and the thermal conductivity is measured by the Calibrated Hot Plate (CHP) method described herein, at an average sample temperature of 25° C. and an applied pressure of 0.31 psi. For example, as shown in FIG. 7A the fiber composite may be made into a mat. As shown in FIG. 7B and FIG. 7C the thermal conductivity a sample (6), in this case comprising the mat, may be measured to be less than 80 mW/m-K or less than 40 mW/m-K using the CHP method. In some embodiments the thermal conductivity of this mat may be measured to be less than 80 mW/m-K or less than 40 mW/m-K using the ASTM C518 method.

In some embodiments, a textile comprising the polymer-aerogel/fiber composite exhibits a thermal conductivity of less than 80 mW/m-K or less than 40 mW/m-K when measured by the Calibrated Hot Plate (CHP) method described herein, at an average sample temperature of 25° C. and an applied pressure of 0.31 psi. In some embodiments the thermal conductivity a textile comprising polymer-aerogel/fiber composite may be measured to be less than 80 mW/m-K or less than 40 mW/m-K using the ASTM C518 method.

In some embodiments, a polymer-aerogel/textile composite exhibits a thermal conductivity of less than 80 mW/m-K or less than 40 mW/m-K when the thermal conductivity is measured by the Calibrated Hot Plate (CHP) method described herein, at an average sample temperature of 25° C. and an applied pressure of 0.31 psi. For example, as shown in FIG. 7B and FIG. 7C the thermal conductivity of a sample (6), in this case a textile composite, may be measured to be less than 80 mW/m-K or less than 40 mW/m-K using the CHP method. In some embodiments the thermal conductivity of the textile composite may be measured to be less than 80 mW/m-K or less than 40 mW/m-K using the ASTM C518 method.

An exemplary method for measuring thermal conductivity is the Calibrated Hot Plate method as follows. Thermal conductivity may be measured using a calibrated hot plate (CHP) device. The CHP method is based on the principle underlying ASTM E 1225 "Standard Test Method for Thermal Conductivity of Solids by Means of the Guarded-Comparative-Longitudinal Heat Flow Technique". An apparatus in which an aerogel or other sample material (the mass, thickness, length, and width of which have been measured as explained in the procedure for measuring bulk density described herein) is placed in series with a standard reference material (e.g. NIST SRM 1453 EPS board) of precisely known thermal conductivity, density, and thickness, between a hot surface and a cold surface. The hot side of the system comprises an aluminum block (4"×4"×1") with three cartridge heaters embedded in it. The cartridge heaters are controlled by a temperature controller operating in on/off mode. The set-point feedback temperature for the controller is measured at the center of the top surface of the aluminum block (at the interface between the block and the sample material) by a type-K thermocouple (referred to as TC_H). A second identical thermocouple is placed directly beside this thermocouple (referred to as TC_1). The sample material is placed on top of the aluminum block, such that the thermocouples are near its center. A third identical thermocouple (TC_2) is placed directly above the others at the interface between the sample material and the reference material. The reference material is then placed on top of the sample material covering the thermocouple. A fourth identical thermocouple (TC_3) is placed on top of the reference material, in line with the other three thermocouples. Atop this stack of materials is placed a 6" diameter, flat-bottomed stainless-steel cup filled with ice water, such that the total weight of the cup including the ice and water is 5 lbs. This cup serves to provide an isothermal cold surface at its base.

Power is supplied to the heaters and regulated by the temperature controller such that the hot side of the system is kept at a constant temperature of approximately 37.5° C. After ensuring all components are properly in place, the system is turned on and allowed to reach a state of equilibrium. At that time, temperatures at TC_1. TC_2, and TC_3 are recorded. This recording is repeated every 15 minutes for at least one hour. From each set of temperature measurements (one set being the three temperatures measured at the same time), the unknown thermal conductivity can be calculated as follows. By assuming one-dimensional conduction (i.e., neglecting edge losses and conduction perpendicular to the line on which TC_1. TC_2, and TC_3 sit) one can state that the heat flux through each material is defined by the difference in temperature across that material divided by the thermal resistance per unit area of the material (where thermal resistance per unit area is defined by $R''=t/k$, where t is thickness in meters and k is thermal conductivity in W/m-K). The thickness, t, is measured while subjecting the sample material to a pressure equal to that which is experienced by the sample material during the CHP thermal conductivity test. For example, thickness of a sample material may be measured by sandwiching the sample material between a fixed rigid surface and a moveable rigid plate, parallel to the rigid surface, and applying a known pressure to the material sample by applying a known force to the rigid plate. Using any suitable means, for example a dial indicator or depth gauge, the thickness of this stack of materials, $t\_1$, may be measured. The material sample is then removed from this stack of materials and the thickness, $t\_2$, of the rigid plate is measured under the same force as previously prescribed. The thickness of the material sample under the prescribed pressure can thus be calculated by subtracting $t\_2$ from $t\_1$. The preferred range of material sample thickness for use in this thermal conductivity measurement is between 2 and 10 mm. Using material sample thicknesses outside of this range may introduce a level of uncertainty and/or error into the thermal conductivity calculation such that the measured values are no longer accurate and/or reliable. By setting the heat flux through the sample material equal to the heat flux through the reference material, the thermal conductivity of the sample material can be solved for (the only unknown in the equation). This calculation is performed for each temperature set, and the mean value is reported as the sample thermal conductivity. The thermocouples used can be individually calibrated against a platinum RTD, and assigned unique corrections for zero-offset and slope, such that the measurement uncertainty is +0.25° C. rather than +2.2° C.

For example, FIG. 7B and FIG. 7C depict a method for measuring thermal conductivity in accordance with the Calibrated Hot Plate (CHP) method described herein, wherein a hot plate (7) is placed on top of an insulating material (8), and the sample to be measured (6) is placed on top of the hot plate. A NIST standard foam (5) is placed on top of the sample, an ice bucket of known weight (4) is placed on top of this stack, and interface temperatures are measured using a temperature meter (9) in accordance with some embodiments. As shown FIGS. 7B and 7C, the CHP method is shown in front view and 3-dimensional view, respectively.

In some embodiments, the thermal conductivity of a polymer-aerogel/fiber or a polymer-aerogel/textile composite is lower than the native fiber or native textile, respectively, when measured according to any of the appropriate methods described herein.

Without wishing to be bound by any particular theory, it is believed that aerogel which coats an outer surface of a fiber in a polymer-aerogel/fiber composite and/or occupies a space between the strands of a fiber when plied into a mat or incorporated into a textile hinders the heat transfer between adjacent fibers and/or strands of fibers by preventing direct contact between the fibers and/or strands of fibers and, due to the low thermal conductivity of the aerogel, provides thermal insulation. For example, in some embodiments a mat or textile comprising the polymer-aerogel/fiber composite exhibits a reduction in thermal conductivity relative to a comparable mat or textile comprising native fiber alone, respectively. In some embodiments, this reduction in thermal conductivity can be greater than 10%, greater than 20%, greater than 30%, greater than 40%, greater than 50%, or greater. In certain embodiments, this reduction in thermal conductivity can be realized without significant increase in the weight or bulk of the mat or textile comprising the polymer-aerogel/fiber composite relative to a comparable mat or textile comprising native fiber alone. In some of these embodiments, a reduction in thermal conductivity of 30% can be achieved with the addition of less than 1%, 2%, 3%, 5%, 10%, 20%, or 40% mass of polymer aerogel in the polymer-aerogel/fiber composite.

Without wishing to be bound by any particular theory, it is believed that aerogel which coats an outer surface of the fibers in a polymer-aerogel/textile composite and/or occupies a space between the fibers that make up the textile and/or occupies a space between the strands of the fiber that make up a textile hinders the heat transfer between adjacent fibers and/or strands of fibers of said textile by preventing direct contact between the fibers and/or strands of fibers and, due to the low thermal conductivity of the aerogel, provides thermal insulation. For example, in some embodiments a polymer-aerogel/textile composite exhibits a reduction in thermal conductivity relative to a comparable native textile. In some embodiments, this reduction in thermal conductivity can be greater than 10%, greater than 20%, greater than 30%, greater than 40%, greater than 50%, or greater. In certain embodiments, this reduction in thermal conductivity can be realized without significant increase in the weight or bulk of textile comprising the polymer-aerogel/textile composite relative to a comparable textile comprising native textile alone. In some of these embodiments, a reduction in thermal conductivity of 30% can be achieved with the addition of less than 1%, 2%, 3%, 5%, 10%, 20%, or 40% mass of polymer aerogel in the polymer-aerogel/textile composite.

Without wishing to be bound by any particular theory, it is believed that a higher mass percent of polymer aerogel relative to the fiber or textile within a polymer-aerogel/fiber or polymer-aerogel/textile composite, respectively, directly correlates to a lower thermal conductivity.

In some embodiments, the thermal conductivity of a polymer-aerogel/fiber composite when plied into a mat, a textile comprising the polymer-aerogel/fiber composite, or a polymer-aerogel/textile composite can be measured under compression. The thermal conductivity of lofty materials (e.g., batting, down, or lofty knit textiles) typically increases as the material is compressed and the volume fraction of air in the insulating layer is decreased. In certain embodiments, when subjected to a compressive load, the thermal conductivity of a mat comprising the polymer-aerogel/fiber composite, a textile comprising the polymer-aerogel/fiber composite, or the polymer-aerogel/textile composite remains within 1%, within 5%, within 10%, within 30%, or within 100% of the thermal conductivity of the same mat comprising the polymer-aerogel/fiber composite, textile comprising the polymer-aerogel/fiber composite, or the polymer-aerogel/textile composite, respectively. In certain embodiments, when subjected to an increased compressive load, a mat comprising the polymer-aerogel/fiber composite, a textile comprising the polymer-aerogel/fiber composite, or the polymer-aerogel/textile composite has a lower thermal conductivity than a comparable mat comprising native fiber, textile comprising native fiber, or native textile, respectively. In certain embodiments, when placed under compression, the thermal conductivity of a mat comprising the polymer-aerogel/fiber composite, a textile comprising the polymer-aerogel/fiber composite, or the polymer-aerogel/textile composite is 1%, 5%, 10%, 20%, 30%, 40%, 50%, 60%, 75%, 90%, or 100% lower than the thermal conductivity of a comparable mat comprising native fiber, textile comprising native fiber, or native textile, respectively, under the same amount of compression.

In some embodiments, a mat comprising the polymer-aerogel/fiber composite, a textile comprising the polymer-aerogel/fiber composite, or a polymer-aerogel/textile has a lower thermal conductivity than a comparable mat comprising native fiber, textile comprising native fiber, or native textile, respectively, when exposed to liquid water and/or humidity. In certain embodiments, when exposed to liquid water and/or humidity the thermal conductivity of a mat comprising the polymer-aerogel/fiber composite, a textile comprising the polymer-aerogel/fiber composite, or the polymer-aerogel/textile composite remains within 1%, within 5%, within 10%, within 30%, or within 100% of the thermal conductivity of the dry mat comprising polymer-aerogel/fiber composite, the dry textile comprising the polymer-aerogel/fiber composite, or the dry polymer-aerogel/textile composite, respectively. In certain embodiments, a mat comprising the polymer-aerogel/fiber composite, a textile comprising the polymer-aerogel/fiber composite, or the polymer-aerogel/textile composite has a lower thermal conductivity than a comparable mat comprising native fiber, textile comprising native fiber, or native textile, respectively, when exposed to liquid water and/or humidity. In certain embodiments, when exposed to liquid water and/or humidity, the thermal conductivity of a mat comprising the polymer-aerogel/fiber composite, a textile comprising polymer-aerogel/fiber composite, or the polymer-aerogel/textile composite is 1%, 5%, 10%, 20%, 30%, 40%, 50%, 60%, 75%, 90%, or 100% lower than the thermal conductivity of a comparable mat comprising native fiber, textile comprising native fiber, or native textile, respectively, when exposed to liquid water and/or humidity.

In some embodiments, when placed under compression and exposed to liquid water and/or humidity the thermal conductivity of a mat comprising the polymer-aerogel/fiber composite, a textile comprising the polymer-aerogel/fiber composite, or the polymer-aerogel/textile composite remains within 1%, within 5%, within 10%, within 30%, or within 100% of the thermal conductivity of the same dry, uncompressed materials, respectively. In certain embodiments, a mat comprising the polymer-aerogel/fiber composite, a textile comprising the polymer-aerogel/fiber composite, or the polymer-aerogel/textile composite has a lower thermal conductivity than a comparable mat comprising native fiber, textile comprising native fiber, or native textile, respectively, when under compression and exposed to liquid water and/or humidity. In certain embodiments, when under compression and exposed to liquid water and/or humidity, the thermal conductivity of a mat comprising the polymer-aerogel/fiber composite, a textile comprising the polymer-aerogel/fiber composite, or the polymer-aerogel/textile composite is 1%, 5%, 10%, 20%, 30%, 40%, 50%, 60%, 75%, 90%, or 100% lower than a comparable mat comprising native fiber, textile comprising native fiber, or native textile, respectively, when under compression and exposed to liquid water and/or humidity.

In some embodiments, the specific surface area of the polymer-aerogel/fiber and/or polymer-aerogel/textile composite material is greater than that of the native fiber or textile, respectively. In some embodiments, the polymer-aerogel/fiber composite exhibits an internal surface area greater than 2 $m^2/g$, greater than 5 $m^2/g$, or greater than 10 $m^2/g$ as determined using nitrogen adsorption porosimetry and derived from the Brunauer-Emmett-Teller (BET) model. In some embodiments, the polymer-aerogel/textile composite exhibits an internal surface area greater than 2 $m^2/g$, greater than 5 $m^2/g$, or greater than 10 $m^2/g$ as determined using nitrogen adsorption porosimetry and derived from the Brunauer-Emmett-Teller (BET) model. The internal surface area of a material as measured by this method is herein referred to as the BET surface area of that material. For example, nitrogen sorption porosimetry may be performed using a Micromeritics Tristar II 3020 surface area and porosity analyzer. Before porosimetry analysis, specimens may be subjected to vacuum of ~100 torr for 24 hours to remove adsorbed water or other solvents from the pores of the specimens. The porosimeter may provide an adsorption isotherm and desorption isotherm, which comprise the amount of analyte gas adsorbed or desorbed as a function of partial pressure. Specific surface area may be calculated from the adsorption isotherm using the Brunauer-Emmett-Teller (BET) method over ranges typically employed in measuring surface area. In certain embodiments, the specific surface area of the polymer-aerogel/fiber or polymer-aerogel/textile composite material is greater than 2 $m^2/g$, greater than 5 $m^2/g$, greater than 10 $m^2/g$, greater than 20 $m^2/g$, greater than 30 $m^2/g$, greater than 40 $m^2/g$, greater than 50 $m^2/g$, greater than 100 $m^2/g$, greater than 200 $m^2/g$, or between 500 $m^2/g$ and 1000 $m^2/g$. In certain preferred embodiments, the specific surface area of the polymer-aerogel/fiber or polymer-aerogel/textile composite is greater than 50 $m^2/g$, Standard textiles or textile fibers typically exhibit specific surface area values much lower than the ranges listed herein, less than 10 $m^2/g$, and typically are too low to be measured using nitrogen adsorption porosimetry.

Those of ordinary skill in the art can appreciate that internal surface area and specific surface area have the same meaning and describe the same phenomenon. As described herein, these values may also be referred to as the BET surface area.

Without wishing to be bound by any particular theory, it is believed that a higher BET surface area directly correlates to a higher aerogel mass loading percent within the polymer-aerogel/fiber or polymer-aerogel/textile composite, and also correlates with a lower thermal conductivity of the composite.

Figure 1:
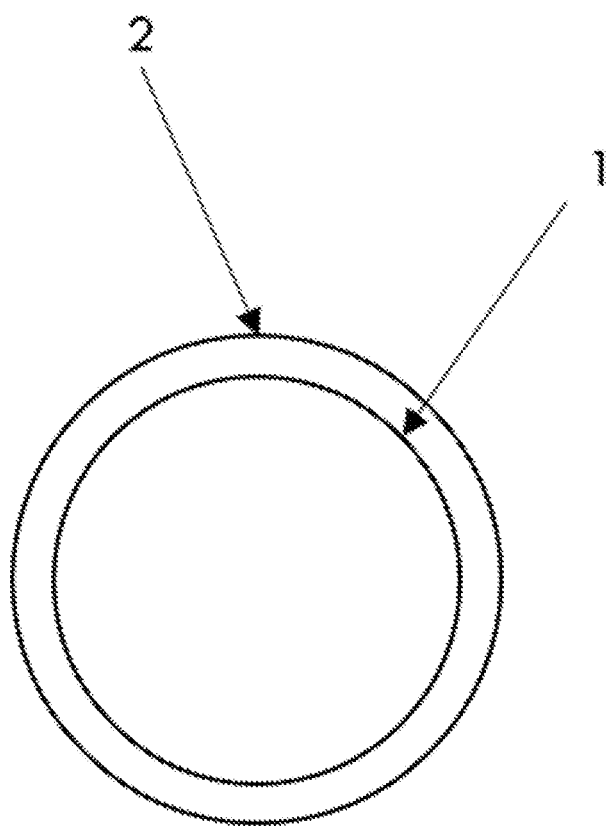
FIG. 1 depicts a cross-sectional area of a single-stranded fiber with a conformal coating comprising a polymer aerogel in accordance with some embodiments.
Figure 2A:
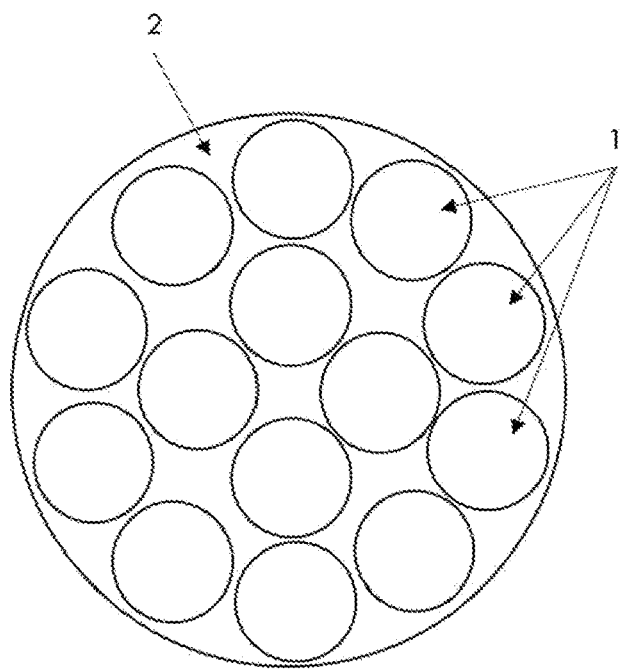
FIG. 2A depicts a cross-sectional area of a multi-stranded fiber wherein the polymer aerogel material is infiltrating the space between the strands of the fiber in accordance with some embodiments.
Figure 2B:
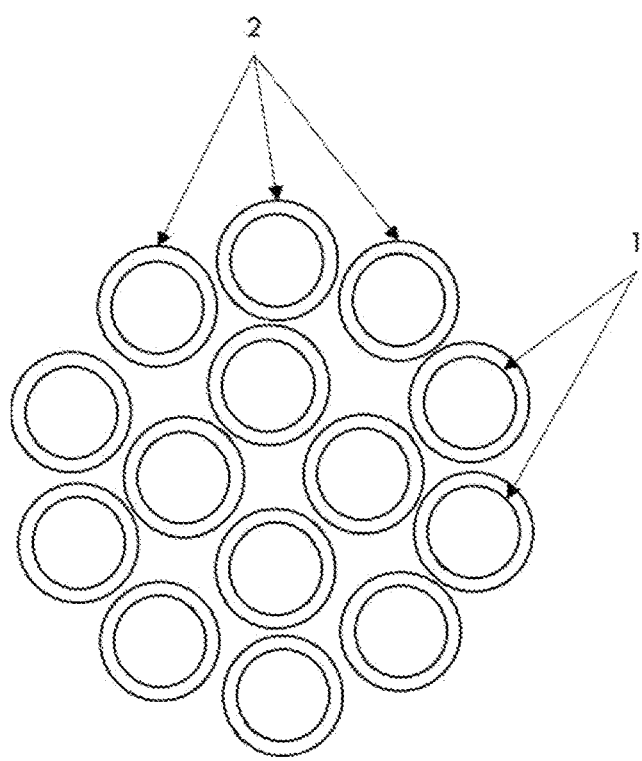
FIG. 2B depicts a cross-sectional area of a multi-stranded fiber wherein a conformal coating of polymer aerogel material surrounds each of the strands of the fiber in accordance with some embodiments.

In some embodiments, a polymer-aerogel/aerogel-composite-precursor solution may be prepared, in which particles of one aerogel material are dispersed throughout a polymer-aerogel-precursor-solution. The aerogel particles may be hydrophobic or hydrophilic, for example, a composite in which hydrophobic silica aerogel particles with diameters ranging from 1 to 5 micrometers, 1 to 10 micrometers, 1 to 20 micrometers, 1 to 40 micrometers, 1 to 100 micrometers, or 1-1000 micrometers are dispersed through a polymer aerogel. In certain embodiments, the aerogel particles may comprise trimethylsilyl-functionalized silica aerogel, wherein the silica aerogel may comprise sodium ions. In certain embodiments, the mass percent of the dispersant aerogel material, for example, silica aerogel particles, relative to the mass of the host aerogel, for example, a polymer aerogel, is less than 55%, less than 50%, less than 40%, less than 30%, less than 20%, less than 10%, less than 5%, less than 2%, or less than 1%. In some embodiments, the polymer-aerogel/aerogel-composite precursor solution is applied to a fiber and processed to form a polymer-aerogel/aerogel/fiber composite. In some embodiments, the polymer-aerogel/aerogel-composite precursor solution is applied to a textile and processed to form a polymer-aerogel/aerogel/textile composite. In some embodiments, a polymer-aerogel/fiber composite comprises a polymer aerogel wherein the polymer aerogel material comprises silica aerogel. In some embodiments, the silica aerogel comprises trimethylsilyl-functionalized silica aerogel. In some embodiments, the silica aerogel comprises sodium ions. For example, as shown in FIG. 1 the aerogel (2) in a polymer-aerogel/fiber composite may comprise polymer aerogel and particles of silica material comprising sodium ions. In some embodiments, a polymer-aerogel/textile composite comprises a polymer aerogel wherein the polymer aerogel material silica aerogel. In some embodiments, the silica aerogel comprises trimethylsilyl-functionalized silica aerogel. In some embodiments, the silica aerogel comprises sodium ions. For example, in FIG. 25B the aerogel (2) in a polymer-aerogel/textile composite may comprise polymer aerogel and particles of silica material comprising sodium ions. As described herein, in some embodiments, a polymer-aerogel/fiber composite or polymer-aerogel/textile composite may also refer to compositions which include a polymer-aerogel/aerogel/fiber composite or polymer-aerogel/aerogel/textile composite, respectively. In some embodiments, the polymer aerogel in a polymer-aerogel/aerogel/fiber composite comprises a polyimide aerogel. In some embodiments, the polyimide aerogel material comprises trimethylsilyl-functionalized silica aerogel, wherein the silica aerogel comprises sodium ions.

Without wishing to be bound by theory, it is believed that the presence of these silica aerogel particles in the polymer-aerogel/fiber composite or polymer-aerogel/textile composite help to prevent sorption of some mixtures of water and detergent during laundering, due to the presence of sodium ions within the silica aerogel particles, along with the hydrophobic surface chemistry of these particles.

A polymer-aerogel/fiber composite, a textile comprising the polymer-aerogel/fiber composite, or a polymer-aerogel/textile composite may be subject to consumer care laundering. In some embodiments, the composite may be laundered following the procedure outlined in the AATCC LP1 standard for home laundering. This procedure may entail, for example, washing using a standard electric washing machine, followed by drying in a standard tumble dryer. In some embodiments, after being laundered following the procedure outlined in the AATCC LP1 standard, a polymer-aerogel/fiber composite, a textile comprising the polymer-aerogel/fiber composite, or polymer-aerogel/textile composite maintains a measurable BET surface area. Without wishing to be bound by any particular theory, it is believed that a measurable BET surface area indicates the continued presence of aerogel in the composite. In certain embodiments, after being subjected to consumer care laundering, a mat comprising the polymer-aerogel/fiber composite, a textile comprising the polymer-aerogel/fiber composite, or the polymer-aerogel/textile composite maintains a lower thermal conductivity than a comparable mat comprising native fiber, textile comprising native fiber, or native textile, respectively. In some embodiments, after being subjected to consumer care laundering, the polymer-aerogel/fiber composite or polymer-aerogel/textile composite may exhibit a BET surface area greater than 2 $m^2/g$, greater than 5 $m^2/g$, greater than 10 $m^2/g$, greater than 20 $m^2/g$, greater than 30 $m^2/g$, greater than 40 $m^2/g$, greater than 50 $m^2/g$, greater than 100 $m^2/g$, greater than 200 $m^2/g$, or between 500 $m^2/g$ and 1000 $m^2/g$. In certain preferred embodiments, the polymer-aerogel/fiber composite may be laundered according to the AATCC LP1 standard for home laundering, and the laundered material exhibits a BET surface area of at least 10 $m^2/g$. In certain preferred embodiments, the polymer-aerogel/textile composite may be laundered according to the AATCC LP1 standard for home laundering, and the laundered material exhibits a BET surface area of at least 10 $m^2/g$. As would be understood by those of ordinary skill in the art, the BET surface area of composite materials described herein would be measured using nitrogen adsorption porosimetry and derived from the Braunauer-Emmett-Teller (BET) model.

In some embodiments, a polymer-aerogel/fiber composite, or a polymer-aerogel/textile composite may exhibit hydrophobicity. The term hydrophobicity refers to the absence of attractive force between a material and a mass of water. In certain embodiments, the apparent hydrophobicity of a textured surface can be higher than the chemical hydrophobicity of the bulk material.

Hydrophobicity of a polymer-aerogel/fiber composite, a textile comprising polymer-aerogel/fiber composite, or a polymer-aerogel/textile composite can be expressed in terms of the liquid water uptake. The term liquid water uptake refers to the ability of a material or composition to absorb, adsorb, or otherwise retain water due to contact with water in the liquid state. In some embodiments, a polymer-aerogel/fiber composite, a textile comprising polymer-aerogel/fiber composite, or a polymer-aerogel/textile composite may have a lower liquid water uptake than a comparable native fiber, textile comprising native fiber, or native textile, respectively. Liquid water uptake can be expressed one of several ways, for example, as a fraction or percent of the open pore volume or envelope volume of the material, or as a fraction or percent relative to the mass of the un-wetted material. The liquid water uptake reported is understood to be a measurement undertaken under specific conditions. Liquid water uptake may be determined by methods including but not limited to ASTM C1511, ASTM C1763, EN 1609, or any suitable standard for measuring liquid water uptake. In some embodiments, the liquid water uptake of the polymer-aerogel/fiber composite a textile comprising polymer-aerogel/fiber composite, or the polymer-aerogel/textile composite may be less than 100 wt %, less than 80 wt %, less than 70 wt %, less than 60 wt %, less than 50 wt %, less than 40 wt %, less than 30 wt %, less than 20 wt %, less than 10 wt %, less than 5 wt %, less than 4 wt %, less than 3 wt %, less than 2 wt %, less than 1 wt %, or less than 0.1 wt % relative to the weight of the composite before contact with liquid water.

In some embodiments, when the polymer-aerogel/fiber composite is submerged under water at 25° C. for 24 h, the composite uptakes a mass of water within its outer boundaries of less than 20% of the dry mass of the respective aerogel prior to submersion in the water.

Figure 8:
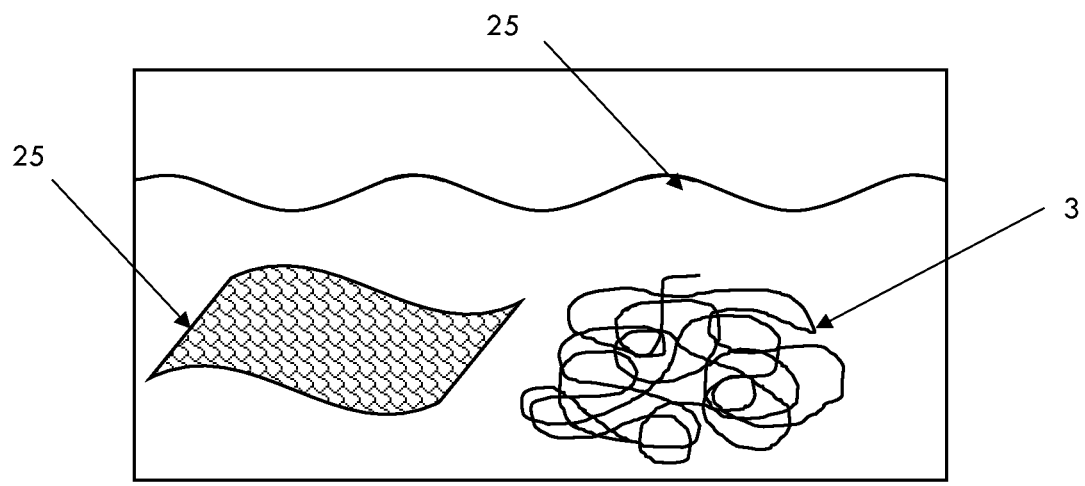
FIG. 8 depicts a method for submerging a composite sample under water at 25° C. to measure liquid water uptake in accordance with some embodiments.

In some preferred embodiments, when the polymer-aerogel/fiber composite is submerged under water at 25° C. for 24 h, the composite uptakes a mass of water within its outer boundaries of less than 20% of the dry mass of the respective composite prior to submersion in the water. For example, as shown in FIG. 8a composite fiber (3) is submerged under water (33) at 25° C. for 24 h, and the composite uptakes a mass of water within its outer boundaries of less than 20% of the dry mass of the respective composite prior to submersion in the water.

In some embodiments, when the polymer-aerogel/textile composite is submerged under water at 25° C. for 24 h, the composite uptakes a mass of water within its outer boundaries of less than 20% of the dry mass of the respective aerogel prior to submersion in the water.

In some preferred embodiments, when the polymer-aerogel/textile composite is submerged under water at 25° C. for 24 h, the composite uptakes a mass of water within its outer boundaries of less than 20% of the dry mass of the respective composite prior to submersion in the water. For example, as shown in FIG. 8a composite textile (25) is submerged under water (33) at 25° C. for 24 h, and the composite uptakes a mass of water within its outer boundaries of less than 20% of the dry mass of the respective composite prior to submersion in the water.

Hydrophobicity of a polymer-aerogel/fiber composite, a textile comprising polymer-aerogel/fiber composite, or a polymer-aerogel/textile composite can be expressed in terms of the water vapor uptake. The term water vapor uptake refers to the ability for a material or composition to absorb, adsorb, or otherwise retain water due to contact with water in the vapor state. In some embodiments, a textile comprising polymer-aerogel/fiber composite or a polymer-aerogel/textile composite may have a lower water vapor uptake than a comparable textile comprising native fiber alone. In some embodiments, a textile comprising polymer-aerogel/fiber composite or a polymer-aerogel/textile composite may have a higher water vapor uptake than a comparable textile comprising native fiber alone. Water vapor uptake can be expressed as a fraction or percent of water retained relative to the mass of the aerogel before exposure to water vapor. The water vapor uptake reported is understood to be a measurement undertaken under specific conditions. Water vapor uptake may be determined by methods including but not limited to ASTM C1104 or any suitable standard for measuring water vapor sorption or retention. In some embodiments, the water vapor uptake of the polymer-aerogel/fiber composite or a polymer-aerogel/textile composite may be less than 100 wt %, less than 80 wt %, less than 70 wt %, less than 60 wt %, less than 50 wt %, less than 40 wt %, less than 30 wt %, less than 20 wt %, less than 10 wt %, less than 5 wt %, less than 4 wt %, less than 3 wt %, less than 2 wt %, less than 1 wt %, or less than 0.1 wt % relative to the weight of the composite before exposure to water vapor.

In some embodiments, a polymer-aerogel/fiber composite may be laundered according to the AATCC LP1 standard for home laundering and the laundered material exhibits a thermal conductivity of less than 80 mW/m-K or less than 40 mW/m-K when the composite is laid up into a mat and measured according to the Calibrated Hot Plate (CHP) method described herein, at an average sample temperature of 25° C. and an applied pressure of 0.31 psi.

In some embodiments, a polymer-aerogel/fiber composite may be incorporated into a textile and laundered according to the AATCC LP1 standard for home laundering and the laundered material exhibits a thermal conductivity of less than 80 mW/m-K or less than 40 mW/m-K when measured according to the Calibrated Hot Plate (CHP) method described herein, at an average sample temperature of 25° C. and an applied pressure of 0.31 psi.

In some embodiments, a polymer-aerogel/textile composite may be laundered according to the AATCC LP1 standard for home laundering and the laundered material exhibits a thermal conductivity of less than 80 mW/m-K or less than 40 mW/m-K when measured according to the Calibrated Hot Plate (CHP) method described herein, at an average sample temperature of 25° C. and an applied pressure of 0.31 psi.

In some embodiments, a textile comprising a polymer-aerogel/fiber composite passes flammability testing described herein. In some embodiments, a polymer-aerogel/textile composite passes flammability testing described herein. In some embodiments, a polymer-aerogel/fiber composite or a polymer-aerogel/textile composite is nonflammable. In some embodiments, a textile comprising the polymer-aerogel/fiber composite, or a polymer-aerogel/textile composite may exhibit improved nonflammability relative to a comparable textile comprising native fiber alone. Nonflammability may be characterized as the absence of melting, dripping, and burn through when exposed to a vertical flame for 3 seconds under specific conditions. Vertical Flame testing is carried out in a laboratory hood and flame cabinet as described in Federal Standard 191A Method 5903 using a textile comprising polymer-aerogel/fiber composite. All samples are preconditioned for 2 hours at 21° C. and 50%+/−2% relative humidity. A moveable Fisher burner supplied with butane through a supply valve, regulator, needle valve, and flexible hose arrangement able to supply a consistent gas flow of 17.3 kpa+/−1.7 kpa as specified in NFPA 1971-34 is used as the flame source. A steel sample holder is used to center the bottom of the sample approximately 38 mm above the top of the Fisher burner inside the flame cabinet. The sample is placed horizontally on the sample holder and secured in place using medium size binder clips. The laboratory hood air flow is set to low and the burner is lit facing away from the sample. The flame height is adjusted to approximately 75 mm and allowed to burn for 1 minute adjusting the height as necessary. The burner is then moved under the specimen placing the flame as close to the center of the sample as possible, and a timer starter for 3 seconds. At the end of 3 seconds, the burner is moved out from under the specimen. If the sample burns, the timer is allowed to continue until the flame is extinguished. Any time beyond the 3 seconds that the sample is exposed to the flame is known as the afterflame time. Hole formation either through ablation or burning is known as burn-through. Any melting, dripping, burn-through, or afterflame time is recorded. Any melting, dripping, or burn-through constitutes the sample failing the test.

Nonflammability may also be characterized as passing certain standards as they apply to different applications. In certain embodiments, a textile comprising polymer-aerogel/fiber composite or a polymer-aerogel/textile composite passes the FAR 25.853 burn requirements for aviation interiors.

In certain embodiments, a textile comprising polymer-aerogel/fiber composite or a polymer-aerogel/textile composite passes the ASTM D6413 standard test method for flame resistance of textiles.

In certain embodiments, a textile comprising polymer-aerogel/fiber composite or a polymer-aerogel/textile composite passes the 16 CFR 1615 standard for the flammability of children's sleepwear.

In certain embodiments, a textile comprising polymer-aerogel/fiber composite or a polymer-aerogel/textile composite passes the CPAI-84 specification for flame-resistant materials used in camping tentage.

In certain embodiments, a textile comprising polymer-aerogel/fiber composite or a polymer-aerogel/textile composite passes the ASTM D1230 specification for flame-resistant materials used in apparel textiles.

In some embodiments, a textile comprising a polymer-aerogel/fiber composite or a polymer-aerogel/textile composite may exhibit oleophobicity. The term oleophobicity refers to the absence of attractive forces between a material and a mass of organic liquid. In some embodiments, the oleophobicity of a bulk material refers to this behavior as it applies to a surface. In certain embodiments, the apparent oleophobicity of a textured surface can be higher than the chemical oleophobicity of the bulk material. Oleophobicity of a textile comprising polymer-aerogel/fiber composite or a polymer-aerogel/textile composite can be characterized by methods described in AATCC Test Method 118-2013, or any other suitable standard. In certain embodiments, a textile comprising polymer-aerogel/fiber composite or a polymer-aerogel/textile composite may have an AATCC Oil Repellency Grade of 0, 1, 2, 3, 4, 5, 6, 7, 8, or any other appropriate grade. In some embodiments, a textile comprising polymer-aerogel/fiber composite or a polymer-aerogel/textile composite may exhibit improved oleophobicity relative to a comparable textile comprising native fiber only.

In certain embodiments, a textile comprising a polymer-aerogel/fiber composite or a polymer-aerogel/textile composite exhibits air permeability. In certain embodiments, a textile comprising a polymer-aerogel/fiber composite or a polymer-aerogel/textile composite may exhibit reduced air permeability through the textile relative to a comparable textile comprising native fiber alone. In certain embodiments, a textile comprising a polymer-aerogel/fiber composite or a polymer-aerogel/textile composite may exhibit improved air permeability through the textile relative to a comparable textile comprising native fiber and a standard textile coating. Air permeability of the sample may be determined using methods outlined in ASTM D737 or any other standard suitable for determining the air permeability of a textile. In certain embodiments, the average air permeability is between 0 and 30 $cm^3/s/cm^2$, 30 to 150 $cm^3/s/cm^2$, or higher than 150 $cm^3/s/cm^2$. Combinations of the above noted ranges, or values outside of these ranges, are possible for the air permeability of the textile comprising polymer-aerogel/fiber composite or the polymer-aerogel/textile composite.

In certain embodiments, a textile comprising polymer-aerogel/fiber composite or a polymer-aerogel/textile composite may exhibit water repellency. In certain embodiments, a textile comprising a polymer-aerogel/fiber composite or a polymer-aerogel/textile composite may exhibit improved water repellency relative to a comparable textile comprising native fiber alone. In one example, a textile comprising polymer-aerogel/fiber composite exhibits both water repellency and air permeability. In one example, polymer-aerogel/textile composite exhibits both water repellency and air permeability. The phrase water repellency refers to the characteristic of a fiber to resist wetting. Water repellency may be determined by methods including but not limited to those outlined in the spray test outlined in AATCC TM22 or any suitable standard for measuring water repellency. In some embodiments, the spray test rating may be 100, 90, 80, 70, 50, or 0. Combinations of the above noted ranges, or values outside of these ranges, are possible for the water repellency spray test ratings of the polymer-aerogel/fiber composite, or the polymer-aerogel/textile composite.

In some embodiments, a textile comprising a polymer-aerogel/fiber composite, or a polymer-aerogel/textile composite may exhibit an overall [liquid] moisture management capability (OMMC). In certain embodiments, a textile comprising a polymer-aerogel/fiber composite, or a polymer-aerogel/textile composite may exhibit a higher OMMC grading relative to a comparable textile comprising native fiber alone. In certain embodiments, a textile comprising a polymer-aerogel/fiber composite, or a polymer-aerogel/textile composite may exhibit a lower OMMC grading relative to a comparable textile comprising native fiber alone. OMMC is defined herein as an index of the overall capability of a fabric to transport liquid moisture as calculated by combining the liquid absorbance rate on the bottom surface of the sample, the one-way liquid transport capability, and the maximum liquid moisture spreading speed on the bottom surface of the sample as described in AATCC test method 195. In some embodiments, the OMMC grading may be 1, 2, 3, 4, or 5. Combinations of the above noted ranges, or values outside of these ranges, are possible for the OMMC grading of the textile comprising a polymer-aerogel/fiber composite or the polymer-aerogel/textile composite.

In certain embodiments, a textile comprising a polymer-aerogel/fiber composite or a polymer-aerogel/textile composite exhibits an areal weight. As described herein, areal weight refers to the mass per unit area of a textile. In some embodiments areal weight of the textile can be calculated according to ASTM D3776. In certain embodiments, the areal weight of the textile is between 0 and 100 $g/m^2$, between 100 and 200 $g/m^2$, between 200 and 300 $g/m^2$, or greater than 300 $g/m^2$. Combinations of the above noted ranges, or values outside of these ranges, are possible for the areal weight of the textile comprising polymer-aerogel/fiber composite or the polymer-aerogel/textile composite. In some embodiments, the areal weight of a textile comprising polymer-aerogel/fiber composite or a polymer-aerogel/textile composite has an areal weight less than 1%, less than 5%, less than 10%, less than 20%, less than 30%, less than 40%, less than 50%, less than 60%, less than 75%, or less than 100% greater than the areal weight of a comparable textile comprising native fiber alone.

In some embodiments, a textile comprising a polymer-aerogel/fiber composite or a polymer-aerogel/textile composite may exhibit ultraviolet (UV) radiation blocking. In some embodiments, a textile comprising a polymer-aerogel/fiber composite or a polymer-aerogel/textile composite may exhibit improved UV radiation blocking when compared to a comparable textile comprising native fiber alone. The degree of UV radiation blockage is reported as an ultraviolet protection factor (UPF) rating. UPF ratings may be measured following the methods described in AATCC test method 183 or any other standard suitable to measuring UPF ratings for textiles. In some embodiments, a textile comprising a polymer-aerogel/fiber composite or a polymer-aerogel/textile composite may exhibit a UPF rating between 15 and 24, and thus meet the requirements of the "Good" UV protection category. In some embodiments, a textile comprising a polymer-aerogel/fiber composite or a polymer-aerogel/textile composite may exhibit a UPF rating between 25 and 39, and thus meet the requirements of the "Very Good" UV protection category. In some embodiments, a textile comprising a polymer-aerogel/fiber composite or a polymer-aerogel/textile composite may exhibit a UPF rating greater than 40, and thus meet the requirements of the "Excellent" UV protection category. Combinations of the above noted ranges, or values outside of these ranges, are possible for the UPF rating of the textile.

In some embodiments, a textile comprising a polymer-aerogel/fiber composite or a polymer-aerogel/textile composite may display improved abrasion resistance over a comparable textile comprising only native fiber. In some embodiments, abrasion resistance may be measured by methods described in ASTM D4966 or any suitable standard for measuring abrasion resistance.

In some embodiments the amount of aerogel applied to a fiber is such that the thickness of the polymer-aerogel/fiber composite or the polymer-aerogel/textile composite is comparable to the thickness of the native fiber alone, when under an amount of tension such as that seen in a normal cone of fiber. In other embodiments, the amount of aerogel that is applied to the fiber increases the thickness of the polymer-aerogel/fiber composite relative to the thickness of the native fiber alone. For example, a polymer-aerogel/fiber composite when subject to 10 g of tension may have a greater thickness relative to the native fiber under the same conditions. In some embodiments, the composite fiber may have a thickness of several times the diameter of the native fiber alone.

In some embodiments, when removed from tension, a polymer-aerogel/fiber composite exhibits a lower thickness than the native fiber alone. In an illustrative example, a multi-stranded fiber is removed from tension and the spacing between the strands of the fiber increases creating a thicker fiber. In a polymer-aerogel/fiber composite comprising the same multi-stranded fiber, the strands of the fiber may be mechanically bound to one another and therefore the composite fiber thickness does not increase as much as the native multi-stranded fiber when tension is decreased. In some embodiments, when removed from tension, the composite fiber exhibits an equal or greater thickness than the native fiber alone. In an illustrative example, a multi-stranded fiber is removed from tension and the spacing between the strands of the fiber increases creating a thicker fiber. In a polymer-aerogel/fiber composite comprising the same multi-stranded fiber, the strands of the fiber are not completely mechanically bound to one another and therefore the composite fiber thickness increases the same amount or more relative to the native multi-stranded fiber alone when tension is decreased.

In some embodiments, the fiber has at least one cross-sectional dimension of less than or equal to 10 microns, less than or equal to 20 microns, less than or equal to 50 microns, less than or equal to 100 microns, less than or equal to 200 microns, less than or equal to 500 microns, less than or equal to 1 millimeter, or less than or equal to 3 millimeters.

In certain embodiments, the fiber has an average cross-sectional dimension of less than or equal to 10 microns, less than or equal to 20 microns, less than or equal to 50 microns, less than or equal to 100 microns, less than or equal to 200 microns, less than or equal to 500 microns, less than or equal to 1 millimeter, or less than or equal to 3 millimeters.

In certain embodiments, the fiber has an average cross-sectional dimension of at least 5 microns, at least 10 microns, at least 20 microns, at least 50 microns, at least 100 microns, at least 500 microns, at least 1 mm, or at least 3 mm.

In some embodiments, the composite fiber has at least one cross-sectional dimension of less than or equal to 10 microns, less than or equal to 20 microns, less than or equal to 50 microns, less than or equal to 100 microns, less than or equal to 200 microns, less than or equal to 500 microns, less than or equal to 1 millimeter, or less than or equal to 3 millimeters.

In certain embodiments, the composite fiber has an average cross-sectional dimension of less than or equal to 10 microns, less than or equal to 20 microns, less than or equal to 50 microns, less than or equal to 100 microns, less than or equal to 200 microns, less than or equal to 500 microns, less than or equal to 1 millimeter, or less than or equal to 3 millimeters.

In certain embodiments, the composite fiber has an average cross-sectional dimension of at least 5 microns, at least 10 microns, at least 20 microns, at least 50 microns, at least 100 microns, at least 500 microns, at least 1 mm, or at least 3 mm.

The cross-sectional dimension of a fiber or a composite fiber is measured in a direction perpendicular to its length. The average cross-sectional dimension of a fiber or a composite fiber is taken as the number average of the cross-sectional dimensions along its length.

In some embodiments, the fiber has an aspect ratio of at least 100 to 1, at least 1000 to 1, at least 100,000 to 1, at least 107 to 1, at least 109 to 1, or greater.

In certain embodiments, the composite fiber has an aspect ratio of at least 100 to 1, at least 1000 to 1, at least 100,000 to 1, at least 107 to 1, at least 109 to 1, or greater.

The aspect ratio of a fiber or a composite fiber is expressed as the ratio of its length to its average cross-sectional diameter.

In illustrative embodiment, a multi-stranded fiber or fiber composite may have an average cross section diameter of 100 micron, and a length of 100,000 meters, with a length to diameter aspect ratio of about 109 to 1. In a further embodiment, a fiber or fiber composite may have an average cross section diameter of 100 micron, and a length of 1 meter, with a length to diameter aspect ratio of 10,000 to 1.

One of ordinary skill in the art would appreciate that textiles and composite textiles exist in three-dimensional space and have three dimensions: width, length, and thickness. Each of these three dimensions is orthogonal to the other two. The thickness of a textile or composite textile corresponds to the smallest of these three dimensions, with the other two dimensions (width and length) defining the face of the textile. The thickness of a textile or composite textile generally refers to its average thickness, which is taken as the number average of its thicknesses across its face.

In certain embodiments, the textile has a thickness of less than or equal to 10 microns, less than or equal to 20 microns, less than or equal to 50 microns, less than or equal to 100 microns, less than or equal to 200 microns, less than or equal to 500 microns, less than or equal to 1 millimeter, or less than or equal to 5 millimeters. In certain embodiments, the textile has a thickness of at least 5 microns, at least 10 microns, at least 20 microns, at least 50 microns, at least 100 microns, at least 500 microns, at least 1 mm, or at least 5 millimeters.

In some embodiments, the width of the textile is at least 10 times, at least 50 times, at least 100 times, at least 1000 times, at least 5000 times, or at least 10,000 times the thickness of the textile. In certain embodiments, the length of the textile is at least 100 times, at least 1,000 times, at least 10,000 times, at least 100,000 times, at least 106, or at least 107 times the thickness of the textile. In some embodiments, both the width and the length of the textile are at least 10 times, at least 50 times, at least 100 times, at least 1000 times, at least 5000 times, or at least 10,000 times the thickness of the textile.

In some embodiments, the width of the composite textile is at least 10 times, at least 50 times, at least 100 times, at least 1000 times, at least 5000 times, or at least 10,000 times the thickness of the composite textile. In certain embodiments, the length of the composite textile at least 100 times, at least 1,000 times, at least 10,000 times, at least 100,000 times, at least 106, or at least 107 times the thickness of the composite textile. In some embodiments, both the width and the length of the composite textile are at least 10 times, at least 50 times, at least 100 times, at least 1000 times, at least 5000 times, or at least 10,000 times the thickness of the composite textile.

In some embodiments the composite textile has at least one lateral dimension of at least 5 cm. In some embodiments, the composite textile has at least two orthogonal dimensions of at least 5 cm. For example, the composite textile shown in FIG. 25A may have a length and width that are both at least 5 cm. In some embodiments, the composite textile has a thickness of less than 0.1 inches. For example, the composite textile shown in FIG. 25A may have a thickness of less than 0.1 inches.

Figure 10:
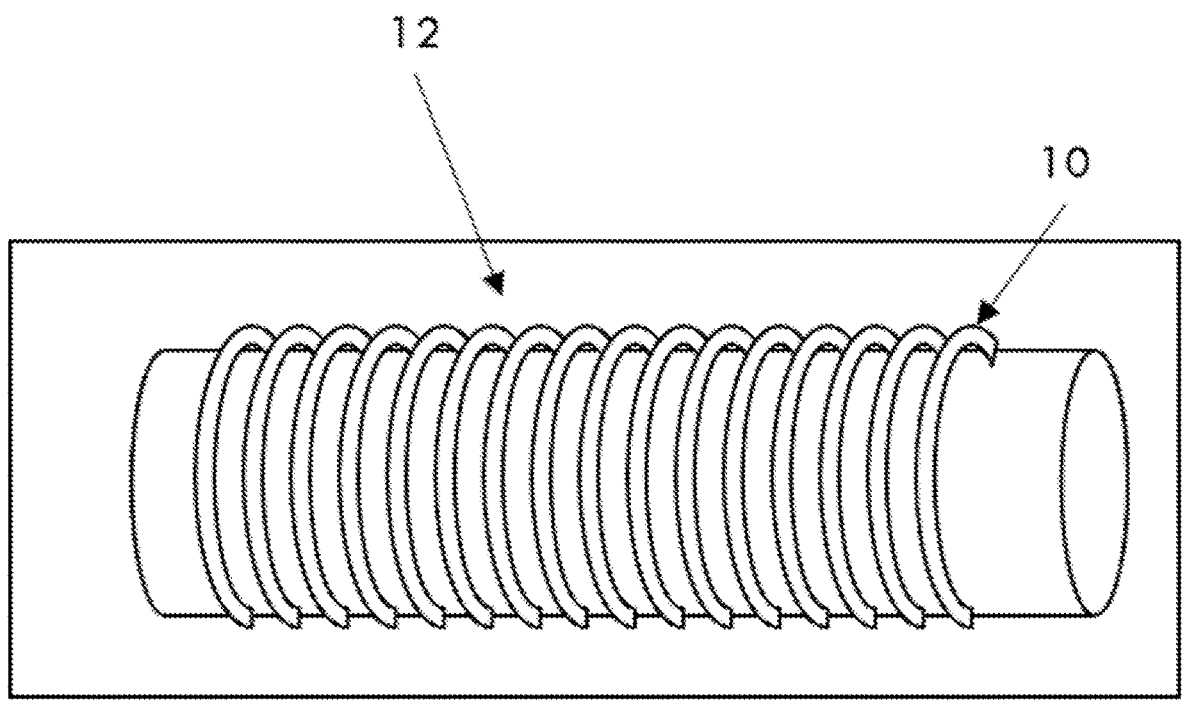
FIG. 10 depicts a method of infiltrating a spool of fiber by submerging or partially submerging the spool in a liquid solution comprising polymer-aerogel-precursor in accordance with some embodiments.
Figure 25B:
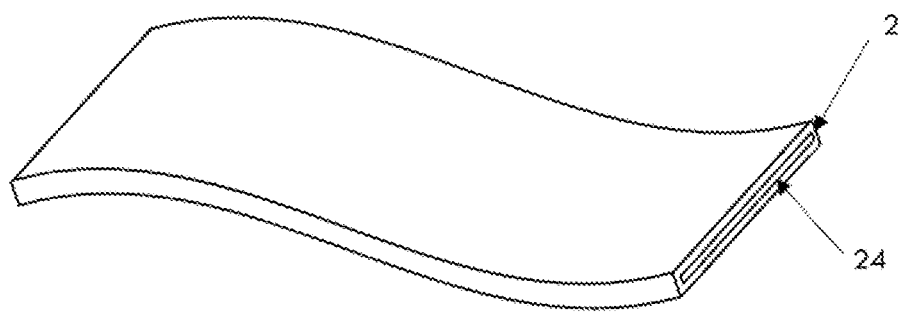
FIG. 25B depicts an example of a polymer-aerogel/textile composite, comprising: a textile; and a conformal coating of polymer aerogel material that may be found over an external surface of the textile, in accordance with some embodiments.
Figure 25C:
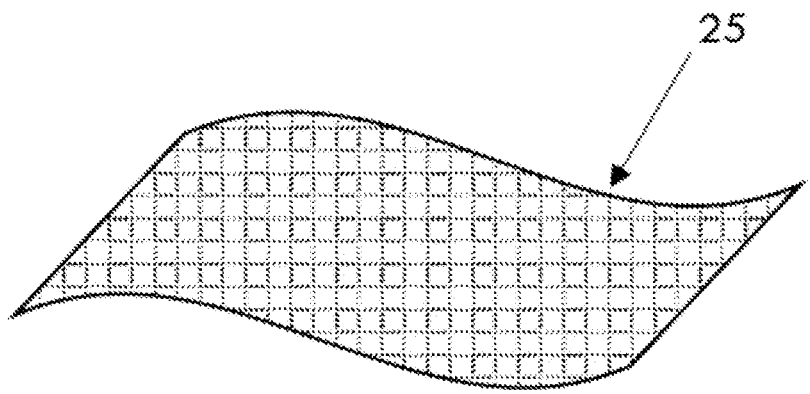
FIG. 25C depicts an example of a woven polymer-aerogel/textile composite, comprising: a textile; and polymer aerogel material.
Figure 25D:
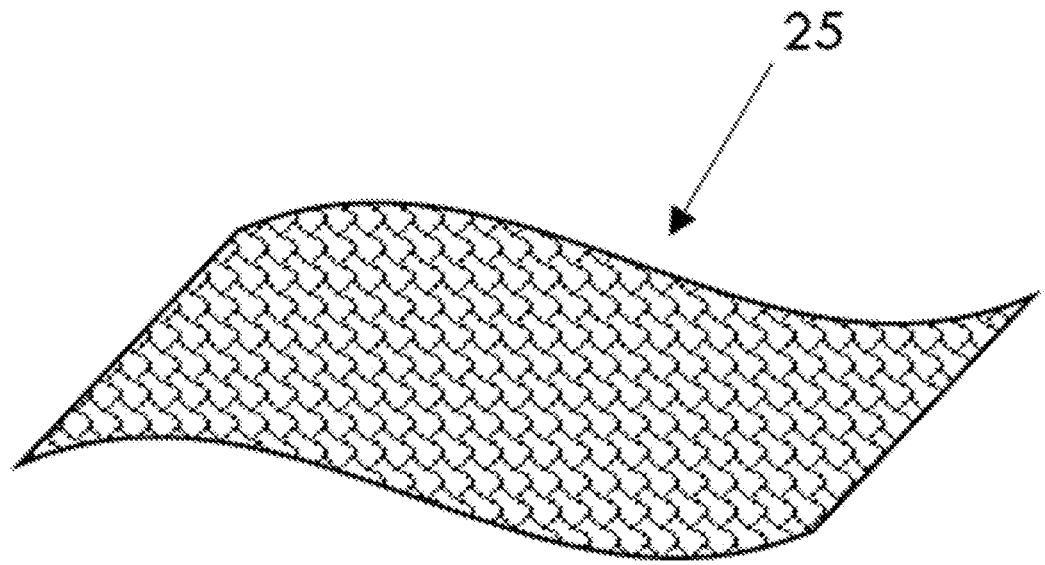
FIG. 25D depicts an example of a knit polymer-aerogel/textile composite, comprising: a textile; and polymer aerogel material.
Figure 25E:
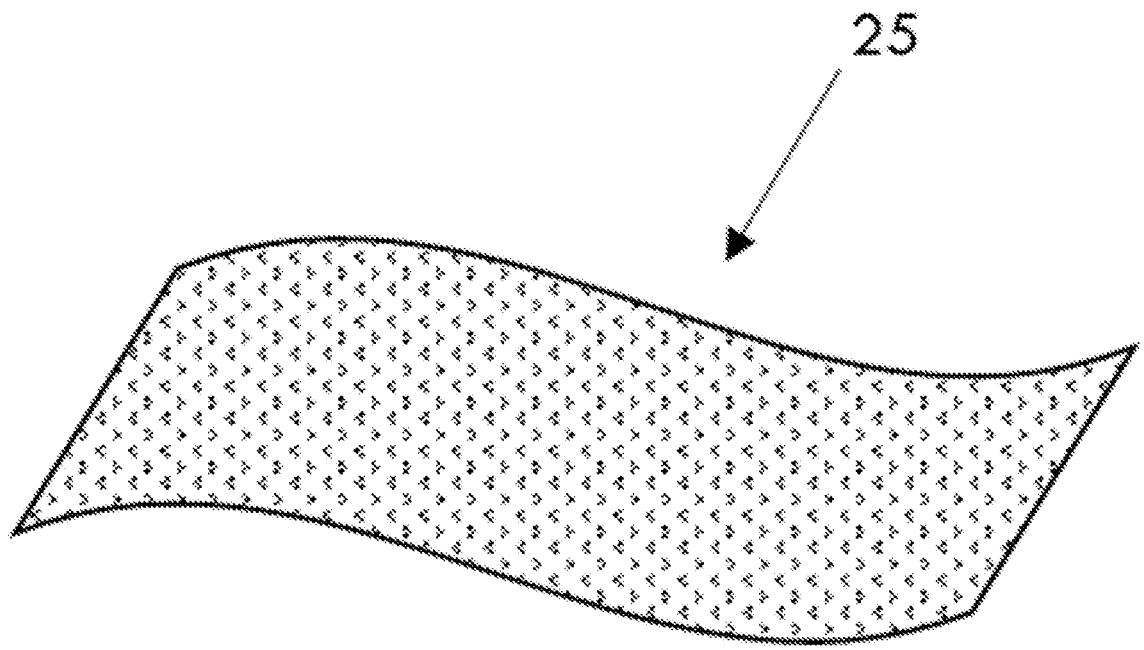
FIG. 25E depicts an example of a non-woven polymer-aerogel/textile composite, comprising: a textile; and polymer aerogel material.
Figure 26:
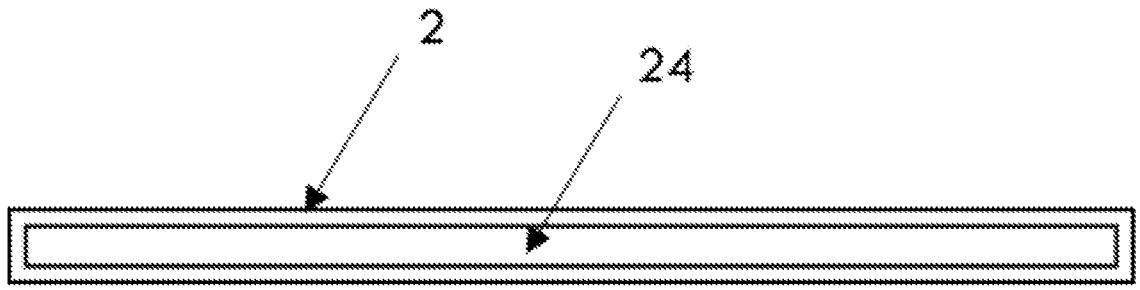
FIG. 26 depicts an example of a cross-sectional area of a polymer-aerogel/textile composite, wherein the polymer aerogel material is substantially continuous over the surface of any given cross-section of the textile in accordance with some embodiments.
Figure 27A:
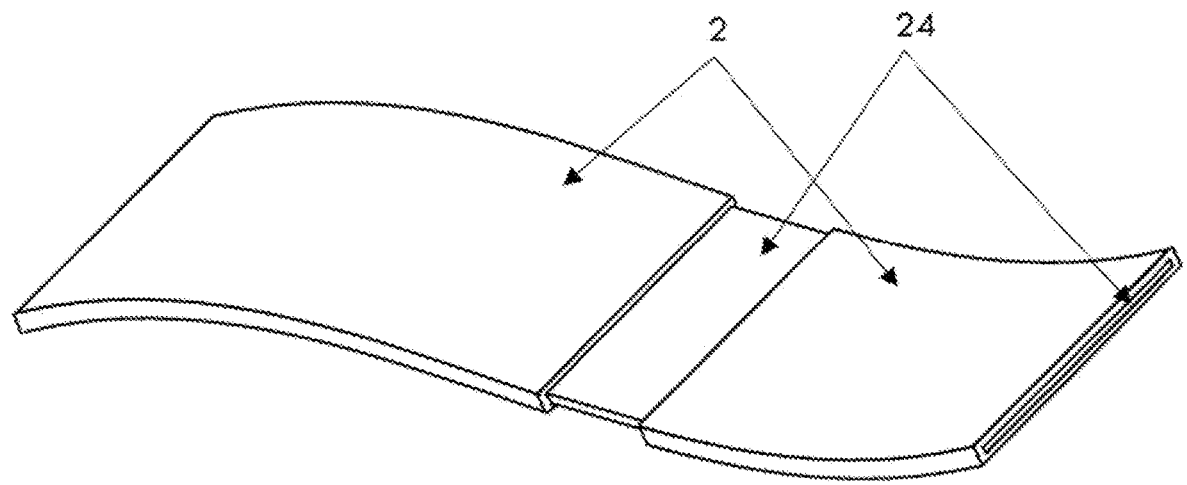
FIG. 27A depicts an example of a polymer-aerogel/textile composite, wherein the polymer aerogel material is substantially discontinuous along the length of the textile in accordance with some embodiments.
Figure 27B:
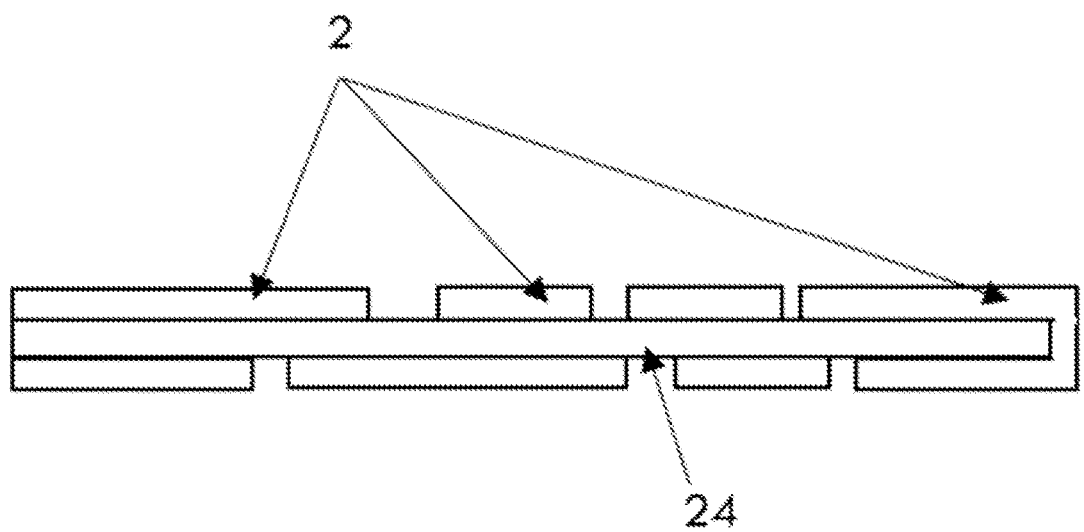
FIG. 27B depicts a cross-sectional area of a polymer-aerogel/textile composite, wherein the polymer aerogel material is substantially discontinuous over the surface of any given cross-section of the textile in accordance with some embodiments.
Figure 29:
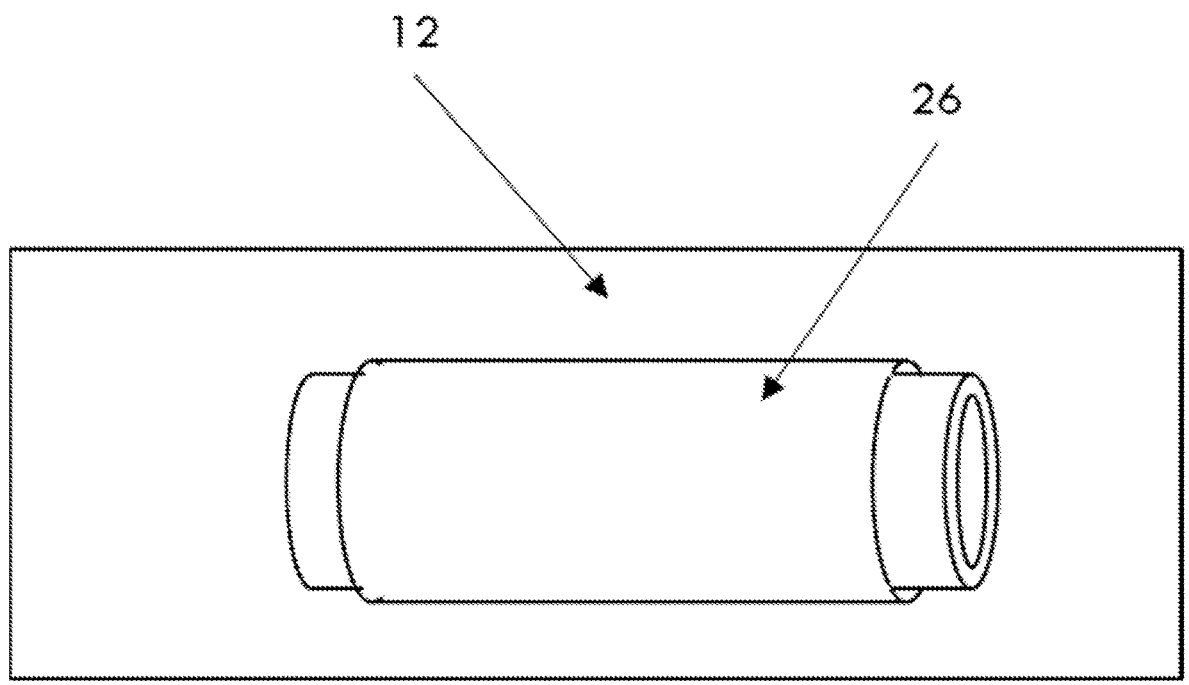
FIG. 29 depicts a method of infiltrating a spool of textile by submerging or partially submerging the spool in a liquid solution comprising polymer-aerogel-precursor in accordance with some embodiments.

In some embodiments, a fiber is exposed to a liquid solution comprising polymer-aerogel-precursor and forms a polymer aerogel from the polymer-aerogel-precursor such that the polymer aerogel is over an external surface of the fiber and/or is infiltrated within pores of the fiber. For example, as shown in FIG. 10 a fiber spool (10) is exposed to a liquid solution comprising polymer-aerogel-precursor (12). The fiber, having been exposed to polymer-aerogel-precursor solution may be processed to produce a polymer-aerogel/fiber composite such that, as shown in FIG. 1 the polymer aerogel (2) is over an external surface of the fiber (1) and/or is infiltrated within pores of the fiber. In some embodiments, a textile is exposed to a liquid solution comprising polymer-aerogel-precursor and forms a polymer aerogel from the polymer-aerogel-precursor such that the polymer aerogel is over an external surface of the textile and/or is infiltrated within pores of the textile. For example, as shown in FIG. 29 a textile spool (26) is exposed to a liquid solution comprising polymer-aerogel-precursor (12). The textile, having been exposed to polymer-aerogel-precursor solution may be processed to produce a polymer-aerogel/textile composite such that, as shown in FIG. 25B, the polymer aerogel (2) is over an external surface of the textile (24) and/or is infiltrated within pores of the textile. In some embodiments, the polymer aerogel substantially conformally coats the textile. For example, as shown in FIG. 26 a polymer aerogel (2) substantially conformally coats a textile (24).

Polymer-aerogel/fiber composites or polymer-aerogel/textile composites may be produced through any suitable approach.

In some embodiments, a fiber or textile is selected with a chemical makeup that is amenable to mechanical and/or chemical bonding of polymer aerogel to the fiber or textile. For example, in certain preferred embodiments, the fiber or textile may comprise a polyester, a polyamide, cotton, or any suitable fiber.

In some embodiments, a fiber is pre-conditioned prior to exposing the fiber to the liquid solution comprising polymer-aerogel-precursor. In some embodiments, a textile is pre-conditioned prior to exposing the textile to the liquid solution comprising polymer-aerogel-precursor. Pre-conditioning a fiber or textile may involve preparing the fiber or textile for combination with the polymer-aerogel-precursor solution. Pre-conditioning of the fiber or textile may, in some embodiments, alter one or more surfaces of the fiber or textile. In certain embodiments, this altered surface may serve as an interface for adhesion and/or retention of polymer aerogel to the fiber or textile in the resultant polymer-aerogel/fiber or polymer-aerogel/textile composite. In some embodiments, the surfaces of the fiber or textile are etched through an etching process. In certain embodiments, the etching process comprises a chemical etching, electrochemical etching, acid etching, alkaline etching, plasma etching, or any other suitable etching process. In some embodiments, the fiber or textile is pre-conditioned by exposing the fiber to a liquid-phase or vapor-phase environment at a specific temperature or range of temperatures. In certain embodiments, exposure of the fiber or textile to a liquid-phase or vapor-phase environment causes the fiber or textile to swell. In certain embodiments, the fiber or textile is exposed to liquid-phase N-methyl-2-pyrolidone at a temperature of 70° C., 80° C., 90° C., 100° C., or any other suitable temperature. In some embodiments, the swollen fiber or textile is infiltrated with a solvent, a catalyst, and/or a liquid-phase aerogel precursor.

In some embodiments, the fiber or textile is pre-conditioned by exposure to ultraviolet radiation, infrared radiation, and/or treated with plasma to increase the surface reactivity of the native material.

In some embodiments, the fiber or textile is pre-conditioned by exposure to a reactive liquid, vapor, and/or solid that chemically functionalizes the surface of the fiber or textile and/or the surfaces of the strands of the fiber or textile, to better allow infiltration and/or adhesion of the aerogel precursor into and/or onto the fiber or textile. In certain embodiments, the fiber or textile is chemically functionalized to incorporate reactive functional groups on its surface. These functional groups, in some embodiments, may be reacted with a polymer-aerogel-precursor solution to produce a resultant polymer-aerogel/fiber or polymer-aerogel/textile composite upon drying. For example, the fiber or textile may be chemically functionalized to incorporate reactive nucleophilic amines and/or anhydrides on its surface, and these functional groups may be reacted with a polyimide-aerogel-precursor solution to produce a resultant polyimide-aerogel/fiber or polyimide-aerogel/textile composite upon drying.

In some embodiments, the fiber or textile is pre-conditioned by exposure to a liquid, vapor, or solid that contains reactive monomers. In some embodiments, these monomers chemically react with the fiber or textile to form reactive sites on the fiber or textile. In some embodiments, these monomers physisorb to the fiber or textile to provide reactive sites on the fiber or textile. In certain embodiments, these reactive sites may be reacted with complementary reactive sites on components of a polymer-aerogel-precursor solution and/or a polymer aerogel.

In some embodiments, the fiber or textile is coated or sized prior to incorporation of the polymer-aerogel-precursor. One example of sizing is a polymer coating on the fiber or textile. This sizing can act as an interface layer between the fiber or textile and the aerogel, and can affect the attachment of the aerogel to the fiber or textile.

In some embodiments, a mechanically textured multi-stranded fiber or textile comprising a mechanically textured multi-stranded fiber is selected. The mechanical texturing of the fiber may comprise, in some embodiments, waves, crimps, or loops in the individual strands of the multi-stranded fiber or the multi-stranded fibers that make up the textile. In some embodiments, the mechanical texture of the fiber has increased exposed surface area relative to a non-textured fiber, which may increase the potential area for interface between the polymer aerogel and the fiber or textile in a polymer-aerogel/fiber composite or polymer-aerogel/textile composite, respectively. In certain embodiments, a polymer-aerogel/fiber composite or polymer-aerogel/textile composite comprises a mechanically textured fiber. In certain embodiments, a polymer-aerogel/fiber or polymer-aerogel/textile composite comprising a mechanically textured fiber or fibers loses less aerogel mass when subjected to abrasion, flexing, or handling relative to a polymer-aerogel/ fiber or polymer-aerogel/textile composite, respectively, that does not comprise a mechanically textured fiber or fibers. In certain embodiments, the mechanical texture of a multi-stranded fiber comprises an amount of space between the strands of the fiber, resulting in a porosity or loft in the fiber or textile made from the fiber. In some embodiments, this porosity may influence the amount of polymer aerogel that may be loaded into/onto the fiber or textile comprising the fiber. In certain embodiments, a mechanically textured fiber or a textile comprising a mechanically textured fiber is selected which comprises intrafiber porosity, wherein said porosity provides a volume for uptake of polymer-aerogel precursor.

Figure 9:
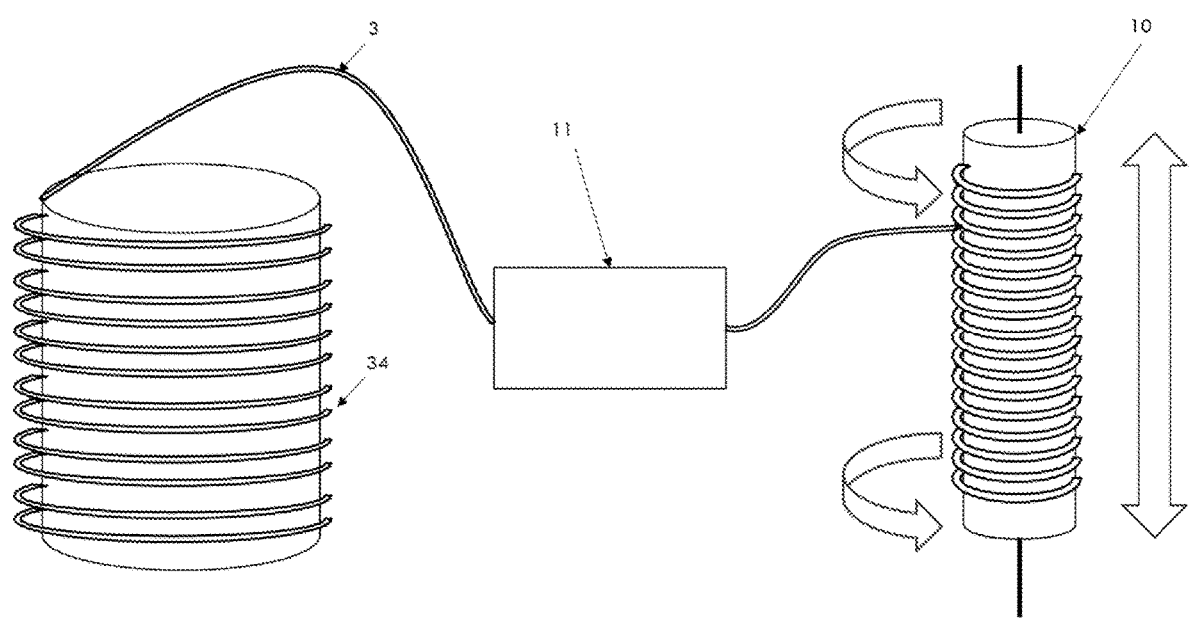
FIG. 9 depicts a method of creating a spool of fiber using a tension controller to control the tension of the fiber from a larger bulk spool in accordance with some embodiments.

In certain embodiments, the fiber is pre-conditioned by controlling the tension of the fiber. The tension of the fiber may be controlled to a tension of between 0 to 1 grams (g), 1 to 10 g. 10 to 100 g. greater than 100 g, or any suitable tension. In some embodiments, the tension of the fiber is controlled by winding the fiber from one spool onto another. In certain embodiments, a sending spool and a receiving spool are rotated at different rates relative to one another, which in turn increases or decreases tension in the fiber as it moves from one spool to the other. In some embodiments, the tension in the fiber is controlled when the fiber is wound onto a spool, cone, mandrel, and/or other suitable roll format. In certain embodiments, controlling the tension of the fiber allows for some control of the amount of porosity within the fiber and/or the spool of fiber. In some embodiments, this porosity may influence the amount of polymer aerogel that may be loaded into/onto the fiber. In certain embodiments, the fiber is wound on a standard carrier such as a cone, cylinder, flanged bobbin, bale, or loom and exhibits an as-wound tension. In some embodiments, the fiber on a carrier is wound onto a second carrier to reduce its as-wound tension. In some embodiments, by reducing the tension of the fiber relative to its as-wound tension on its initially provided carrier spool, the porosity of the reduced-tension spool of fiber is increased relative to the higher-tension as-wound spool of the same fiber. In certain embodiments, a commercially available tension controlling device is used to precisely tension the spool or cone of fiber. In certain embodiments, a highly textured fiber is wound onto a spool with a tension of between 0.5 g to 10 g, resulting in a porous spool of fiber. In some embodiments, a polymer-aerogel-precursor solution may be introduced to this porous spool of fiber. In certain preferred embodiments, the tension of the fiber is controlled to between 1 g and 20 g of tension during the time and/or prior to the time when the fiber is exposed to the liquid solution comprising polymer-aerogel-precursor. For example, as shown in FIG. 9 a fiber (3) is removed from a commercial package of fiber (34), runs through a tension controlling device (11), and is rewound to form a second spool of fiber (10) at a controlled tension prior to the time of exposure of the fiber to polymer-aerogel-precursor solution. In another example, in FIG. 11, a fiber (1) is run under a roller (13) through a bath of a polymer-aerogel/precursor solution (12), and the tension of the fiber may be controlled during the time when it is exposed to the polymer-aerogel/precursor solution.

In some embodiments, the tension in the fiber is controlled while it is not on a spool. In certain embodiments, polymer-aerogel-precursor solution may be applied to the fiber while it is not on a spool or carrier. In certain embodiments, the tension of the fiber is controlled. In certain embodiments, a fiber with lower tension than its as-wound tension on a standard carrier spool from which it is unwound may exhibit increased porosity between its strands relative to the same fiber under greater tension. In certain embodiments, a fiber under a tension of between 1 g and 20 g may be contacted with a polymer-aerogel-precursor solution, resulting in a polymer-gel/fiber composite. In certain embodiments, the resultant polymer-aerogel/fiber composite exhibits an increased aerogel mass loading relative to a composite made with the same fiber when contacted with a polymer-aerogel-precursor solution when the fiber is under a higher degree of tension.

In illustrative embodiment, the tension of a multi-stranded fiber is controlled to 10 g as it is moved through a polymer-aerogel-precursor solution in a roll-to-roll method.

As would be understood by those of ordinary skill in the art, the term roll-to-roll, as applied to the processing of a fiber or textile, means a process that is performed when the fiber or textile is in an unspooled format as it moves from distributing spool or roll to a collecting spool or roll. In some embodiments, several continuous processing steps may be performed serially in production of a fiber composite or textile composite, forming a single roll-to-roll process. In some embodiments, several continuous processing steps may be performed serially in production of a fiber composite or textile composite, forming a single continuous process wherein the feed of fiber or textile to the process is continuous. Without wishing to be bound by any particular theory, it is believed that lower tension increases the space between strands of a multi-stranded fiber or textile comprising a multi-stranded fiber and thus increases the amount of polymer-aerogel-precursor solution that can be applied to the fiber or textile.

In certain embodiments, a fiber or textile is pre-conditioned via any of a number of combinations of pre-conditioning processes described herein. In a non-limiting illustrative embodiment, a multi-stranded, mechanically-textured polyamide fiber is selected and treated with a chemical etching process. The fiber is then exposed to an atmosphere of N-methyl-2-pyrolidone vapor, which swells the fiber. The fiber is then wound with a controlled tension onto a spool. The spool of fiber is then contacted with polymer-aerogel-precursor solution.

In certain embodiments, the fiber or textile is not pre-conditioned prior to exposing the fiber or textile to the liquid solution comprising polymer-aerogel-precursor.

In some embodiments, a fiber or textile is wound on a spool, and externally covered with a layer of a cover fiber, fabric, sheet, or other suitable cover layer material. This cover material is applied to the fiber-wound or textile-wound spool prior to gelation of the polymer-aerogel-precursor solution, either prior to or subsequent to the introduction of the fiber or textile spool to the polymer-aerogel-precursor solution. In certain embodiments, this cover layer prevents uneven and/or excess loading of polymer gel precursor over the exterior of the fiber or textile spool, e.g., reduces the adhesion of bulk and/or excess loading of gel to the outer layer of the fiber or textile spool.

Figure 11:
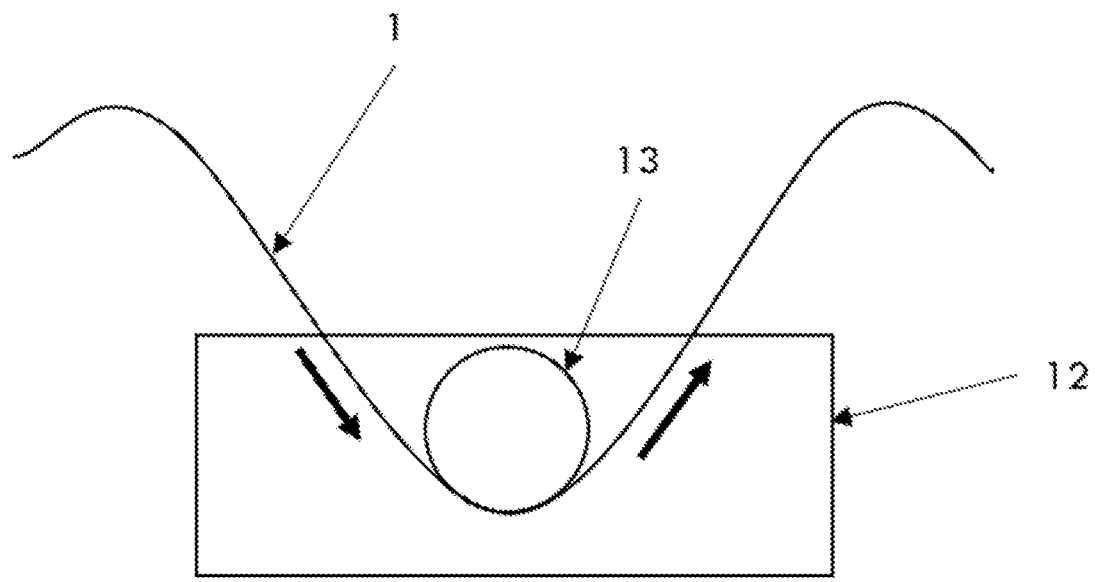
FIG. 11 depicts a method of infiltrating a fiber with a liquid solution comprising polymer-aerogel-precursor in a continuous or semi-continuous manner in accordance with some embodiments.
Figure 30:
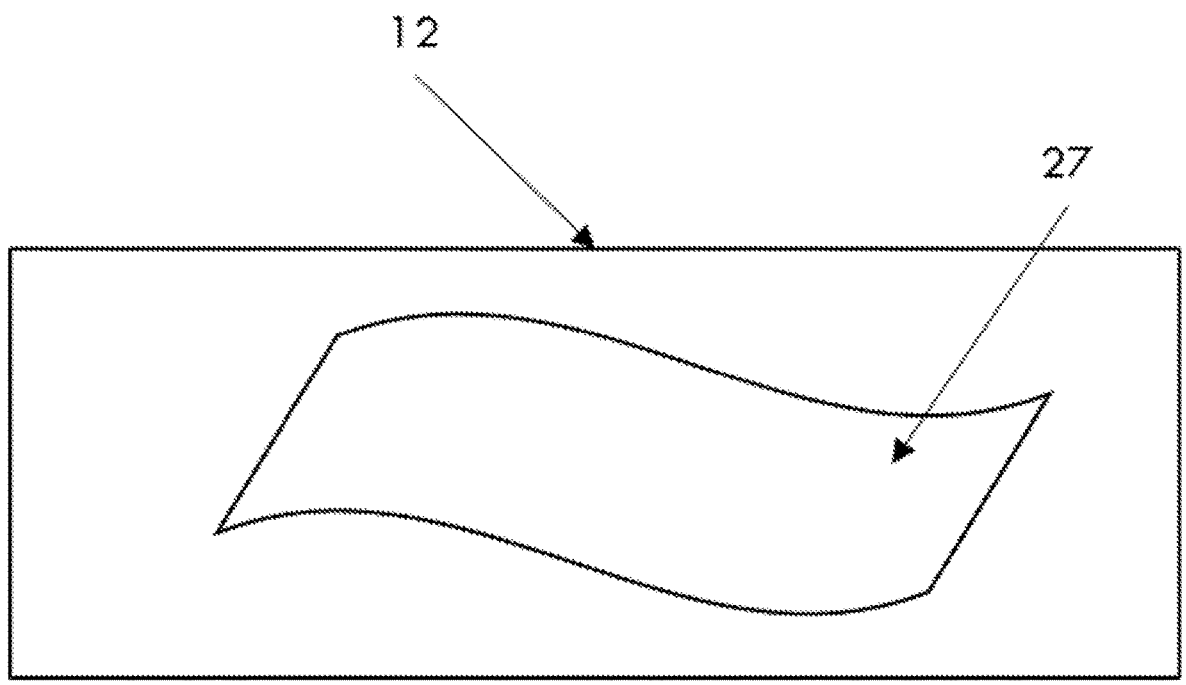
FIG. 30 depicts a method of infiltrating a pre-constructed garment by submerging or partially submerging the garment in a liquid solution comprising polymer-aerogel-precursor in accordance with some embodiments.
Figure 31:
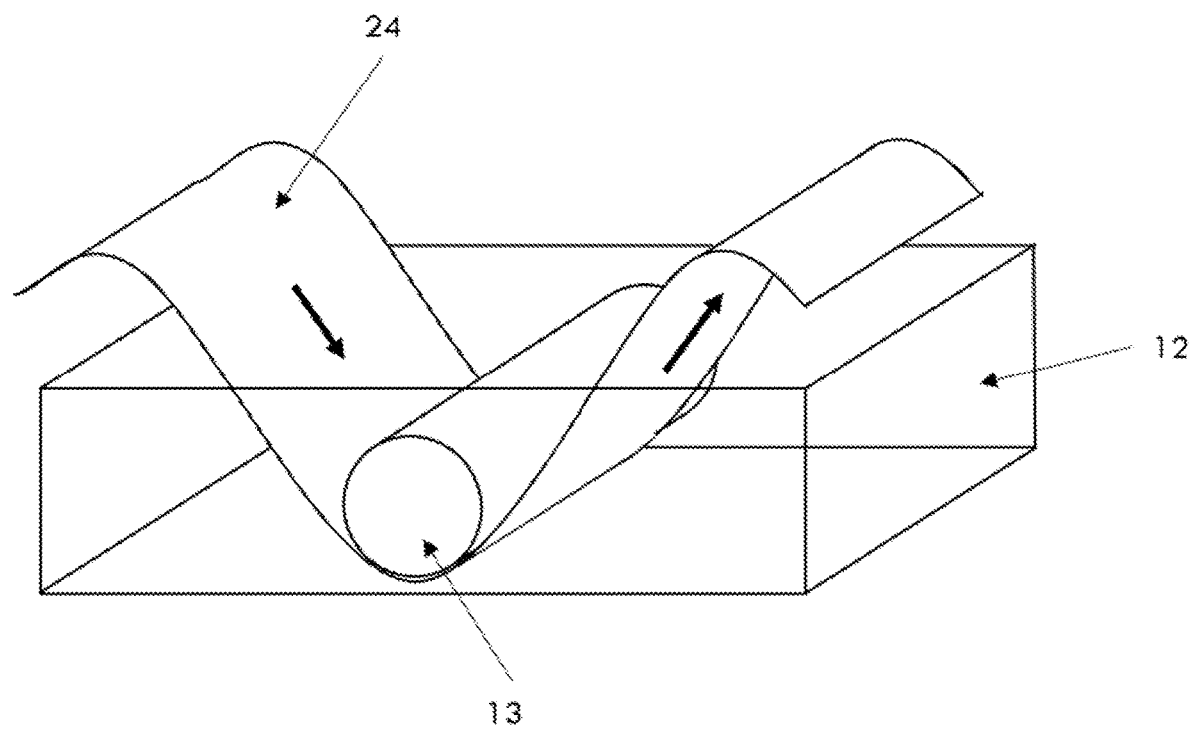
FIG. 31 depicts a method of infiltrating a textile with a liquid solution comprising polymer-aerogel-precursor in a continuous or semi-continuous process in accordance with some embodiments.

In some embodiments, a fiber is exposed to a liquid solution comprising polymer-aerogel-precursor. For example, as shown in FIG. 11 a fiber (1) is exposed to a polymer-aerogel-precursor solution (12). In some embodiments, a textile is exposed to a liquid solution comprising polymer-aerogel-precursor. For example, as shown in FIG. 31 a textile (24) is exposed to a polymer-aerogel-precursor solution (12). In some embodiments, a textile comprising a pre-constructed garment is exposed to the polymer-aerogel-precursor solution. For example, as shown in FIG. 30, a textile comprising a pre-constructed garment (27) is exposed to a liquid solution comprising polymer-aerogel-precursor (12). In certain embodiments, the polymer-aerogel-precursor solution wets the fiber or textile to some degree. In some embodiments, the solution wets the fiber or textile via capillarity-driven wetting. In some embodiments, a driving force is applied to improve wetting of the fiber by the solution. In certain embodiments, the driving force comprises increased or reduced gas pressure. This pressure may be varied throughout the process and can involve pressures that are less than or equal to 760 torr, greater than 760 torr, between 700 torr and 760 torr, between 760 torr and 1000 torr, between 1 torr and 760 torr, between 760 torr and 2000 torr, or any suitable pressure. In certain embodiments, the wetting of the fiber or textile may be driven by pumping the polymer-aerogel-precursor solution onto and/or through the fiber or textile.

In general, polymer aerogel materials may be made from a precursor, such as a gel. As provided herein, a gel may be a colloidal system in which a nanoporous, nanostructured solid network spans the volume occupied by a liquid medium. Accordingly, gels may have two components: a sponge-like solid skeleton that gives the gel its solid-like cohesiveness, and liquid that permeates the pores of that skeleton. In some embodiments, the polymer aerogel is derived from a polymer gel.

Gels of different compositions may be synthesized through a number of methods, which may comprise a sol-gel process. The sol-gel process involves the production of sol, or colloidal suspension of very small solid particles in a continuous liquid medium, where nanostructures (e.g., nanoparticles, nanotubes, nanoplatelettes, graphene, nanophase oligomers or polymer aggregates) form the solid particles dispersed in the liquid medium. The very small solid particles may be formed in situ or formed ex situ and dispersed in the liquid. The sol-gel process also involves causing the nanostructures in the sol to interconnect (e.g., through covalent or ionic bonding, polymerization, physisorption, or other mechanisms) to form a 3D network, forming a gel.

In some embodiments, a fiber or textile is provided. In certain embodiments, the fiber or textile is contacted with a polymer-aerogel-precursor solution. In certain embodiments, the liquid-phase polymer-aerogel-precursor solution forms a gel material on, around, and/or within the fiber or textile to form a polymer-gel/fiber or polymer-gel/textile composite, respectively. In some embodiments, the polymer-aerogel composite is derived from a polymer-gel composite. In certain embodiments, the polymer-gel/fiber or polymer-gel/textile composite is subjected to a drying step using any suitable drying method in order to form a polymer-aerogel/fiber or polymer-aerogel/textile composite, respectively.

In some embodiments, the polymer aerogel material in a fiber composite comprises a polyimide. For example, as shown in FIG. 1 the aerogel (2) in a fiber composite may comprise polyimide. In some embodiments, the polymer aerogel material in a textile composite comprises a polyimide. For example, as shown in FIG. 25B the aerogel (2) in a textile composite may comprise polyimide. In some embodiments, a fiber or textile is provided. In certain embodiments, the fiber or textile is contacted with a polyimide-aerogel-precursor solution. In certain embodiments, the liquid-phase polyimide-aerogel-precursor solution forms a gel material on, around, and/or within the fiber or textile to form a polymer-gel/fiber or polymer-gel/textile composite, respectively. In some embodiments, the polymer-gel/fiber or polymer-gel/textile composite may be imidized to form a polyimide-gel/fiber or polyimide-gel/textile composite. In some embodiments, the polyimide-aerogel composite is derived from a polyimide-gel composite. In certain embodiments, the polyimide-gel/fiber or polyimide-gel/textile composite is subjected to a drying step using any suitable drying method in order to form a polyimide-aerogel/fiber or polyimide-aerogel/textile composite, respectively. In some embodiments, a polymer-gel/fiber composite comprises a polyimide gel. For example, in FIG. 15A, FIG. 15B, FIG. 15C, and FIG. 15D the polymer-gel (28) in the polymer-gel/fiber composite may comprise a polyimide gel. In some embodiments, a polymer-aerogel/fiber composite comprises a polyimide aerogel.

In some embodiments, the polyimide gel is derived from the reaction of one or more amines with one or more anhydrides. Suitable amines may include those listed below and elsewhere herein. Suitable anhydrides may include those listed below and elsewhere herein. In some embodiments, the anhydride and the amine are contacted in a suitable solvent. Suitable solvents may include those listed below and elsewhere herein. In some embodiments, the amine and anhydride react to form a polyamic acid that is then imidized to form a polyimide. In certain embodiments, the polyamic acid is chemically imidized. In some embodiments, the polyamic acid is thermally imidized.

In some embodiments, the polyimide gel is derived from the reaction of one or more anhydrides with one or more isocyanates. In some embodiments, the anhydride comprises a dianhydride. In some embodiments, the isocyanate comprises a diisocyanate, a triisocyanate, trisisocyanatophenylmethane, a toluene diisocyanate trimer, and/or methylenediphenyldiisocyanate trimer. In some embodiments, the anhydride and isocyanate are contacted in a suitable solvent.

In some embodiments, the polyimide gel is derived from norbornene-capped bisnadimide oligomers.

In some embodiments, the polyimide gel is derived from a poly(amic acid) ammonium salt. The poly(amic acid) salt is produced by reacting a diamine and a dianhydride in a suitable solvent to make a poly(amic acid) solution; pouring said poly(amic acid) solution into deionized water; washing, drying, and crushing the resulting deposit to make a poly(amic acid) powder; and reacting the poly(amic acid) powder with an imidization catalyst in deionized water until homogeneous and transparent. The resulting suspension can then be frozen, and subsequently dried for 24-36 hours using a lyophilizer. After lyophilization the dry gel may be heated for 1 hour at 100° C. 120° C., 150° C., 0.5 hours at 180° C., 0.25 hours at 250° C. or 300° C.

In some embodiments, the anhydride comprises an aromatic dianhydride; an aromatic trianhydride; an aromatic tetraanhydride; an aromatic anhydride having between 6 and 24 carbon atoms and between 1 and 4 aromatic rings which may be fused, coupled by biaryl bonds, or linked by one or more linking groups selected from C1-6 alkylene, oxygen, sulfur, keto, sulfoxide, sulfone and the like; biphenyl-3,3', 4,4'-tetracarboxylic dianhydride (BPDA); 3,3',4,4'-biphenyl tetracarboxylic dianhydride; 2,3,3',4'-biphenyl tetracarboxylic acid dianhydride (a-BPDA); 2,2',3,3'-biphenyl tetracarboxylic dianhydride; 3,3',4,4'-benzophenone-tetracarboxylic dianhydride; benzophenone-3,3',4,4'-tetracarboxylic dianhydride (BTDA); pyromellitic dianhydride; 4,4'-hexafluoro isopropylidenebisphthalic dianhydride (6FDA); 4,4'-(4,4'-isopropylidene diphenoxy)-bis(phthalic anhydride); 4,4'-oxydiphthalic anhydride (ODPA); 4,4'-oxydiphthalic dianhydride; 3,3',4,4'-diphenylsulfonetetracarboxylic dianhydride (DSDA); hydroquinone dianhydride; hydroquinone diphthalic anhydride (HQDEA); 4,4'-bisphenol A dianhydride (BPADA); ethylene glycol bis(trimellitic anhydride) (TMEG); 2,2-bis(3,4-dicarboxyphenyl)propanedianhydride;

bis(3,4-dicarboxyphenyl)sulfoxide dianhydride; poly(siloxane-containing dianhydride); 2,3,2',3'-benzophenone tetracarboxylic dianhydride; 3,3',4,4'-benzophenone tetracarboxylic dianhydride; naphthalene-2,3,6,7-tetracarboxylic dianhydride; naphthalene-1,4,5,8-tetracarboxylic dianhydride; 3,3',4,4'-biphenylsulfone tetracarboxylic dianhydride; 3,4,9,10-perylene tetracarboxylic dianhydride; bis(3,4-dicarboxyphenyl)sulfide dianhydride; bis(3,4-dicarboxyphenyl)methane dianhydride; 2,2-bis(3,4-dicarboxyphenyl)propane dianhydride; 2,2-bis(3,4-dicarboxyphenyl) hexafluoropropene; 2,6-dichloro naphthalene 1,4,5,8-tetracarboxylic dianhydride; 2,7-dichloronaphthalene-1,4,5,8-tetracarboxylic dianhydride; 2,3,6,7-tetrachloronaphthalene-1,4,5,8-tetracarboxylic dianhydride; phenanthrene-8,9,10-tetracarboxylic dianhydride; pyrazine-2,3,5,6-tetracarboxylic dianhydride; benzene-1,2,3,4-tetracarboxylic dianhydride; and/or thiophene-2,3,4,5-tetracarboxylic dianhydride.

In some preferred embodiments, the anhydride comprises biphenyl-3,3',4,4'-tetracarboxylic dianhydride (BPDA).

In some embodiments, the amine comprises 3,4'-oxydianiline (3,4-ODA); 4,4'-oxydianiline (4,4-ODA or ODA); p-phenylene diamine (pPDA); m-phenylene diamine (mPDA); p-phenylene diamine (mPDA); 2,2'-dimethylbenzidine (DMBZ); 4,4'-bis(4-aminophenoxy)biphenyl; 2,2'-bis [4-(4-aminophenoxyl)phenyl]propane; bisaniline-p-xylidene (BAX); 4,4'-methylene dianiline (MDA); 4,4'-[1,3-phenylenebis(1-methyl-ethylidene)]bisaniline (bisaniline-m); 4,4'-[1,4-phenylenebis(1-methyl-ethylidene)|bisaniline (bisaniline-p); 3,3'-dimethyl-4,4'-diaminobiphenyl (o-tolidine); 2,2-bis [4-(4-aminophenoxy)phenyl] propane (BAPP); 3,3'-dihydroxy-4,4'-diamino-biphenyl (HAB); 3,3'-diaminodiphenyl sulfone (3,3'-DDS); 4,4'-diaminodiphenyl sulfone (4,4'-DDS); 4,4'-diaminodiphenyl sulfide (ASD); 2,2-bis [4-(4-aminophenoxy) phenyl]sulfone (BAPS); 2,2-bis[4-(3-aminophenoxy) benzene] (m-BAPS); 1,4-bis(4-aminophenoxy) benzene (TPE-Q); 1,3-bis(4-aminophenoxy) benzene (TPE-R); 1,3'-bis(3-aminophenoxy) benzene (APB-133); 4,4'-bis(4-aminophenoxy) biphenyl (BAPB); 4,4'-diaminobenzanilide (DABA); 9,9'-bis(4-aminophenyl) fluorene (FDA); o-tolidine sulfone (TSN); methelenebis (anthranilic acid) (MBAA); 1,3'-bis(4-aminophenoxy)-2,2-dimethylpropane (DANPG); 2,3,5,6-tetramethyl-1,4-phenylenediamine (TMPD); 3,3',5,5'-tetramethylbenzidine (3355TMB); 1,5-bis(4-aminophenoxy) pentane (DA5MG); 2,5-diaminobenzotrifluoride (25DBTF); 3,5-diaminobenzotrifluoride (35DBTF); 1,3-diamino-2,4,5,6-tetrafluorobenzene (DTFB); 2,2'-bis(trifluoromethyl)benzidine (22TFMB); 3,3'-bis(trifluoromethyl)benzidine (33TFMB); 2,2-bis[4-(4-aminophenoxy phenyl)]hexafluoropropane (HFBAPP); 2,2-bis(4-aminophenyl)hexafluoropropane (Bis-A-AF); 2,2-bis(3-amino-4-hydroxyphenyl)hexafluoropropane (Bis-AP-AF); 2,2-bis(3-amino-4-methylphenyl) hexafluoropropane (Bis-AT-AF); o-phenylene diamine; diaminobenzanilide; 3,5-diaminobenzoic acid; 3,3'diaminodiphenylsulfone; 4,4'-diaminodiphenylsulfone; 1,3-bis-(4-aminophenoxy)benzene; 1,3-bis(3-aminophenoxy)benzene; 1,4-bis(4aminophenoxy)benzene; 1,4-bis(3-aminophenoxy) benzene; 2,2-bis[4-(4-aminophenoxy)phenyl]hexafluoropropane; 2,2-bis(3-aminophenyl)hexafluoropropane; 4,4'-isopropylidenedianiline; 1-(4-aminophenoxy)-3-(3-aminophenoxy)benzene; 1-(4-aminophenoxy)-4-(3-aminophenoxy)benzene; bis[4-(4aminophenoxy)phenyl] sulfone; bis[4-(3-aminophenoxy)phenyl]sulfone; bis(4-[4-aminophenoxyphenyl)ether; 2,2'-bis(4-aminophenyl) hexafluoropropene; 2,2'-bis(4-phenoxyaniline) isopropylidene; 1,2-diaminobenzene; 4,4'-diaminodiphenylmethane; 2,2-bis(4-aminophenyl)propane; 4,4'-diaminodiphenylpropane; 4,4'-diaminodiphenylsulfide; 4,4-diaminodiphenylsulfone; 3,4'-diaminodiphenylether; 4,4'-diaminodiphenylether; 2,6-diaminopyridine; bis(3-aminophenyl)diethylsilane; 4,4'-diaminodiphenyldiethylsilane; benzidine-3'-dichlorobenzidine; 3,3'-dimethoxybenzidine; 4,4'-diaminobenzophenone; N,N-bis(4-aminophenyl) butylamine; N,N-bis(4-aminophenyl)methylamine; 1,5-diaminonaphthalene; 3,3'-dimethyl-4,4'-diaminobiphenyl; 4-aminophenyl-3-aminobenzoate; N,N-bis(4-aminophenyl) aniline; bis(p-beta-amino tert-butyl phenyl)ether; p-bis-2-(2-methyl-4-aminopentyl)benzene; p-bis(1,1-dimethyl-5-aminopentyl)benzene; 1,3-bis(4-aminophenoxy)benzene; m-xylene diamine; p-xylene diamine; 4,4'-diamino diphenylether phosphine oxide; 4,4'-diamino diphenyl N-methylamine; 4,4'-diamino diphenyl N-phenylamine; amino-terminal polydimethylsiloxanes; amino-terminal polypropylene oxides; amino-terminal polybutylene oxides; 4,4'-methylene bis(2-methyl cyclohexylamine); 1,2-diaminocthane; 1,3-diaminopropane; 1,4-diaminobutane; 1,5-diaminopentane; 1,6-diaminohexane; 1,7-diaminoheptane; 1,8-diaminooctane; 1,9-diaminononane; 1,10-diaminodecane; 4,4'-methylene bis(benzencamine); 2,2'-dimethyl benzidine; bisaniline-p-xylidene; 4,4'-bis(4-aminophenoxy)biphenyl; 3,3'-bis(4-aminophenoxy)biphenyl; 4,4'-(1,4-phenylene diisopropylidene)bisaniline; and/or 4,4'-(1,3-phenylene diisopropylidene)bisaniline, In some preferred embodiments, the amine comprises 4,4'-oxydianiline (4,4-ODA or ODA), 2,2'-dimethylbenzidine (DMBZ), and/or 4,4'-[1,3-phenylenebis(1-methyl-ethylidene)|bisaniline (bisaniline-m).

In some embodiments, the isocyanate comprises a triisocyanate; an aliphatic triisocyanate; an aromatic isocyanate comprising three or more isocyanate groups; an aromatic triisocyanate; a triisocyanate based on hexamethylene diisocyanate; the trimer of hexamethylene diisocyanate; hexamethylenediisocyanate; a triisocyanate comprising isocyanurate; a diisocyanate comprising isocyanurate; Desmodur® N3200; Desmodur N3300; Desmodur N100; Desmodur N3400; Desmodur N3390; Desmodur N3390 BA/SN; Desmodur N3300 BA; Desmodur N3600; Desmodur N3790 BA; Desmodur N3800; Desmodur N3900; Desmodur XP 2675; Desmodur blulogiq 3190; Desmodur XP 2860; Desmodur N3400; Desmodur XP 2840; Desmodur N3580 BA; Desmodur N3500; Desmodur RE; tris(isocyanatophenyl) methane; Desmodur RC; Mondur® MR; Mondur MRS; a methylene diphenyl diisocyanate; diphenylmethane 2,2'-, 2,4'- and/or 4,4'-diisocyanate (MDI); naphthylene 1,5-diisocyanate (NDI); a toluene diisocyanate; toluene 2,4- and/or 2,6-diisocyanate (TDI); 3,3'-dimethylbiphenyl diisocyanate; 1,2-diphenylethane diisocyanate and/or p-phenylene diisocyanate (PPDI); trimethylene, tetramethylene, pentamethylene, hexamethylene, heptamethylene and/or octamethylene diisocyanate; 2-methylpentamethylene 1,5-diisocyanate; 2-ethylbutylene 1,4-diisocyanate; pentamethylene 1,5-diisocyanate; butylene 1,4-diisocyanate; 1-isocyanato-3,3,5-trimethyl-5-isocyanatomethylcyclohexane (isophorone diisocyanate, IPDI); 1,4- and/or 1,3-bis(isocyanatomethyl) cyclohexane (HXDI); cyclohexane 1,4-diisocyanate; 1-methylcyclohexane 2,4-diisocyanate; 1-methylcyclohexane 2,6-diisocyanate; dicyclohexylmethane 4,4'-diisocyanate; dicyclohexylmethane 2,4'-diisocyanate; and/or dicyclohexylmethane 2,2'-diisocyanate.

In some embodiments, the polyimide gel is derived from the reaction of an amine with an anhydride. In some embodiments, the reaction of amine and anhydride forms poly(amic acid) oligomers. In some embodiments the poly(amic acid)

oligomers are chemically imidized to yield polyimide oligomers. In some embodiments chemical imidization is achieved by contacting the poly(amic acid) oligomer with a dehydrating agent. In some embodiments the dehydrating agent comprises acetic anhydride, propionic anhydride, n-butyric anhydride, benzoic anhydride, trifluoroacetic anhydride, phosphorous trichloride, and/or dicyclohexylcarbodiimide. In some embodiments chemical imidization is catalyzed by contacting the solution comprised of poly(amic acid) oligomers and dehydrating agent(s) with an imidization catalyst.

In some embodiments the imidization catalyst comprises pyridine; a methylpyridine; quinoline; osoquinoline; 1,8-diazabicyclo[5.4.0]undec-7-ene (DBU); DBU phenol salts; carboxylic acid salts of DBU; triethylenediamine; a carboxylic acid salt of triethylenediamine; lutidine; n-methylmorpholine; triethylamine; tripropylamine; tributylamine; N,N-dimethylbenzylamino; N,N'-dimethylpiperazine; N,N-dimethylcyclohexylamine; N,N',N"-tris(dialkylaminoalkyl)-s-hexahydrotriazines, for example N,N',N"-tris(dimethylaminopropyl)-s-hexahydrotriazine; tris(dimethylaminomethyl)phenol; bis(2-dimethylaminoethyl) ether; N,N,N,N,N-pentamethyldiethylenetriamine; methylimidazole; dimethylimidazole; dimethylbenzylamine; 1,6-diazabicyclo[5.4.0]undec-7-ene (IUPAC: 1,4-diazabicyclo[2.2.2]octane); triethylenediamine; dimethylaminoethanolamine; dimethylaminopropylamine; N,N-dimethylaminoethoxyethanol; N,N,N-trimethylaminoethylethanolamine; triethanolamine; diethanolamine; triisopropanolamine; diisopropanolamine; and/or any suitable trialkylamine.

In some embodiments, the polyimide gel is derived from the reaction of an amine with an anhydride. In some embodiments, the reaction of amine and anhydride forms poly(amic acid) oligomers. In some embodiments the poly(amic acid) oligomers are thermally imidized to yield polyimide oligomers. In some embodiments, the poly(amic acid) oligomers are heated to a temperature of greater than 80° C., greater than 90° C., greater than 100° C., greater than 150° C., greater than 180° C., greater than 190° C., or any suitable temperature.

In some embodiments, the diamine and/or dianhydride may be selected based on commercial availability and/or price. In some embodiments, the diamine and/or dianhydride may be selected based on desired material properties. In some embodiments, a specific diamine and/or dianhydride may impart specific properties to the polymer. For example, in some embodiments, diamines and/or dianhydrides with flexible linking groups between phenyl groups can be used to make polyimide aerogels with increased flexibility. In some embodiments, diamines and/or dianhydrides comprising pendant methyl groups can be used to make polyimide aerogels with increased hydrophobicity. In other embodiments, diamines and/or dianhydrides comprising fluorinated moieties such as trifluormethyl can be used to make polyimide aerogels with increased hydrophobicity.

In some embodiments, two or more diamines and/or two or more dianhydrides are used. In an illustrative embodiment, two diamines are used. The mole percent of the first diamine relative to the total of the two diamines can be varied from 0% to 100%. The mole percent of the first diamine relative to the total of the two diamines comprises, in some embodiments, less than 100%, less than 90%, less than 80%, less than 70%, less than 60%, less than 50%, less than 40%, less than 30%, less than 20%, less than 10%, or 0%. In further embodiments, wherein more than two diamines are used, the mole percent of each diamine relative to the total diamines can be varied from 0% to 100%. In a further illustrative example, two dianhydrides are used. The mole percent of the first dianhydride relative to the total of the two dianhydrides can be varied from 0% to 100%. The mole percent of the first dianhydride relative to the total of the two dianhydrides comprises less than 100%, less than 90%, less than 80%, less than 70%, less than 60%, less than 50%, less than 40%, less than 30%, less than 20%, less than 10%, or 0%. In further embodiments, wherein more than two dianhydrides are used, the mole percent of each dianhydride relative to the total dianhydride can be varied from 0% to 100%.

In some embodiments, multiple diamines are used. In some embodiments, the first diamine is added to the solvent, after which the dianhydride is then added. In some embodiments, each amino site on the diamine reacts with an anhydride site on different dianhydrides, such that anhydride-terminated oligomers are formed. In some embodiments, a second diamine is then added to the solution. These diamines react with terminal anhydrides on the oligomers in solution, forming longer amino-terminated oligomers. Oligomers of varying lengths result from such a process, and an alternating motif of first diamine, then dianhydride, then second diamine, results. In some embodiments, three diamines are used. In some embodiments the first diamine is reacted with approximately one half of the total dianhydride. In some embodiments the second diamine is then added to the solution, followed by the remainder of the dianhydride, and finally, the third diamine. Without wishing to be bound by any particular theory, it is believed that this approach encourages spatial homogeneity of properties throughout the gel network, where simply mixing all monomers together simultaneously and allowing dianhydrides and diamines to react with other simultaneously at random may lead to phase segregation of domains rich in one particular diamine and/or spatial heterogeneity.

In some embodiments, the weight percent polymer in solution is controlled during polymer gel synthesis. The term weight percent polymer in solution refers to the weight of monomers in solution minus the weight of byproducts resulting from condensation reactions among the monomers, relative to the weight of the solution. The weight percent polymer in solution can be less than 1%, less than 2%, less than 3%, less than 4%, less than 5%, less than 6%, less than 7%, less than 8%, less than 9%, less than 10%, less than 12%, less than 14%, less than 16%, less than 18%, less than 20%, and/or between 20% and 30%. In some preferred embodiments, the weight percent polymer is between 5% and 15%.

In some embodiments, the reaction of diamine and dianhydride produces an oligomer comprising a repeating unit of at least a diamine and a dianhydride. In some embodiments, the oligomer comprises 1 repeat unit, less than 2 repeat units, less than 5 repeat units, less than 10 repeat units, less than 20 repeat units, less than 30 repeat units, less than 40 repeat units, less than 50 repeat units, less than 60 repeat units, less than 80 repeat units, less than 100 repeat units, or less than 200 repeat units. In some embodiments, the oligomer has an average degree of polymerization of less than 10, less than 20, less than 30, less than 40, less than 60, less than 80, or less than 100. In some embodiments, the oligomer comprises terminal anhydride groups, i.e., both ends of the oligomer comprise a terminal anhydride group. In some embodiments, the oligomer comprises terminal amine groups, i.e., both ends of the oligomer comprise a terminal amine group.

In some embodiments, the oligomers are crosslinked by a crosslinking agent. In some embodiments, the terminal end group on the oligomer reacts with a polyfunctional crosslinking agent, which then reacts with the terminal end group on at least one other oligomer. In some embodiments, the crosslinking agent comprises a triamine; an aliphatic triamine; an aromatic amine comprising three or more amine groups; an aromatic triamine; 1,3,5-tris(aminophenoxy)benzene (TAB); tris(4-aminophenyl)methane (TAPM); tris(4-aminophenyl)benzene (TAPB); tris(4-aminophenyl)amine (TAPA); 2,4,6-tris(4-aminophenyl)pyridine (TAPP); 4,4',4"-methanetriyltrianiline; N,N,N',N'-tetrakis(4-aminophenyl)-1,4-phenylenediamine; a polyoxypropylenetriamine; N',N'-bis(4-aminophenyl)benzene-1,4-diamine; a triisocyanate; an aliphatic triisocyanate; an aromatic isocyanate comprising three or more isocyanate groups; an aromatic triisocyanate; a triisocyanate based on hexamethylene diisocyanate; the trimer of hexamethylene diisocyanate; hexamethylenediisocyanate; a polyisocyanate; a polyisocyanate comprising isocyanurate; Desmodur® N3200; Desmodur N3300; Desmodur N100; Desmodur N3400; Desmodur N3390; Desmodur N3390 BA/SN; Desmodur N3300 BA; Desmodur N3600; Desmodur N3790 BA; Desmodur N3800; Desmodur N3900; Desmodur XP 2675; Desmodur blulogiq 3190; Desmodur XP 2860; Desmodur N3400; Desmodur XP 2840; Desmodur N3580 BA; Desmodur N3500; Desmodur RE; tris(isocyanatophenyl)methane; Desmodur RC; Mondur® MR; Mondur MRS; a methylene diphenyl diisocyanate; diphenylmethane 2,2'-, 2,4'- and/or 4,4'-diisocyanate (MDI); naphthylene 1,5-diisocyanate (NDI); a toluene diisocyanate; toluene 2,4- and/or 2,6-diisocyanate (TDI); 3,3'-dimethylbiphenyl diisocyanate; 1,2-diphenylethane diisocyanate and/or p-phenylene diisocyanate (PPDI); trimethylene, tetramethylene, pentamethylene, hexamethylene, heptamethylene, and/or octamethylene diisocyanate; 2-methylpentamethylene 1,5-diisocyanate; 2-ethylbutylene 1,4-diisocyanate; pentamethylene 1,5-diisocyanate; butylene 1,4-diisocyanate; 1-isocyanato-3,3,5-trimethyl-5-isocyanatomethylcyclohexane (isophorone diisocyanate, IPDI); 1,4- and/or 1,3-bis(isocyanatomethyl)cyclohexane (HXDI); cyclohexane 1,4-diisocyanate; 1-methylcyclohexane 2,4- and/or 2,6-diisocyanate; dicyclohexylmethane 4,4'-, 2,4'- and/or 2,2'-diisocyanate; octa(aminophenoxy)silsesquioxane (OAPS); 4,4-oxydianiline (ODA); (3-aminopropyl)triethoxysilane (APTES); modified graphene oxides (m-GO); 1,3,5-benzenetricarbonyl trichloride (BTC); poly(maleic anhydride) (PMA); and/or melamine.

In some embodiments, the reaction between amine and anhydride, and/or the chemical imidization, takes place in a solvent. In some embodiments, the solvent comprises dimethylsulfoxide; diethylsulfoxide; N,N-dimethylformamide; N,N-diethylformamide; N,N-dimethylacetamide; N,N-diethylacetamide; N-methyl-2-pyrrolidone; 1-methyl-2-pyrrolidinone; N-cyclohexyl-2-imidazolidinone; diethylene glycol dimethoxyether; o-dichlorobenzene; phenols; cresols; xylenol; catechol; butyrolactones; and/or hexamethylphosphoramides.

In some embodiments, the aerogel material in a polymer-aerogel/fiber composite comprises a polyurea aerogel. For example, as shown in FIG. 1 the aerogel (2) in a fiber composite may comprise polyurea. In some embodiments, the aerogel material in a polymer-aerogel/textile composite comprises a polyurea aerogel. For example, as shown in FIG. 25B the aerogel (2) in a textile composite may comprise polyurea. In some embodiments, the polyurea aerogel is derived from a polyurea gel.

In some embodiments, a polyurea gel is derived from the reaction of an isocyanate with water, in which amines are formed in situ. In some embodiments, the polyurea gel is derived from the reaction of an isocyanate with an amine. Suitable isocyanates may include those listed above and elsewhere herein. Suitable amines may include those listed above and elsewhere herein. In some embodiments, the polyurea gel comprises an aromatic group. In some embodiments, the polyurea gel comprises isocyanurate. In some embodiments, the polyurea gel comprises flame retardant moieties, e.g., bromides, bromates, phosphates.

In some embodiments, a monomer that polymerizes by radical-mediated polymerization is used to make the solid phase of a gel. In some embodiments, the monomer comprises acrylonitrile, methyl(methacrylate), styrene, 1,3-divinylbenzene, 1,3,5-trivinylbenzene, or any suitable monomer that polymerizes by radical-mediated polymerization.

In some embodiments, the solid phase of the gel comprises a polyisocyanate, a polyurea, a polyurethane, a polyisocyanurate, a polyimide, a polyamide, a polymer crosslinked oxide, a polybenzoxazine.

In some embodiments, the polymer aerogel in a polymer-aerogel/fiber composite comprises a polyurea, a polyurethane, a polyimide, a polyamide, a polymer crosslinked oxide, or a polybenzoxazine. For example, as shown in FIG. 1 the aerogel (2) in a fiber composite may comprise a polyurea, a polyurethane, a polyimide, a polyamide, a polymer crosslinked oxide, or a polybenzoxazine.

In some embodiments, the polymer aerogel in a polymer-aerogel/textile composite comprises a polyurea, a polyurethane, a polyimide, a polyamide, a polymer crosslinked oxide, or a polybenzoxazine. For example, as shown in FIG. 25B the aerogel (2) in a textile composite may comprise a polyurea, a polyurethane, a polyimide, a polyamide, a polymer crosslinked oxide, or a polybenzoxazine.

In some embodiments, the polymer aerogel (e.g., in the polymer-aerogel/fiber composite and/or the polymer-aerogel/textile composite) comprises a biopolymer. In some embodiments, the polymer aerogel comprises cellulose. In some embodiments, the cellulose aerogel is synthesized via the molten salt hydrate method. In some embodiments, the cellulose aerogel is derived from microcrystalline cellulose and/or nanocellulose. In some embodiments, the cellulose is rendered hydrophobic by treatment with a hydrophobe such as methyltrimethoxysilane, trimethylchlorosilane, hexamethyldisilazane, hexamethyldisiloxane, or another hydrophobe.

In some embodiments, the polymer aerogel (e.g., in the polymer-aerogel/fiber composite and/or the polymer-aerogel/textile composite) comprises a phenolic polymer. In some embodiments, the polymer aerogel comprises a condensation product of resorcinol, phenol, phloroglucionol, melamine, and/or cresol with formaldehyde.

In some embodiments, a polyol is used to make the solid phase of a gel material. In some preferred embodiments, the polyol comprises resorcinol, phloroglucinol, bisphenol A, tris(hydroxyphenyl)ethane, sulfonyldiphenol, dihydroxybenzonphenone, a polyether alcohol, ethylene glycol, propylene glycol, or another suitable polyol.

In some embodiments, solvents used to make polymer aerogel materials are used to make a gel material. In some embodiments, the solvent comprises a ketone; an aldehyde; an alkyl alkanoate; ethyl acetate; an amide such as formamide; N-methyl-2-pyrrolidone; a sulfoxide such as dimethyl sulfoxide; aliphatic halogenated hydrocarbons; cycloaliphatic halogenated hydrocarbons; halogenated aromatic compounds; and/or fluorinated ethers.

In some embodiments, an aldehyde and/or ketone solvent is used to make a gel material. In some embodiments, the solvent comprises acetaldehyde; propionaldehyde; n-butyraldehyde; isobutyraldehyde; 2-ethylbutyraldehyde; valeraldehyde; isopentaldehyde; 2-methylpentaldehyde; 2-ethylhexaldehyde; acrolein; methacrolein; crotonaldehyde; furfural; acrolein dimer; methacrolein dimer; 1,2,3,6-tetrahydrobenzaldehyde; 6-methyl-3-cyclohexencaldehyde; cyanacetaldehyde; ethyl glyoxylate; benzaldehyde; acetone; diethyl ketone; methyl ethyl ketone; methyl isobutyl ketone; methyl n-butyl ketone; ethyl isopropyl ketone; 2-acetylfuran; 2-methoxy-4-methylpentan-2-one; cyclohexanone; and/or acetophenone.

In some embodiments, an alkyl alkanoate solvent is used to make a gel material. In some embodiments, the solvent comprises methyl formate; methyl acetate; ethyl formate; butyl acetate; and/or ethyl acetate.

In some embodiments, an acetal solvent is used to make a gel material. In some embodiments, the solvent comprises diethoxymethane; dimethoxymethane; and/or 1,3-dioxolane.

In some embodiments, a dialkyl ether and/or a cyclic ether solvent is used to make a gel material. In some embodiments, the solvent comprises methyl ethyl ether; diethyl ether; methyl propyl ether; methyl isopropyl ether; propyl ethyl ether; ethyl isopropyl ether; dipropyl ether; propyl isopropyl ether; diisopropyl ether; methyl butyl ether; methyl isobutyl ether; methyl tert-butyl ether; ethyl n-butyl ether; ethyl isobutyl ether; and/or ethyl tert-butyl ether. In certain, although not necessarily all, embodiments, cyclic ether, especially tetrahydrofuran, dioxane, and/or tetrahydropyran, may be advantageous.

In some embodiments, a hydrocarbon solvent is used to make a gel material. In certain embodiments, the solvent comprises ethane; propane; n-butane; isobutane; n-pentane; isopentane; cyclopentane; neopentane; hexane; and/or cyclohexane.

In some embodiments, a fluorocarbon solvent is used to make a gel material. In certain embodiments, the solvent comprises difluoromethane; 1,2-difluoroethane; 1,1,1,4,4,4-hexafluorobutane; pentafluoroethane; 1,1,1,2-tetrafluoroethane; 1,1,2,2-tetrafluoroethane; pentafluorobutane and/or its isomers; tetrafluoropropane and/or its isomers; and/or pentafluoropropane and/or its isomers. Substantially fluorinated or perfluorinated (cyclo)alkanes having 2 to 10 carbon atoms may also be used.

In some embodiments, a chlorofluorocarbon solvent is used to make a gel material. In certain embodiments, the solvent comprises chlorodifluoromethane; 1,1-dichloro-2,2,2-trifluoroethane; 1,1-dichloro-1-fluoroethane; 1-chloro-1,1-difluoroethane; 1-chloro-2-fluoroethane; 1,1,1,2-tetrafluoro-2-chloroethane; trichlorofluoromethane; dichlorodifluoromethane; trichlorotrifluoroethane; tetrafluorodichloroethane; 1- and/or 2-chloropropane; dichloromethane; monochlorobenzene; and/or dichlorobenzene.

In some embodiments, a fluorine-containing ether solvent is used to make a gel material. In certain embodiments, the solvent comprises bis-(trifluoromethyl) ether; trifluoromethyldifluoromethyl ether; methyl fluoromethyl ether; methyl trifluoromethyl ether; bis(difluoromethyl) ether; fluoromethyldifluoromethyl ether; methyl difluoromethyl ether; bis (fluoromethyl) ether; 2,2,2-trifluoroethyl difluoromethyl ether; pentafluoroethyltrifluoromethyl ether; pentafluoroethyldifluoromethyl ether; 1,1,2,2-tetrafluoroethyldifluoromethyl ether; 1,2,2,2-tetrafluoroethylfluoromethyl ether; 1,2,2-trifluoroethyl difluoromethyl ether; 1,1-difluoroethyl methyl ether; and/or 1,1,1,3,3,3-hexafluoroprop-2-yl fluoromethyl ether.

Figure 12:
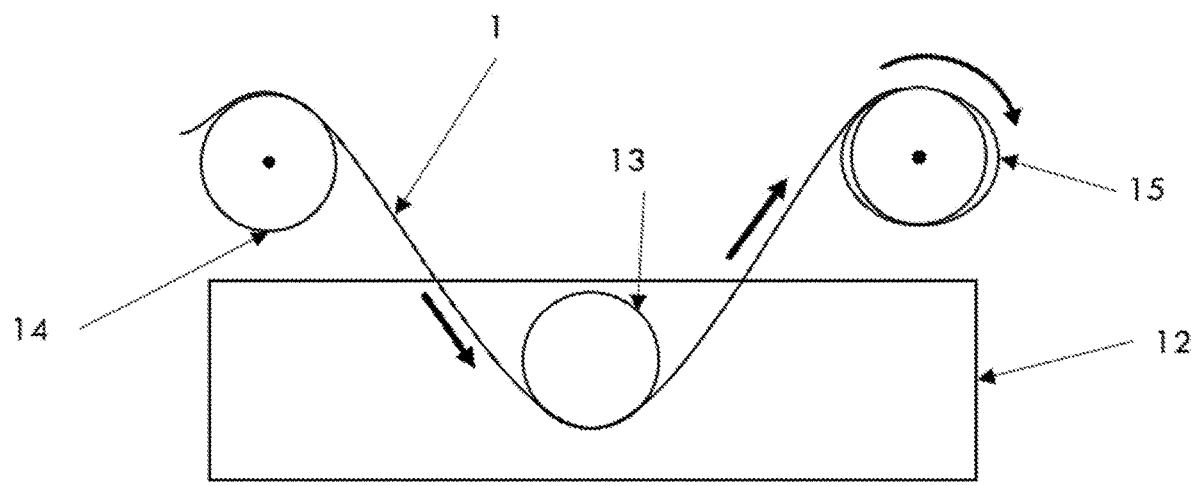
FIG. 12 depicts a method of infiltrating a fiber with a liquid solution comprising polymer-aerogel-precursor in a roll-to-roll fashion in accordance with some embodiments.
Figure 32:
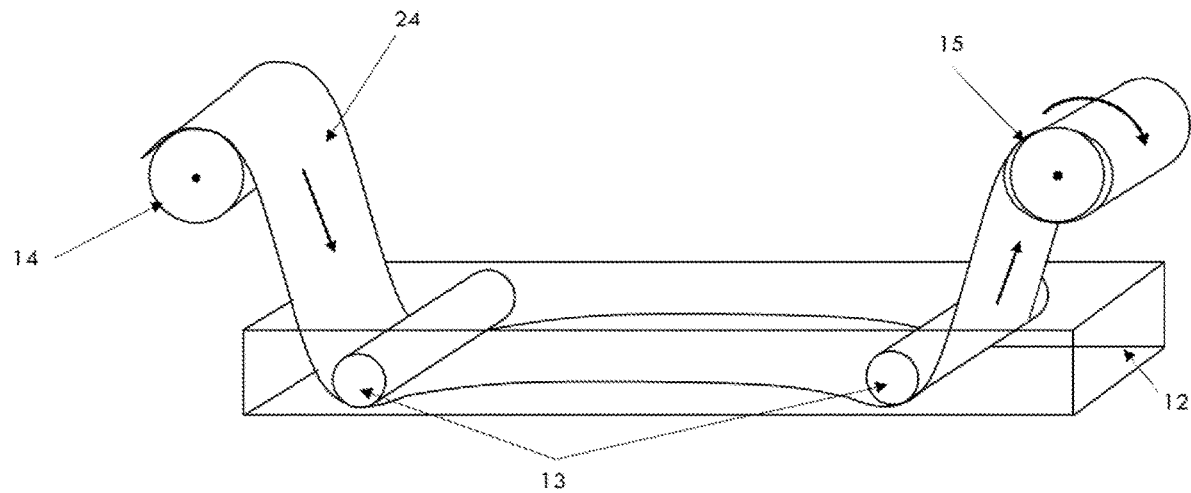
FIG. 32 depicts a method of infiltrating a textile with a liquid solution comprising polymer-aerogel-precursor in a roll-to-roll fashion in accordance with some embodiments.

In some embodiments, a fiber is exposed to a liquid solution comprising polymer-aerogel-precursor in a continuous process. For example, as shown in FIG. 11 a fiber (1) is moved through a bath of polymer-aerogel-precursor solution (12) in a continuous process. In certain embodiments, a fiber is exposed to a liquid solution comprising polymer-aerogel-precursor in a roll-to-roll fashion. For example, as shown in FIG. 12 a fiber (1) is moved through a bath of polymer-aerogel-precursor solution (12) from a sending roll or spool (14) to a receiving roll or spool (15) in a roll-to-roll process. In some embodiments, a textile is exposed to a liquid solution comprising polymer-aerogel-precursor in a continuous process. For example, as shown in FIG. 31 a textile (24) is moved through a bath of polymer-aerogel-precursor solution (12) in a continuous process. In certain embodiments, a textile is exposed to a liquid solution comprising polymer-aerogel-precursor in a roll-to-roll fashion. For example, as shown in FIG. 32 a textile (24) is moved through a bath of polymer-aerogel-precursor solution (12) from a sending roll or spool (14) to a receiving roll or spool (15) in a roll-to-roll process. In certain embodiments, the fiber or textile is exposed to a polymer-aerogel-precursor solution as the fiber or textile is moved through a bath of the polymer-aerogel-precursor solution. In some embodiments, movement of the fiber through the bath of the polymer-aerogel-precursor solution is conducted by unspooling the fiber or textile from one roll and spooling it onto another roll. In some embodiments, the fiber or textile is exposed to a polymer-aerogel-precursor solution by pouring and/or spraying the polymer-aerogel-precursor solution onto the fiber or textile. In some embodiments, the fiber or textile is exposed to a polymer-aerogel-precursor solution by submerging the fiber or textile in a bath of the polymer-aerogel-precursor solution. In certain embodiments, a polymer-aerogel-precursor solution is applied to a fiber or textile on a moving conveyor belt. In some embodiments, a combination of any of the above methods may be utilized. In some embodiments, a fiber or textile is exposed to a liquid solution comprising polymer-aerogel-precursor in a continuous process for less than 0.01 second, less than 0.05 seconds, less than 0.1 second, less than 0.5 seconds, less than 1 second, less than 5 seconds, less than 10 seconds, less than 15 seconds, less than 30 seconds, less than 1 minute, less than 5 minutes, less than 10 minutes, less than 30 minutes, or less than 1 hour. In some embodiments, a spool of fiber is exposed to a liquid solution comprising polymer-aerogel-precursor. For example, as shown in FIG. 10 a spool of fiber (10) is exposed to a bath of polymer-aerogel-precursor solution (12). In some embodiments, a spool of textile is exposed to a liquid solution comprising polymer-aerogel-precursor. For example, as shown in FIG. 30 a spool of textile (26) is exposed to a bath of polymer-aerogel-precursor solution (12). In some embodiments, the spool of fiber or textile is submerged in a bath of polymer-aerogel-precursor solution. In certain embodiments, the polymer-aerogel-precursor solution infiltrates the porosity of the fiber or textile spool by diffusion. In some embodiments, the spool is rotated while partially submerged in a bath of polymer-aerogel-precursor solution. In some embodiments, a spool of fiber or textile is submerged into a bath of the liquid-phase polymer-aerogel-precursor solution at ambient temperature and ambient pressure for a prescribed time, and then removed from the bath, after which a polymer gel forms within and/or on the fiber or textile. In some embodiments, the spool of fiber or textile is left in a bath of polymer-aerogel-precursor solution and not removed prior to gelation. In some embodiments, a spool of fiber or textile is sprayed with a polymer-aerogel-precursor solution. In some embodiments the polymer-aerogel-precursor solution is poured over the spool of fiber or textile. In some embodiments, polymer-aerogel-precursor solution is applied to the spool of fiber or textile using some combination of the aforementioned methods. In some embodiments, the spool of fiber or textile is exposed to a liquid solution comprising polymer-aerogel-precursor for less than 1 minute, less than 10 minutes, less than 15 minutes, less than 25 minutes, less than 35 minutes, less than 45 minutes, less than 1 hour, or less than 2 hours.

In certain embodiments, a single fiber is exposed to the polymer-aerogel-precursor solution. In some embodiments, multiple fibers in parallel are exposed to the polymer-aerogel-precursor solution, for example a tow of fibers. In some embodiments, a portion of a fiber or textile that is not on a spool, roll, core, beam, or carrier is exposed to the polymer-aerogel-precursor solution as it is being unwound from one spool, roll, core, beam, or carrier and wound onto a second spool, roll, core, beam, or carrier. In some embodiments, the unspooled portion of the fiber or textile is moved through a bath of polymer-aerogel-precursor solution. In some embodiments, the unspooled portion of the fiber or textile is sprayed with a polymer-aerogel-precursor solution. In some embodiments, a polymer-aerogel-precursor solution is poured over the unspooled portion of the fiber or textile. In some embodiments, polymer-aerogel-precursor solution is applied to the unspooled fiber or textile using some combination of the aforementioned spraying, bath, and pouring methods.

In some embodiments, a fiber or textile is exposed to a polymer-aerogel-precursor in a continuous process. In certain embodiments, a fiber or textile is exposed to a polymer-aerogel-precursor solution in a roll-to-roll fashion. In certain embodiments, a fiber or textile is unwound from a spool, roll, core, beam, or other carrier, exposed to a polymer-aerogel-precursor solution, and subsequently wound onto another spool, roll, core, beam, or carrier. In some embodiments, the tension in the unspooled portion of the fiber or textile is controlled to a specific value while it is contacted with the polymer-aerogel-precursor. In certain embodiments, controlling the tension of the fiber or textile allows for some control of the amount of porosity within the fiber or textile. In certain embodiments, the degree of tension affects the mass loading of polymer aerogel in a resulting polymer-aerogel/fiber or polymer-aerogel/textile composite. In some embodiments, the tension of the fiber or textile is controlled. In some embodiments, the tension of the fiber or textile is controlled after the fiber or textile has been contacted with a polymer-aerogel-precursor solution. In certain embodiments, the fiber or textile may then be wound onto a spool with controlled tension prior to gelation of the polymer-aerogel-precursor solution.

Figure 13:
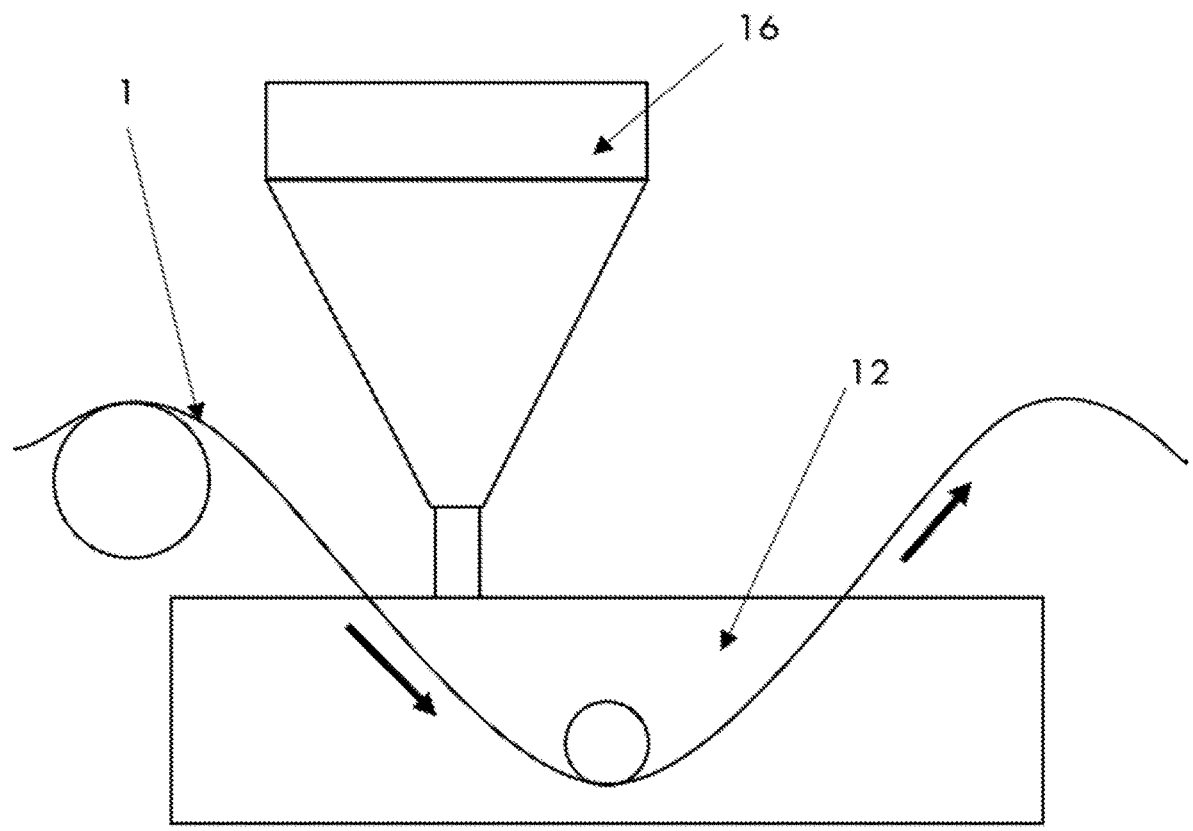
FIG. 13 depicts a method of infiltrating fiber with a liquid solution comprising polymer-aerogel-precursor wherein the liquid solution is prepared in a continuous or semi-continuous fashion in accordance with some embodiments.
Figure 33:
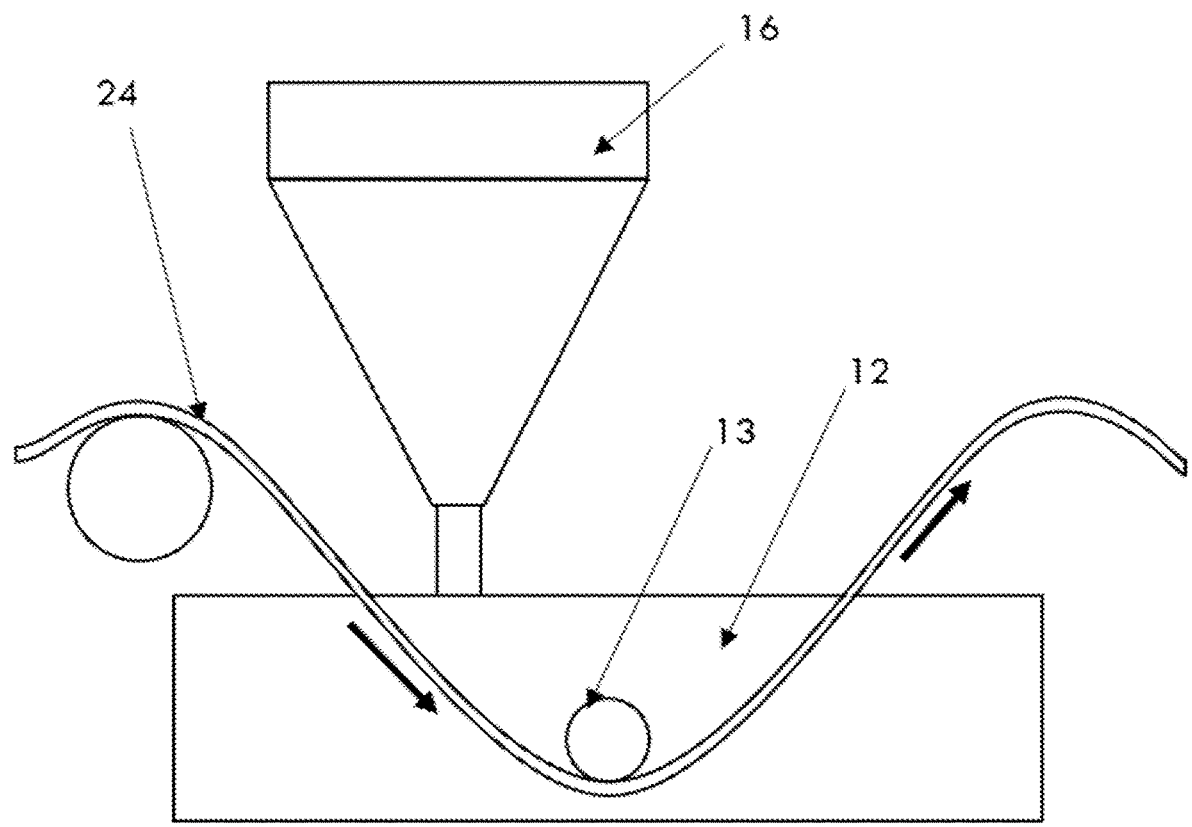
FIG. 33 depicts a method of infiltrating a textile with a liquid solution comprising polymer-aerogel-precursor wherein the liquid solution is prepared in a continuous or semi-continuous manner in accordance with some embodiments.

In some embodiments the polymer-aerogel-precursor solution is prepared in a continuous fashion. In some embodiments, this solution supplied continuously to an application mechanism or location where the solution is applied to the fiber or textile. For example, as shown in FIG. 13 a mixing device (16) combines two or more components in a continuous fashion forming a polymer-aerogel-precursor solution (12), which is applied to a fiber (1). In another example, as shown in FIG. 33 a mixing device (16) combines two or more components in a continuous fashion forming a polymer-aerogel-precursor solution (12), which is applied to a textile (24). In some embodiments, the solution is supplied to a bath where the fiber or textile moves through the bath in a roll-to-roll fashion. In some embodiments, two or more fibers or textiles move through the bath simultaneously, in a roll-to-roll fashion. In an illustrative embodiment, the rate at which the solution is prepared and supplied in a continuous fashion to the bath matches the rate at which the solution is being applied to the fiber or textile as the fiber or textile moves through the bath in a roll-to-roll fashion. In this manner, the volume of the solution in the bath remains constant as it is being continuously and simultaneously supplied to the bath and removed from the bath as it is applied to the fiber or textile. Without wishing to be bound by any particular theory, it is believed that by preparing the polymer-aerogel-precursor solution in a continuous or semi-continuous fashion, the processing time for combining the polymer-aerogel-precursor solution to the fiber or textile may be extended beyond the gel time of the solution, were an equivalent volume of the solution prepared in a single batch in a non-continuous method. In some embodiments, where the solution is applied to the fiber or textile in a roll-to-roll fashion, this can allow for the solution to be applied to a greater amount of fiber or textile than would be possible were the solution prepared using a batch method. In some embodiments, the polymer-aerogel-precursor solution is prepared over a period of greater than 1 hour, greater than 2 hours, greater than 3 hours, greater than 4 hours, greater than 5 hours, greater than 6 hours, greater than 7 hours, or greater than 8 hours.

Figure 14:
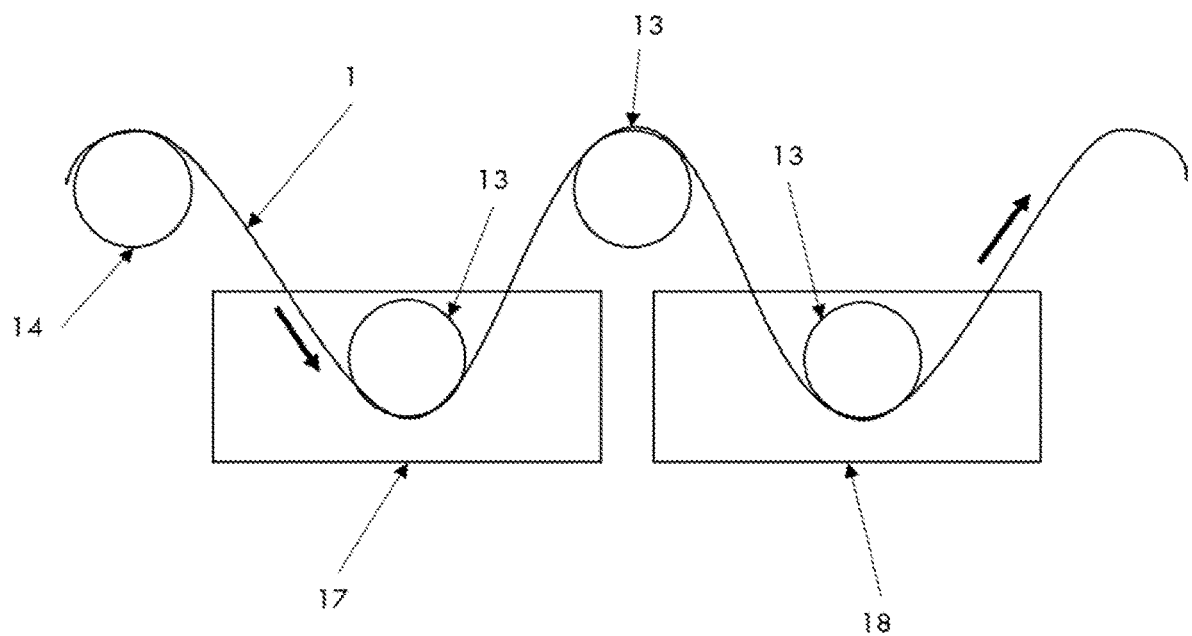
FIG. 14 depicts a method of infiltrating a fiber with a liquid solution comprising polymer-aerogel-precursor in two sequential steps in a continuous or semi-continuous manner in accordance with some embodiments.
Figure 16:
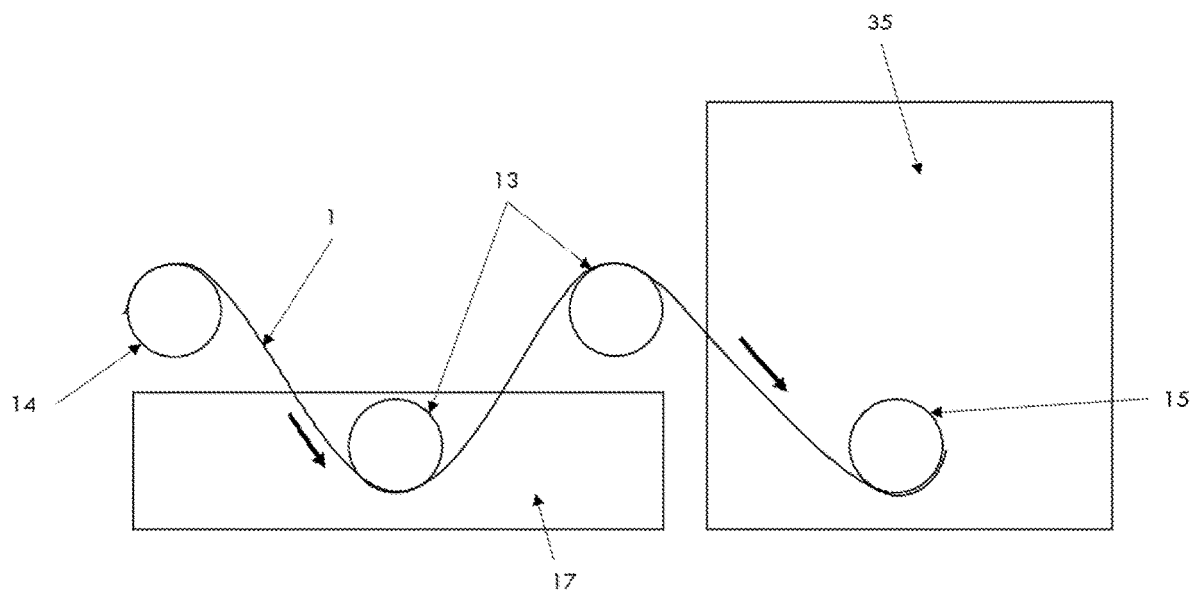
FIG. 16 depicts a method of infiltrating a fiber with a liquid solution comprising polymer-aerogel-precursor in a continuous or semi-continuous process by passing the fiber though a bath of Part A liquid solution, and then through a vapor environment, in accordance with some embodiments.
Figure 34:
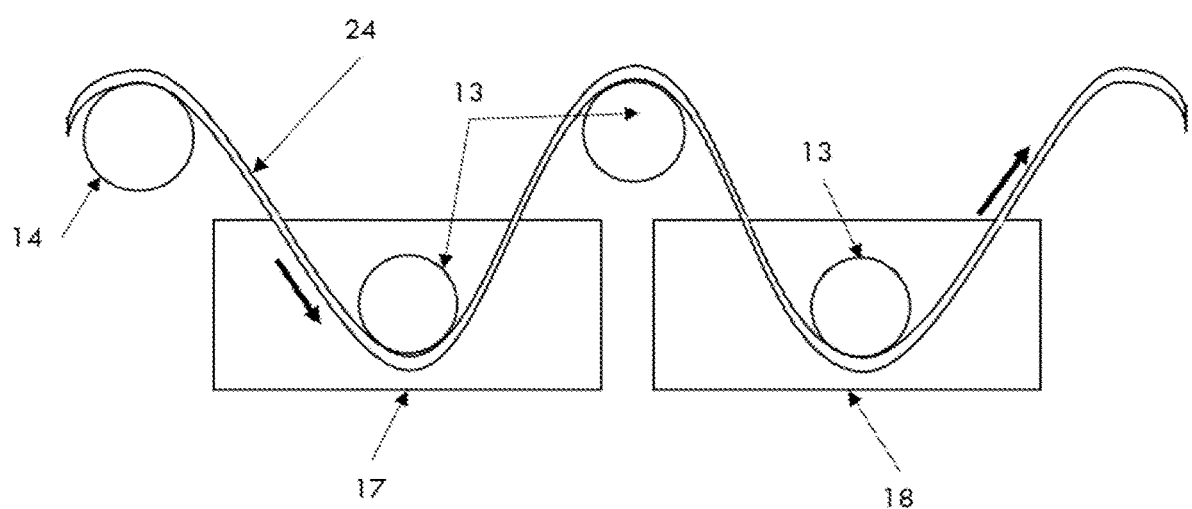
FIG. 34 depicts a method of infiltrating a textile with a liquid solution comprising polymer-aerogel-precursor in two sequential steps in a continuous or semi-continuous manner, in accordance with some embodiments.

In some embodiments, the liquid solution comprising polymer-aerogel-precursor is applied to a fiber in two sequential steps. In some embodiments, the liquid solution comprising polymer-aerogel-precursor is applied to a textile in two sequential steps. In certain embodiments, a fiber or textile is contacted with a polymer-aerogel-precursor solution that will not gel without addition of other components. In some embodiments, the amount of polymer-aerogel/fiber or polymer-aerogel/textile composite that can be produced in a single batch may be limited by the polymer-aerogel-precursor solution gel time. In certain embodiments, process timing can be controlled by splitting the reactive components of the polymer-aerogel-precursor solution into at least two parts. This method can be leveraged, in some embodiments, to enable continuous application of polymer-aerogel-precursor solution to an arbitrary amount of fiber or textile not limited by the polymer-aerogel-precursor solution gel time. In certain embodiments, parts of the polymer-aerogel-precursor solution may be combined in a continuous fashion or in a discrete fashion. In some embodiments, two solutions, a Part A solution and a Part B solution, are prepared such that neither the Part A and Part B solutions form a gel separately, but when the Part A precursor solution and Part B precursor solution are contacted with each other, a polymer gel results. In some embodiments, the Part A solution and Part B solution are mixed and then the combined solution is contacted with a fiber or textile. In some embodiments, the fiber or textile is exposed to a liquid solution comprising a Part A polymer-aerogel-precursor, and then exposed to a liquid solution comprising a Part B polymer-aerogel-precursor. For example, as shown in FIG. 14 a fiber (1) moves over rollers (13) through a Part A solution (17) and subsequently through a part B solution (18). In some embodiments, the textile is exposed to a liquid solution comprising a Part A polymer-aerogel-precursor, and then exposed to a liquid solution comprising a Part B polymer-aerogel-precursor. For example, as shown in FIG. 34 a textile (24) moves over rollers (13) through a Part A solution (17) and subsequently through a part B solution (18). In some embodiments, a fiber or textile is exposed to a polymer-aerogel-precursor solution, and becomes infiltrated with the solution. In some embodiments, the infiltrated fiber or textile is then subjected to an elevated temperature until gelation of the polymer-aerogel-precursor solution occurs. In certain embodiments the infiltrated fiber or textile is exposed to an atmosphere of a gas or vapor that invokes and/or accelerates gelation of the polymer-aerogel-precursor solution. In some embodiments, a Part-A-precursor-solution-infiltrated fiber or textile is exposed to a vapor-phase catalyst that causes the Part-A solution to form a polymer gel. In certain embodiments, a Part A precursor solution is sprayed over a spool of fiber or textile, and then a Part B precursor solution is sprayed over the spool of fiber or textile. In certain embodiments, a Part A precursor solution is poured over a spool of fiber or textile, and then a Part B precursor solution is poured over the spool of fiber or textile. In some embodiments, a combination of any of the above methods may be utilized. In some embodiments, the fiber is exposed to a liquid solution comprising a polymer-aerogel-precursor, and then exposed to a vapor environment such that the liquid solution comprising a polymer-aerogel-precursor forms a polymer gel on and/or within the fiber after a period of time, forming a polymer-gel/fiber composite. For example, in FIG. 16 a fiber (1) moves over rollers (13) through a liquid solution (12) and subsequently through a vapor environment (35).

Figure 36:
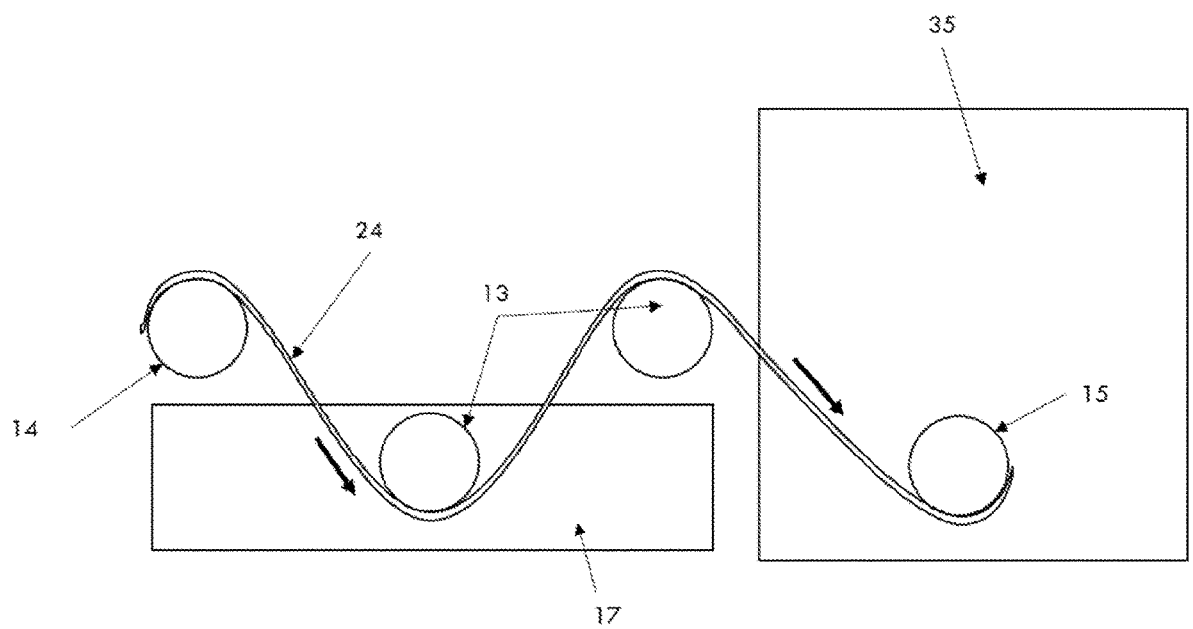
FIG. 36 depicts a method of infiltrating a textile with a liquid solution comprising polymer-aerogel-precursor in a continuous or semi-continuous process by passing the textile though a bath of Part A liquid solution then through a vapor environment in accordance with some embodiments.

In some embodiments, the textile is exposed to a liquid solution comprising a polymer-aerogel-precursor, and then exposed to a vapor environment such that the liquid solution comprising a polymer-aerogel-precursor forms a polymer gel on and/or within the textile after a period of time, forming a polymer-gel/textile composite. For example, in FIG. 36 a textile (24) moves over rollers (13) through a liquid solution (12) and subsequently through a vapor environment (35).

Figure 35A:
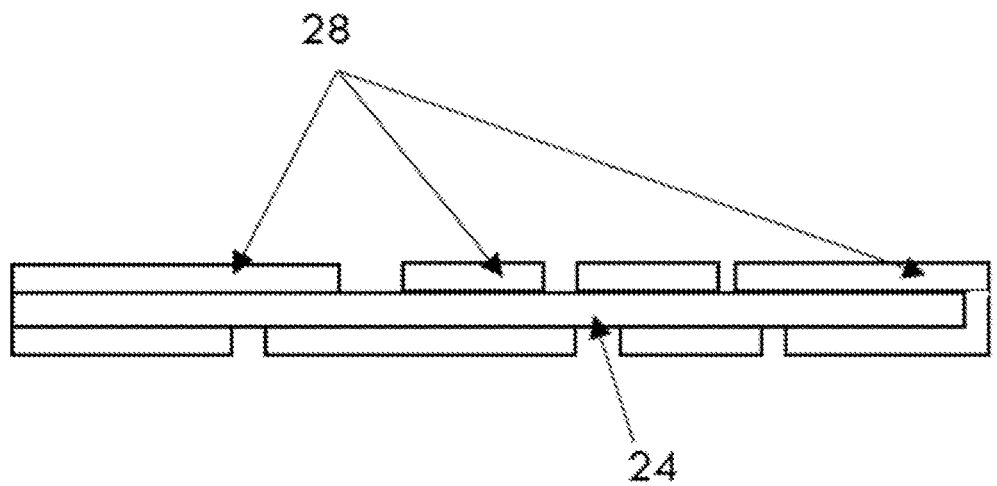
FIG. 35A depicts a cross-sectional area of a polymer-gel/textile composite wherein the liquid solution comprising a polymer-aerogel-precursor has formed a discontinuous polymer gel on and/or within the textile in accordance with some embodiments.
Figure 35B:
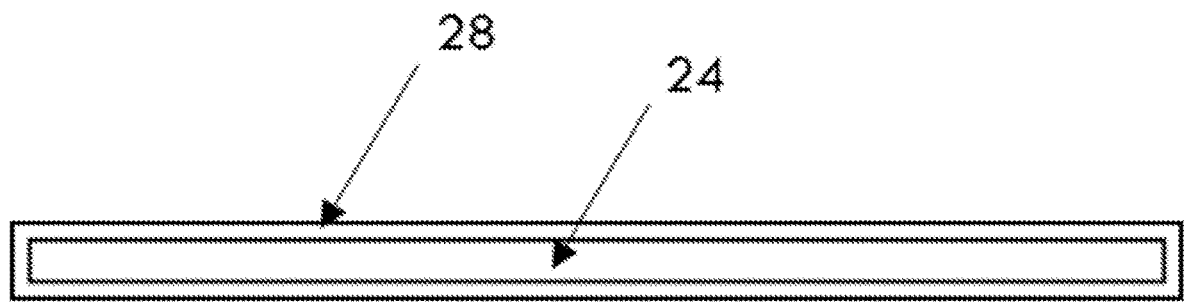
FIG. 35B depicts a cross-sectional area of a polymer-gel/textile composite wherein the liquid solution comprising a polymer-aerogel-precursor has formed a continuous polymer gel on and/or within the textile in accordance with some embodiments.

In some embodiments, the liquid solution comprising a polymer-aerogel-precursor that is on and/or within the fiber forms a polymer gel on and/or within the fiber after a period of time forming a polymer-gel/fiber composite. For example, in FIG. 15A and FIG. 15D, a polymer-gel/fiber composite comprises a polymer gel (28) that is on a fiber (1). In another example, in FIG. 15B and FIG. 15C, a polymer-gel/fiber composite comprises a polymer gel (28) that is on and within a fiber (1). In some embodiments, the liquid solution comprising a polymer-aerogel-precursor that is on and/or within the textile forms a polymer gel on and/or within the textile after a period of time forming a polymer-gel/textile composite. For example, in FIG. 35A and FIG. 35B, polymer-gel/textile composites comprise polymer gels (28) that are over the surface of textiles (24). In some embodiments, once the fiber or textile and a polymer-aerogel-precursor solution are contacted, the fiber or textile is wound onto a spool and gelation of the polymer-aerogel-precursor solution occurs while the fiber or textile is on the spool. In some embodiments, the spool is not actively wound or unwound during gelation of the polymer-aerogel-precursor solution. In some embodiments, once the fiber or textile and polymer-aerogel-precursor solution are contacted, the fiber or textile is not spooled when gelation of the polymer-aerogel-precursor solution occurs.

After a fiber or textile has been exposed to the polymer-aerogel-precursor solution, a method for invoking gelation of the polymer-aerogel-precursor solution in and/or on the fiber or textile may be applied. In some embodiments, a fiber or textile is contacted with a polymer-aerogel-precursor solution. The fiber or textile is then held at a prescribed temperature for a prescribed amount of time to allow for gelation of the polymer-aerogel-precursor solution to occur. In some embodiments, gelation occurs at ambient temperature. In some embodiments, gelation occurs above ambient temperature. In some embodiments, gelation occurs below ambient temperature.

In some embodiments, after gelation, a polymer-gel/fiber or polymer-gel/textile composite is aged for a specific period of time. In certain embodiments, the solid network of the gel strengthens during this aging process. In certain embodiments, the aging process is allowed to occur at ambient temperatures. In certain embodiments, the aging process is allowed to occur below ambient temperatures. In certain embodiments, the aging process is allowed to occur above ambient temperatures. In certain embodiments, a polymer-gel/fiber or polymer-gel/textile is aged on a spool, roll, core, beam, or other carrier. In certain embodiments, a polymer-gel/fiber or polymer-gel/textile is aged not on a spool, roll, core, beam, or other carrier.

In some embodiments, the methods for producing polymer-aerogel/fiber or polymer-aerogel/textile composites comprise batch processes that can be implemented on an industrial scale. In a non-limiting illustrative example, multiple spools of fiber or textile may be infiltrated simultaneously with polymer-aerogel-precursor solution. In some embodiments, a polymer-aerogel/fiber or polymer-aerogel/textile production process is designed such that industrially available roll-to-roll processing equipment, or other industrially available batch or continuous processing equipment, can be used in processing.

In some embodiments, the temperature of the fiber or textile, polymer-aerogel-precursor solution, and surrounding atmosphere are controlled to a specific temperature. In certain embodiments, this temperature is between 10° C. and 15° C., between 15° C. and 20° C., between 20° C. and 25° C., between 25° C. and 30° C., or any suitable temperature. In some embodiments, the fiber or textile is contacted with the polymer-aerogel-precursor solution for a fixed amount of time. In certain embodiments, the time is between 0 and 30 see, between 0 and 60 see, between 0 and 120 see, between 0 and 240 see, greater than 240 see, or any suitable time.

Figure 17:
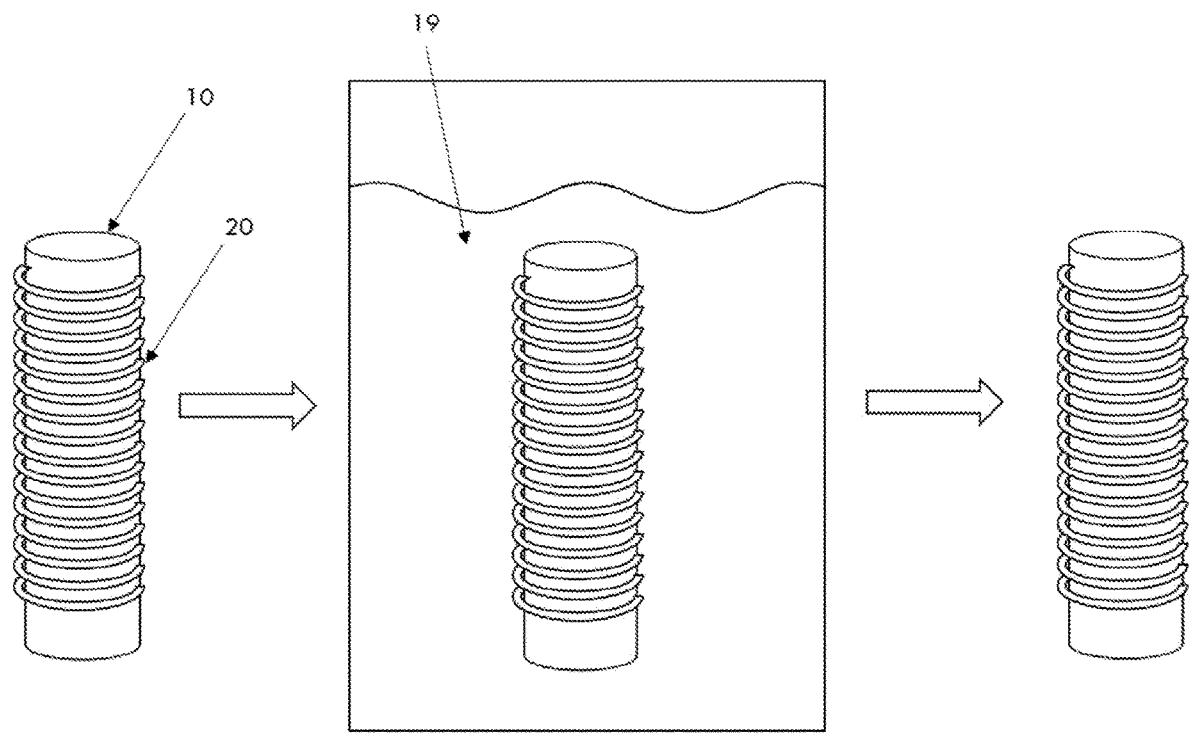
FIG. 17 depicts a method wherein the pore fluid of a polymer-gel/fiber composite is exchanged with a different in accordance with some embodiments.
Figure 37:
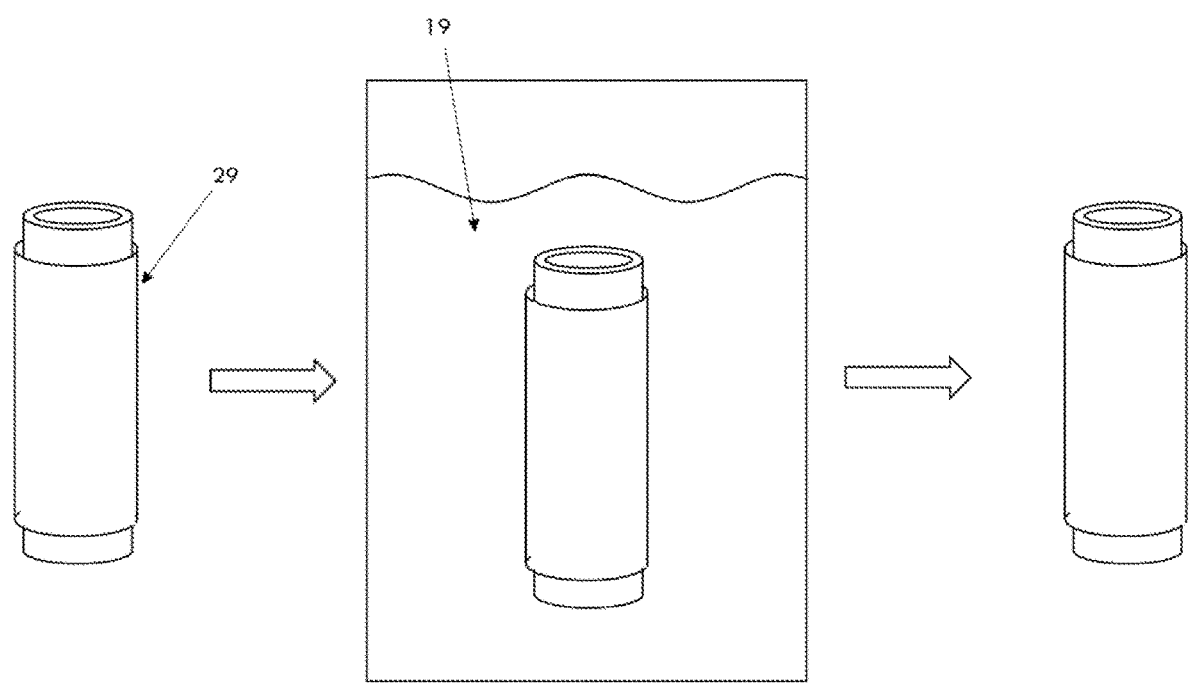
FIG. 37 depicts a method wherein the pore fluid of a polymer-gel/textile composite is exchanged with a different solvent by placing a roll of textile into a bath or series of baths, in accordance with some embodiments.

In some embodiments, the liquid in the pores of the polymer-gel/fiber composite is exchanged for another solvent. For example, in FIG. 17 the liquid in the pores of a spool of polymer-gel/fiber composite (20) is exchanged for another solvent (19). In some embodiments, the liquid in the pores of the polymer-gel/textile composite is exchanged for another solvent. For example, in FIG. 37 the liquid in the pores of a spool of polymer-gel/textile composite (29) is exchanged for another solvent (19). In general, pore fluid refers to the liquid, vapor, gas, or fluid contained within the pores of a gel and may comprise a solvent. In some embodiments, when the pore fluid in a polymer-gel/fiber or polymer-gel/textile composite is replaced with a solvent, the pore fluid in a polymer-gel/fiber or polymer-gel/textile composite already contains a solvent. In some embodiments, the solvent replacing the original pore fluid is selected for its miscibility or partial miscibility with liquid carbon dioxide and/or supercritical carbon dioxide, so enable a subsequent drying process utilizing supercritical carbon dioxide. In some embodiments, multiple solvent exchanges may be performed in a specific order.

In some embodiments, the pore fluid in a polymer-gel/fiber or polymer-gel/textile composite may be replaced with a desired solvent (e.g., tert-butanol). In some embodiments, solvents have desirable properties relative to room temperature. Room temperature refers to temperatures within the range of 18-27° C. In certain embodiments, it may be advantageous that the solvent comprises a solvent that has a triple point near room temperature (e.g., −60 to 60° C.) and that has a relatively high vapor pressure at ambient conditions (e.g., greater than 0.01 torr, greater than 0.1 torr, greater than 1 torr, greater than 10 torr, greater than 20 torr, greater than 30 torr, greater than 40 torr, greater than 50 torr, greater than 60 torr, greater than 70 torr, greater than 80 torr, greater than 90 torr, or greater than 100 torr). Ambient conditions may comprise ambient pressure conditions and ambient temperature conditions such as temperatures near room temperature, e.g., 0-50° C. In some embodiments, the bulk form of the solvent has a freezing point below or near room temperature (e.g., 25° C., 10-35° C., 0-50° C.) at ambient pressure conditions. In certain embodiments, it may be advantageous that the solvent undergoes a low change in density when it is frozen. In certain embodiments, the solvent undergoes a change in density within less than $3\times10^{-4}$ g/cc, less than $4\times10^{-4}$ g/cc, less than $8\times10^{-4}$ g/cc, less than $1\times10^{-3}$ g/cc, or less than $2\times10^{-3}$ g/cc when frozen. In some embodiments, a polymer-gel/fiber or polymer-gel/textile composite is soaked in a fraction of the desired excess solvent volume, the pore fluid in a polymer-gel/fiber or polymer-gel/textile composite and the solvent are allowed to mix, the concentrations of species in the resulting mixture reaches approximately equilibrium, another fraction of new excess solvent is provided, and the process is repeated until the desired quantity of excess solvent has been used. In some embodiments, an excess of solvent equivalent to at least approximately 2 times, at least approximately 5 times, at least approximately 10 times, at least approximately 20 times, at least approximately 50 times, at least approximately 100 times, or less than approximately 2 times the volume of the gel is used to displace the pore fluid in a polymer-gel/fiber or polymer-gel/textile composite. However, in certain embodiments, a volume of excess solvent suitable enough to bring, by diffusive exchange, the purity of the solvent in the pores of a polymer-gel/fiber or polymer-gel/textile composite to levels that minimize shrinkage of the gel resulting from a subsequent freeze drying process. In some of these embodiments, the volume of excess solvent is at least approximately 20 times, or at least approximately 50 times the volume of the polymer-gel/fiber or polymer-gel/textile composite.

The pore fluid may be exchanged with any suitable solvent. In some embodiments, the pore fluid in a polymer-gel/fiber or polymer-gel/textile composite is exchanged for an alcohol. In some embodiments, the pore fluid in a polymer-gel/fiber or polymer-gel/textile composite is exchanged for methanol, ethanol, isopropanol, n-propanol, n-butanol, sec-butanol, tert-butanol, a pentanol, 2-methoxyethanol, amyl alcohol, and/or cyclohexanol. In some embodiments, the pore fluid in a polymer-gel/fiber or polymer-gel/textile composite is exchanged for C1-C6 alcohols. In some embodiments, the alcohol meets the purity specifications of ACS Reagent Grade. In some of these embodiments, only one alcohol is used. In some embodiments, the pore fluid in a polymer-gel/fiber or polymer-gel/textile composite is exchanged for other appropriate solvents/substances, such as, for example, acetone, acetonitrile, water, cyclohexanone, dimethylsulfoxide, N-methylpyrollidone, N,N'-dimethylformamide, dimethylacetamide, and/or carbon dioxide, amongst others. In some embodiments, the solvent meets the purity specifications of American Chemical Society Reagent Grade purity. In some embodiments, only one solvent is used. In some embodiments, the pore fluid in a polymer-gel/fiber or polymer-gel/textile composite is exchanged with water. In some embodiments, the water is deionized and/or distilled. In some embodiments, the water meets of the purity specifications of Analytical Reagent Grade. In some embodiments, the pore fluid in a polymer-gel/fiber or polymer-gel/textile composite is exchanged for liquid carbon dioxide. In some embodiments, the carbon dioxide is Industrial Grade. In some embodiments, the carbon dioxide is Ultrahigh-Purity Grade.

In some embodiments, the purity of the pore fluid in a polymer-gel/fiber or polymer-gel/textile composite after solvent exchange is within 2 v/v %, within 1 v/v %, within 0.1 v/v %, within 0.5 v/v %, within 0.01 v/v %, within 0.005 v/v %, within 0.001 v/v % of the purity of the solvent used for the solvent exchange prior to contact with the gel. Values of the purity of the pore fluid in a polymer-gel/fiber or polymer-gel/textile composite after solvent exchange outside of these ranges may be possible.

Figure 18:
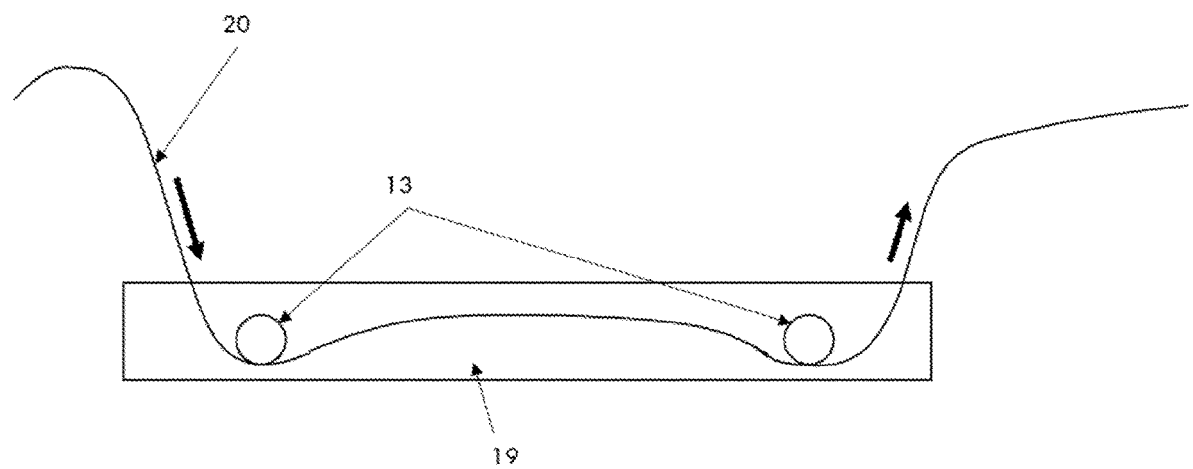
FIG. 18 depicts a method wherein the pore fluid of a polymer-gel/fiber composite is exchanged with another solvent in a continuous or semi-continuous process in accordance with some embodiments.
Figure 19:
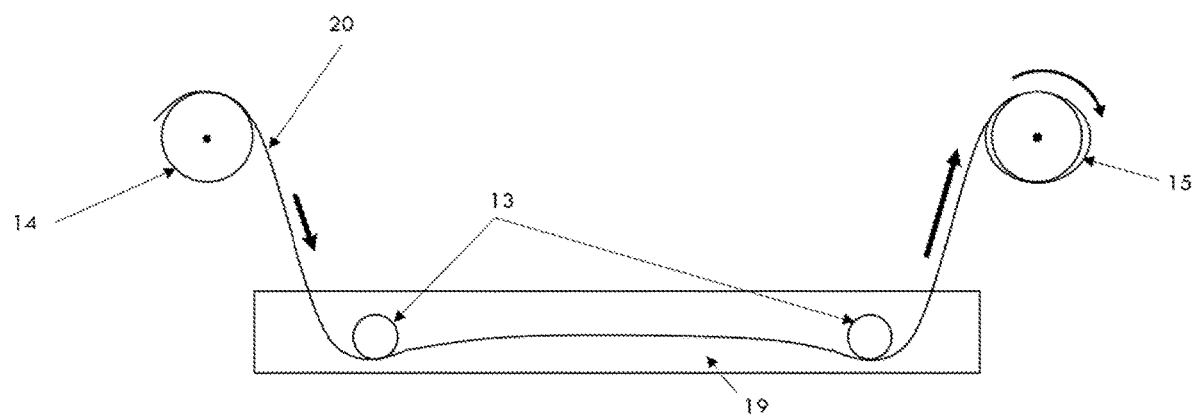
FIG. 19 depicts a method wherein the pore fluid of a polymer-gel/fiber composite is exchanged with another solvent in a roll-to-roll fashion in accordance with some embodiments.
Figure 38:
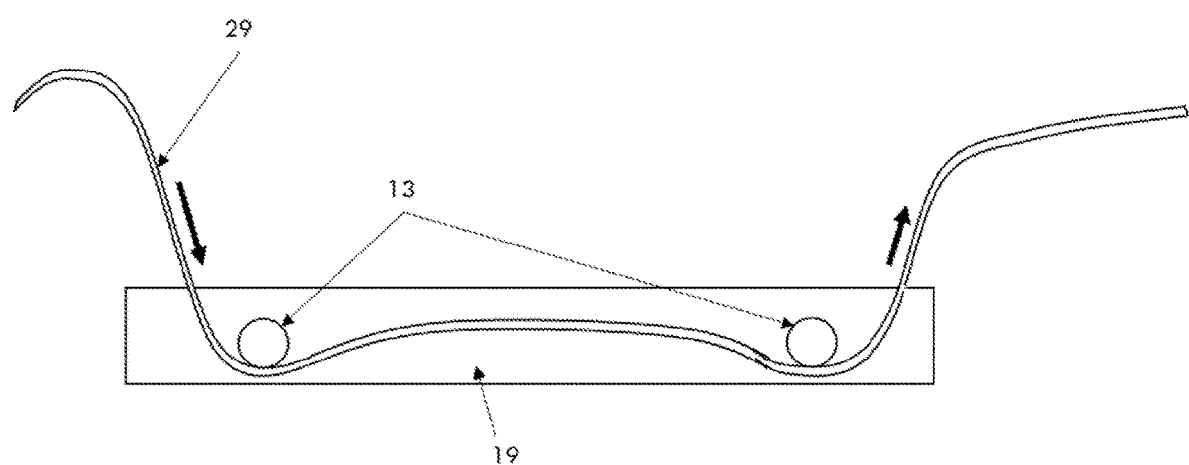
FIG. 38 depicts a method wherein the pore fluid of a polymer-gel/textile composite is exchanged with another solvent in a continuous or semi-continuous process by passing a textile through a bath of solvent, in accordance with some embodiments.
Figure 39:
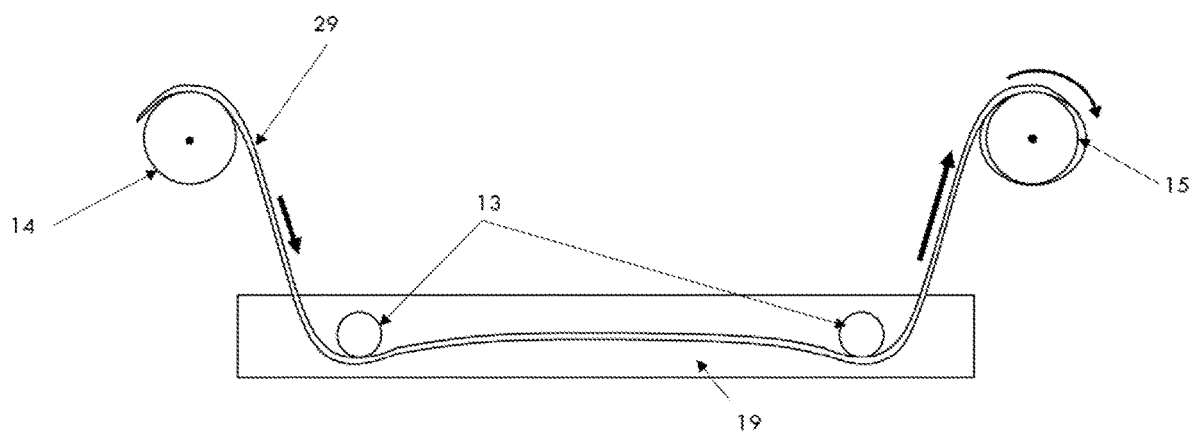
FIG. 39 depicts a method wherein the pore fluid of a polymer-gel/textile composite is exchanged with another solvent in a roll-to-roll in accordance with some embodiments.

In some embodiments, solvent exchange may be performed by submerging a spool of polymer-gel/fiber or polymer-gel/textile composite in a solvent bath for a certain amount of time. In certain embodiments, the liquid in the pores of the polymer-gel/fiber composite is exchanged for another solvent using a continuous process. For example, as shown in FIG. 18 a polymer-gel/textile composite (20) moves over rollers (13) and through a solvent bath (19) in a continuous process. In certain embodiments, the liquid in the pores of the polymer-gel/fiber composite is exchanged for another solvent in a roll-to-roll fashion. For example, as shown in FIG. 19 a polymer-gel/fiber composite (20) is moved through a solvent bath (19) from a sending roll or spool (14) to a receiving roll or spool (15) in a roll-to-roll process. In certain embodiments, the liquid in the pores of the polymer-gel/textile composite is exchanged for another solvent using a continuous process. For example, as shown in FIG. 38 a polymer-gel/textile composite (29) moves over rollers (13) and through a solvent bath (19) in a continuous process. In certain embodiments, the liquid in the pores of the polymer-gel/textile composite is exchanged for another solvent in a roll-to-roll fashion. For example, as shown in FIG. 39 a polymer-gel/textile composite (29) is moved through a solvent bath (19) from a sending roll or spool (14) to a receiving roll or spool (15) in a roll-to-roll process. Without wishing to be bound by any particular theory, it is believed that by exchanging the liquid in the pores of the polymer-gel/fiber or polymer-gel/textile composite for another target solvent in a continuous fashion such that the polymer-gel/fiber or polymer-gel/textile composite is exposed to the target solvent in a non-spooled fashion rather than on a spool, the amount of time needed to complete this exchange can be reduced. In some embodiments the time required for this solvent exchange is limited by diffusive transport of the target solvent into the polymer-gel/fiber or polymer-gel/textile composite. It is believed that by completing this exchange step in a continuous fashion, the characteristic diffusion length of the solvent through the unspooled composite is reduced relative to the spooled polymer-gel/fiber or polymer-gel/textile composite, respectively, and thus the time required for this solvent exchange process may be reduced.

In some embodiments, a polymer-gel/fiber or polymer-gel/textile composite is colored, dyed, and/or treated with a chemical agent.

In certain embodiments, a polymer-aerogel/fiber or polymer-gel/textile composite comprises a fiber or textile, respectively, that was colored, dyed, and/or treated with a chemical agent prior to infiltration with polymer-aerogel-precursor solution.

Figure 20:
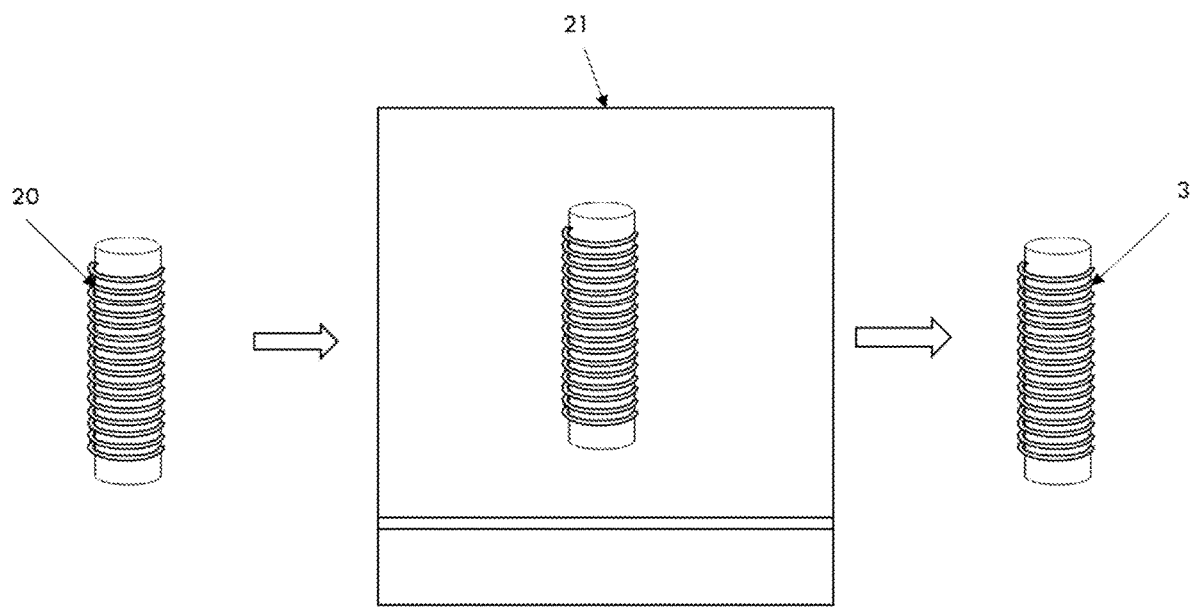
FIG. 20 depicts a method wherein a polymer-gel/fiber composite is placed in a drying chamber to remove the pore fluid in the polymer-gel material to produce a polymer-aerogel/fiber composite, in accordance with some embodiments.
Figure 40:
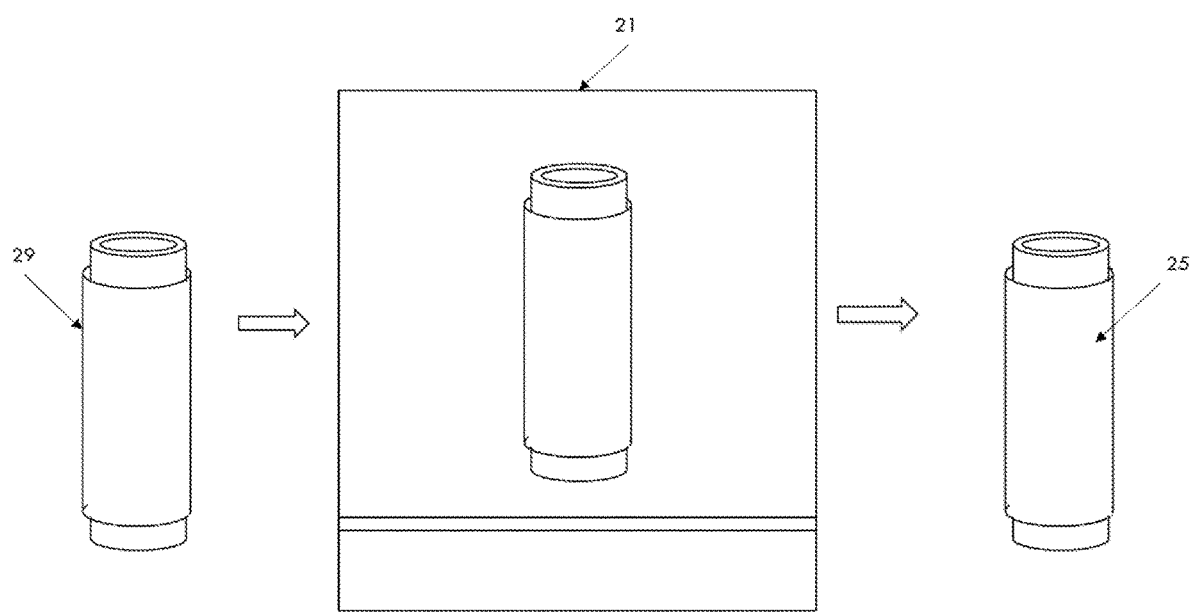
FIG. 40 depicts a method wherein a polymer-gel/textile composite is dried to produce a polymer-aerogel/textile composite, in accordance with some embodiments.

In some embodiments, the polymer-gel/fiber composite is processed such that the liquid within the pores of the gel is removed such that structure of the solid phase of the gel remains substantially intact to produce a polymer-aerogel/fiber composite. For example, as shown in FIG. 20 a polymer-gel/fiber composite (20) is processed through a drying chamber (21) that acts to remove the liquid from the pores of the composite such that structure of the solid phase of the gel remains substantially intact to produce a polymer-aerogel/fiber composite (3). In some embodiments, the polymer-gel/textile composite is processed such that the liquid within the pores of the gel is removed such that structure of the solid phase of the gel remains substantially intact to produce a polymer-aerogel/textile composite. For example, as shown in FIG. 40 a polymer-gel/textile composite (29) is processed through a drying chamber (21) that acts to remove the liquid from the pores of the composite such that structure of the solid phase of the gel remains substantially intact to produce a polymer-aerogel/textile composite (25). In some embodiments, a polymer-gel/fiber or polymer-gel/textile composite is transformed into a polymer-aerogel/fiber or polymer-aerogel/textile composite, respectively, by heating the composite under pressure until the conditions are past the critical point of the pore fluid, such that the fluid within the pores is in a supercritical state. Once the pore fluid is supercritical, it can be depressurized isothermally and removed from the composite as a gas, thereby avoiding the existence of a liquid-vapor interface within the composite, and the damaging capillary stresses that go along with it, and leaving the solid phase of the composite intact.

In some embodiments, a wet polymer-gel/fiber or polymer-gel/textile composite may be dried using evaporative drying. In some embodiments, the pore fluid exhibits a sufficiently low surface tension to prevent damaging the polymer-gel/fiber or polymer-gel/textile composite, respectively, for example, less than 20 dynes/cm, less than 15 dynes/cm, less than 12 dynes/cm, less than 10 dynes/cm. In certain embodiments, the surface tension of the solvent is equal to or less than 20 dynes/cm, equal to or less than 15 dynes/cm, equal to or less than 12 dynes/cm, equal to or less than 10 dynes/cm. Combinations of these ranges are also possible (e.g., at least 5 and less than or equal to 25). Other ranges are also possible.

In some embodiments, a wet polymer-gel/fiber or polymer-gel/textile composite may be dried by sublimation rather than evaporation of the pore fluid. The pore fluid may be suitably frozen and sublimated with little to no capillary force, resulting in a polymer-aerogel/fiber or polymer-aerogel/textile composite, respectively. That is, rather than removing the solvent via evaporation from a liquid state, the solvent is sublimated from a solid state (having been frozen), hence, minimizing capillary forces that may otherwise result from evaporation.

Figure 21:
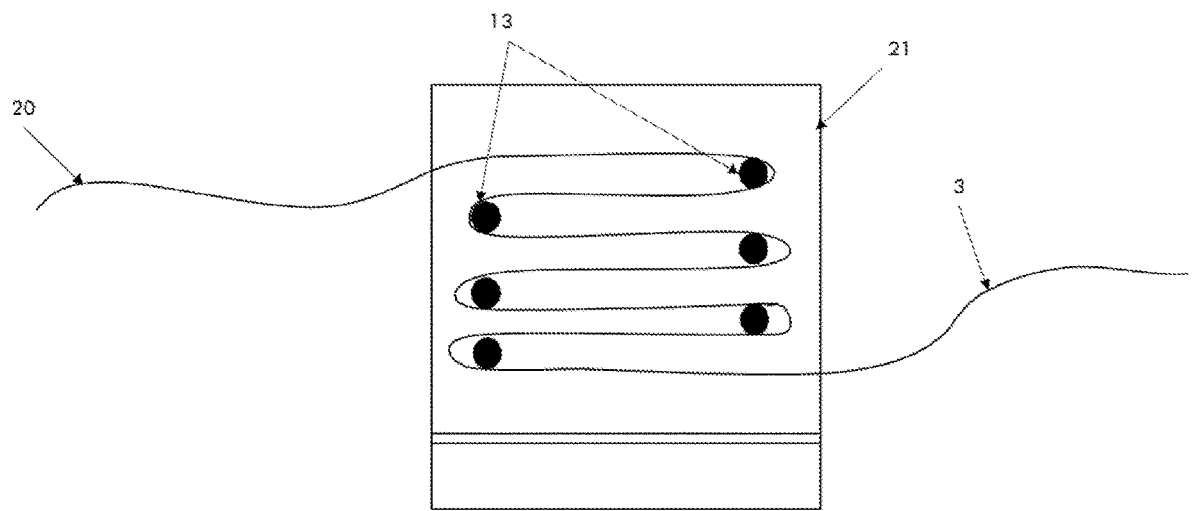
FIG. 21 depicts a method wherein a polymer-gel/fiber composite is subject to a continuous or semi-continuous process where a polymer-gel/fiber composite is moved through a drying chamber, to produce a polymer-aerogel/fiber composite, in accordance with some embodiments.
Figure 22:
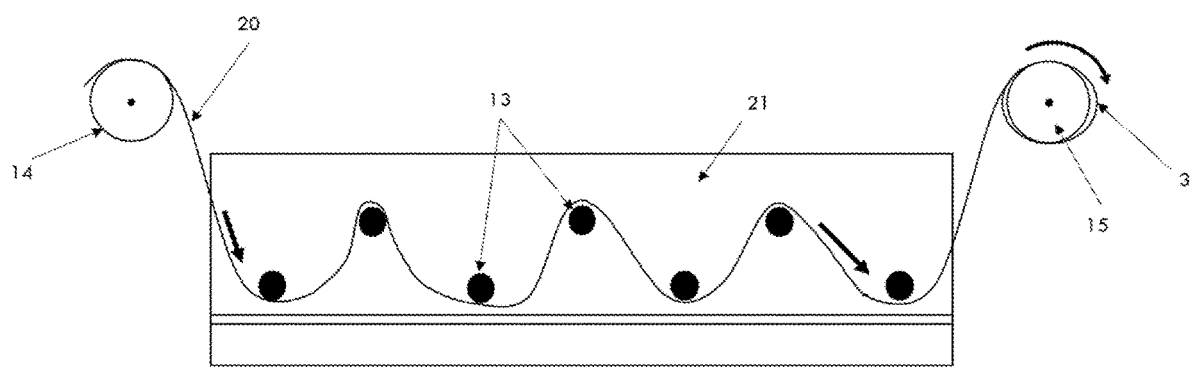
FIG. 22 depicts a method wherein a polymer-gel/fiber composite is processed through a drying chamber in roll-to-roll fashion to produce a polymer-aerogel/fiber composite, in accordance with some embodiments.
Figure 41:
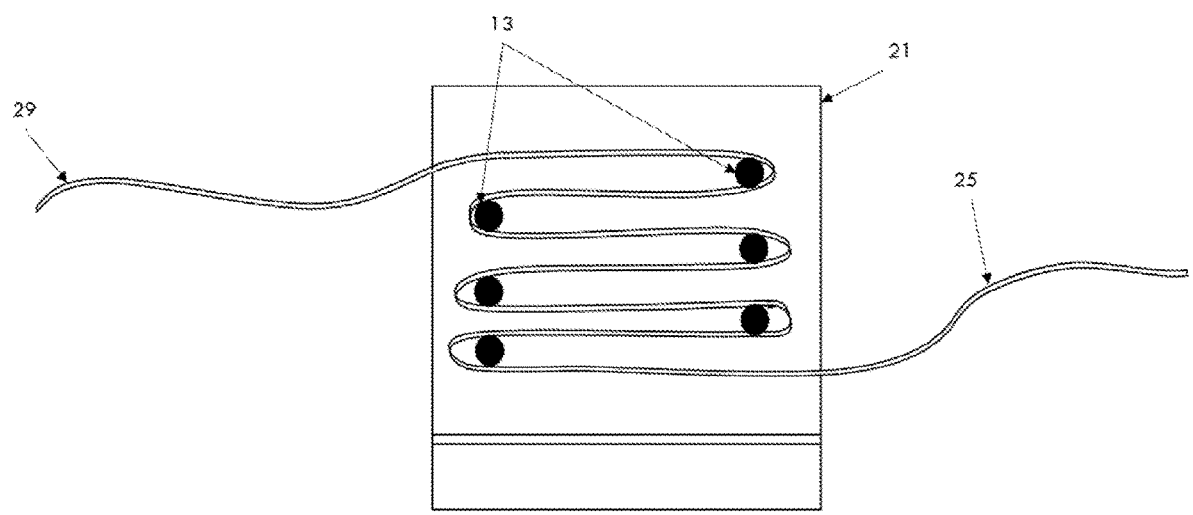
FIG. 41 depicts a method wherein a polymer-gel/textile composite is subject to a continuous or semi-continuous drying process to produce a polymer-aerogel/textile composite, in accordance with some embodiments.
Figure 42:
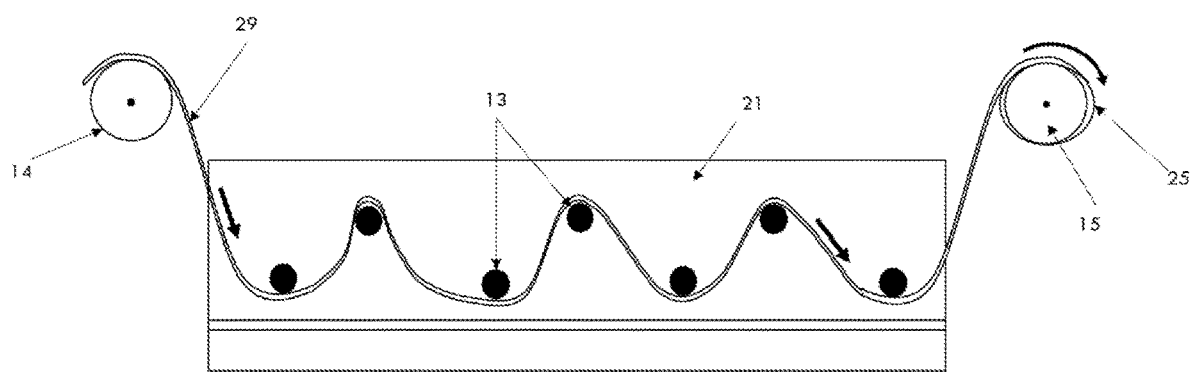
FIG. 42 depicts a method wherein a polymer-gel/textile composite is processed in roll-to-roll drying process to produce a polymer-aerogel/textile composite, in accordance with some embodiments.

In some embodiments, polymer-gel/fiber or polymer-gel/textile composite is processed to produce a polymer-aerogel/fiber or polymer-aerogel/textile composite, respectively, while the composite is wound on a spool, roller, or other carrier. In some embodiments, a polymer-gel/fiber composite is processed to produce a polymer-aerogel/fiber composite using a continuous process. For example, as shown in FIG. 21 a polymer-gel/fiber composite (20) is moved through a drying chamber (21) to produce polymer-aerogel/fiber composite in a continuous process. In certain embodiments, a polymer-gel/fiber composite is processed to produce a polymer-aerogel/fiber composite in a roll-to-roll fashion. For example, as shown in FIG. 22 a polymer-gel/fiber composite (20) is moved from a sending roll or spool (14) to a receiving roll or spool (15) through a drying chamber (21) to produce polymer-aerogel/fiber composite (3) in a roll-to-roll process. In some embodiments, a polymer-gel/textile composite is processed to produce a polymer-aerogel/textile composite using a continuous process. For example, as shown in FIG. 41 a polymer-gel/textile composite (29) is moved through a drying chamber (21) to produce polymer-aerogel/textile composite (25) in a continuous process. In certain embodiments, a polymer-gel/textile composite is processed to produce a polymer-aerogel/textile composite in a roll-to-roll fashion. For example, as shown in FIG. 42 a polymer-gel/textile composite (29) is moved from a sending roll or spool (14) to a receiving roll or spool (15) through a drying chamber (21) to produce polymer-aerogel/textile composite (25) in a roll-to-roll process. Without wishing to be bound by any particular theory, it is believed that by processing the polymer-gel/fiber or polymer-gel/textile composite into a polymer-aerogel/fiber or polymer-aerogel/textile composite, respectively, in a continuous fashion, such that the composite is processed in a non-spooled fashion rather than on a spool, the amount of time needed to complete this process can be reduced. In some embodiments the time required to process the polymer-gel/fiber or polymer-gel/textile composite into a polymer-aerogel/fiber or polymer-aerogel/textile composite, respectively, is limited by diffusive transport of a solvent out of the polymer-gel/fiber or polymer-gel/textile composite. It is believed that by completing this step in a continuous fashion, the characteristic diffusion length of the solvent through the unspooled composite is reduced relative to the spooled polymer-gel/fiber or polymer-gel/textile composite, respectively, thus the time required for this process may be reduced.

Figure 23:
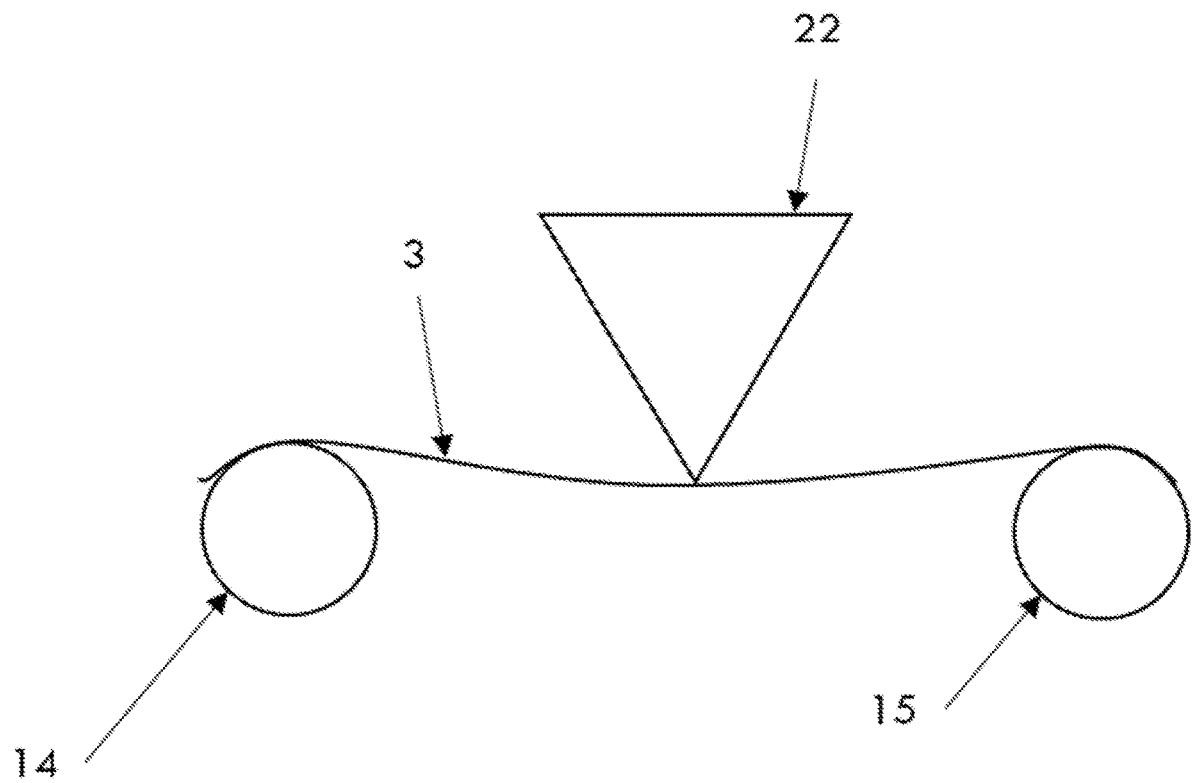
FIG. 23 depicts a method of mechanically processing a polymer-aerogel/fiber composite over a sharp edge, in accordance with some embodiments.
Figure 24:
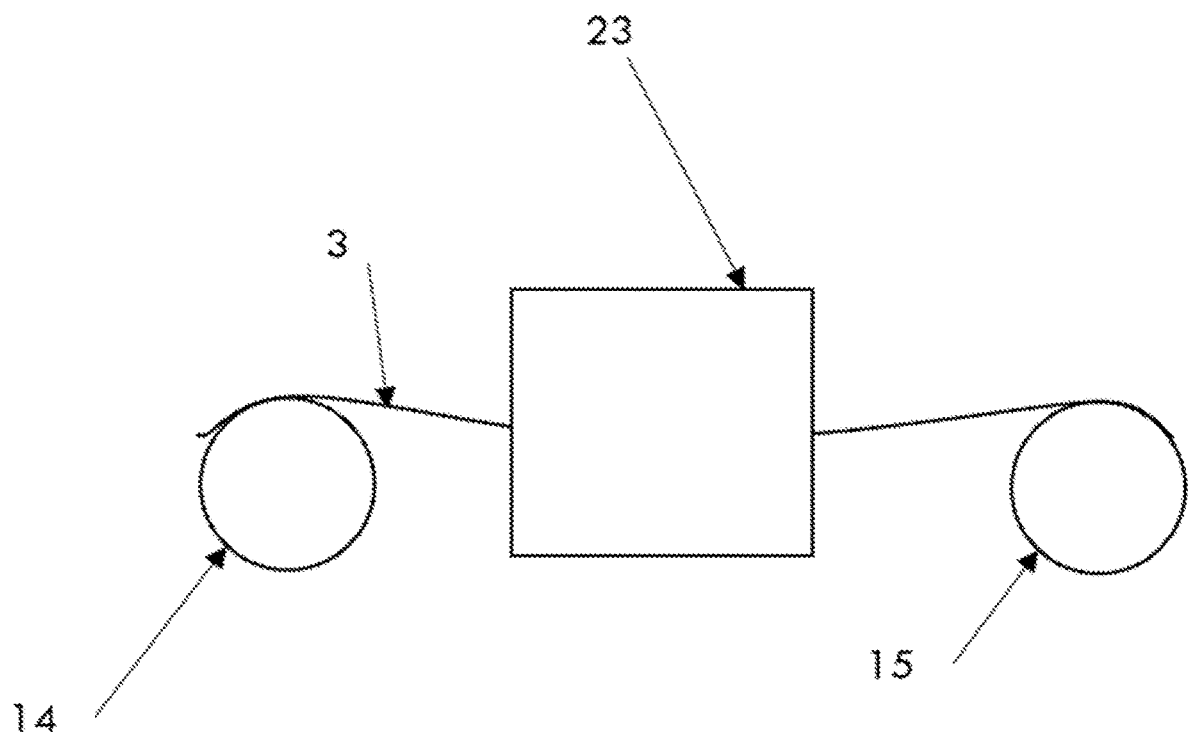
FIG. 24 depicts a method of mechanically processing a polymer-aerogel/fiber through an industrial texturing machine, in accordance with some embodiments.
Figure 43:
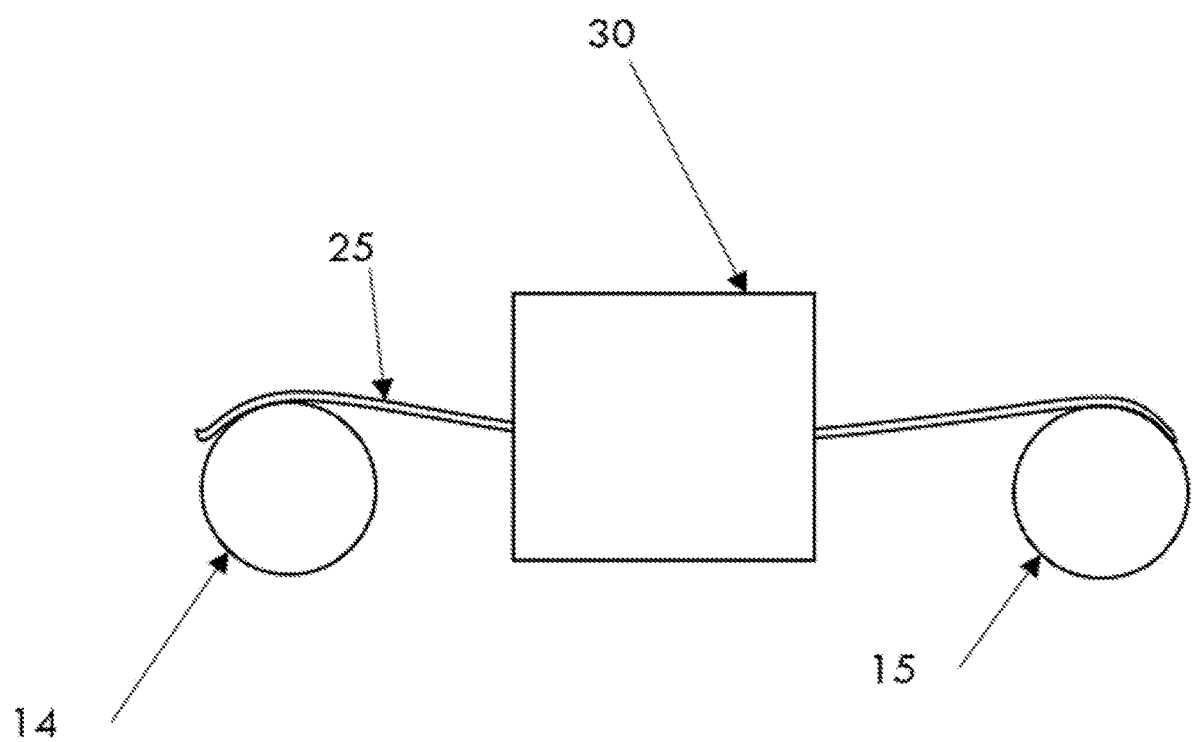
FIG. 43 depicts a method of mechanically processing or finishing a polymer-aerogel/textile composite to mechanically separate the fibers of the textile composite from one another and remove excess polymer aerogel material in accordance with some embodiments.

In some embodiments, a polymer-aerogel/fiber composite comprises a multi-stranded fiber and is mechanically processed to separate the strands of the fiber composite from one another. For example, as shown in FIG. 23 a polymer-aerogel/fiber composite (3) comprising a multi-stranded fiber is run under a sharp edge (22) to separate the strands of the fiber composite from one another. In another example, as shown in FIG. 24 a polymer-aerogel/fiber composite (3) comprising a multi-stranded fiber is run through a texturing device (23) to separate the strands of the fiber composite from one another. In some embodiments, prior to this texturing, the composite fiber may closely resemble that pictured in FIG. 2A, and subsequent to texturing the composite fiber may more closely resemble the structure of that pictured in FIG. 2B. In some embodiments, a polymer-aerogel/textile composite is mechanically processed or finished to separate the fibers in the textile composite from one another. For example, as shown in FIG. 43 a polymer-aerogel/textile composite (25) is run through a finishing device (30) to mechanically separate the fibers of the textile composite from one another and remove excess aerogel from the composite. In some embodiments, this mechanical processing may be performed by blowing air at a specific velocity through the polymer-aerogel/fiber or polymer-aerogel/textile composite as it is run from one roller to another. In some embodiments, this mechanical processing is performed by running the polymer-aerogel/fiber or polymer-aerogel/textile composite over, between, and/or around a series of rollers to impart a suitable amount of friction and agitation. In some embodiments, the polymer-aerogel/fiber composite is mechanically processed using a false-twist mechanism, comprising, e.g., a series of discs or belts that impart a twisting frictional force upon the fiber as it is run through the device. In some embodiments, this mechanical processing is performed by running the polymer-aerogel/fiber or polymer-aerogel/textile composite over a blade or series of blades with an edge radius of less than approximately 0.5 mm. In some embodiments, any combination of these mechanical processing methods may be used. Without wishing to be bound by any particular theory, it is believed that mechanical processing of the polymer-aerogel/fiber composite allows the composite to be more easily incorporated into a textile using standard industrial manufacturing equipment. In an illustrative embodiments, a polymer-aerogel/fiber composite comprising a multi-stranded fiber is selected for mechanical processing, wherein the constituent strands of the fiber are substantially bound to the other strands in the fiber composite by aerogel that is present in the intra-fiber void spaces. After this fiber composite is mechanically processed, the individual strands in the composite are no longer bound together by aerogel. In an illustrative embodiment, a polymer-aerogel/fiber composite comprising a multi-stranded fiber is selected for knitting on a commercial circular knitting machine. Prior to mechanical processing, the fiber composite is prone to frequent breaking while being knit with said machine. After mechanical processing, the fiber composite breaks less frequently while on the same circular knitting machine, relative to the same fiber composite that has not been mechanically processed.

Preparation of a polymer-aerogel/fiber or polymer-aerogel/textile composite material may involve a process that affects the interfacial strength of the bond between the polymer gel and a fiber. In some embodiments, such a process may be performed before, during, and/or after gelation of a polymer-aerogel-precursor solution occurs. In certain embodiments, the resultant polymer-aerogel/fiber or polymer-aerogel/textile composite produced may exhibit a stronger bond between the polymer aerogel and the fiber, relative to a comparable polymer-aerogel/fiber or polymer-aerogel/textile composite material that did not incorporate such a processing step. In some embodiments, a fiber or textile is contacted with a polymer-aerogel-precursor solution, an interfacial bond is formed between components of the polymer-aerogel-precursor solution and the fiber or textile, and then the polymer-aerogel-precursor solution gels, forming a polymer-gel/fiber or polymer-gel/textile composite in which the polymer gel is mechanically bonded to the fiber or textile, respectively. In some embodiments, a fiber or textile is contacted with a polymer-aerogel-precursor solution, a chemical reaction occurs between components of the polymer-aerogel-precursor solution and the fiber or textile, and then the polymer-aerogel-precursor solution gels, forming a polymer-gel/fiber or polymer-gel/textile composite in which the polymer-gel is chemically bonded to the fiber or textile. In some embodiments, this chemical reaction is spontaneous. In some embodiments, this chemical reaction is induced by exposure to one or more of heat, light, ultraviolet radiation, infrared radiation, microwave radiation, other electromagnetic radiation, a chemical catalyst, and/or radical polymerization. In certain embodiments, the chemical reaction that results in bonding of the polymer gel to the fiber or textile may be performed subsequent to gelation of the polymer-aerogel-precursor solution. In certain embodiments, this chemical bonding after gelation between the polymer gel and the fiber or textile may be spontaneous or induced, and may occur after the gel has formed during a gel aging step and/or during a solvent exchange step. In some embodiments, a chemical bond between the polymer aerogel and fiber or textile in a polymer-aerogel/fiber or polymer-aerogel/textile composite is formed after the composite has been dried to form polymer aerogel. In certain embodiments, the bonding processes described herein may be performed on a spool of fiber or textile. In some embodiments, the bonding processes described herein may be performed on an unspooled fiber or textile.

In certain embodiments, a polymer-aerogel/fiber or polymer-aerogel/textile composite can be coated with any common water repellent finish. In some embodiment this finish comprises a fluoroalkyl acrylate copolymer. In some embodiment this finish comprises commercially available finishes such as, but not limited to, Arkophob® DAN New liquid, Appretan® N92111 liquid, NUVAR N1811 liquid, Smartrepel® Hydro AM liquid, NUVA® N2114 liquid, Nuva® N9334 liquid, Fluowet® UD liquid, or any combination thereof. In some embodiments, the finish is diluted by water or another acceptable solvent or dispersant for application to the polymer-aerogel/fiber or polymer-aerogel/textile composite. In some embodiments, the finish may be applied by means of a typical fiber or textile finishing method such as, but not limited to, a spray, a foam, a bath, a padding, and/or direct roll coating method. Those of ordinary skill in the art are familiar with these methods for application of a finish to a fiber or textile. In some embodiments, the water repellent finish can be applied by running the polymer-aerogel/fiber or polymer-aerogel/textile composite through a diluted solution of the finish. In some embodiments, the water repellent finish can be applied by submerging a spool, or any other carrier, of the polymer-aerogel/fiber or polymer-aerogel/textile composite in a diluted solution of the finish for a prescribed amount of time. In some embodiments, the water repellent finish may be dried and cured on the polymer-aerogel/fiber or polymer-aerogel/textile composite at ambient temperature and pressure. In some embodiments, the water repellent finish may be dried and cured on the polymer-aerogel/fiber or polymer-aerogel/textile composite by baking a spool or other carrier in an oven at a specific temperature for a specific amount of time.

In certain embodiments, certain processing steps are selected which are compatible with implementation on an industrial production scale. This is to say that the processes are compatible with equipment and processing methods currently used in the art of fiber processing and textile manufacturing.

In some embodiments, a polymer-aerogel/fiber composite is woven or knit into a textile. In certain embodiments, a polymer-aerogel/fiber composite is chopped and integrated into a non-woven textile. In some embodiments, a polymer-aerogel/fiber composite is chopped to form staple fibers. In some embodiments, polymer-aerogel/fiber composite staple fibers may be spun to create a knittable fiber. In some embodiments, polymer-aerogel/fiber staple fibers may be spun with other staple fiber types, including but not limited to cotton or polyester, to create a knittable fiber.

In some embodiments, a polymer-aerogel/fiber composite is mechanically combined with another fiber or fibers using methods that may include, but are not limited to: twisting, wrapping, core spinning, or blending in any other way. In some embodiments, this mechanically combined polymer-aerogel/fiber/fiber composite can be woven or knit into a textile.

Figure 28:
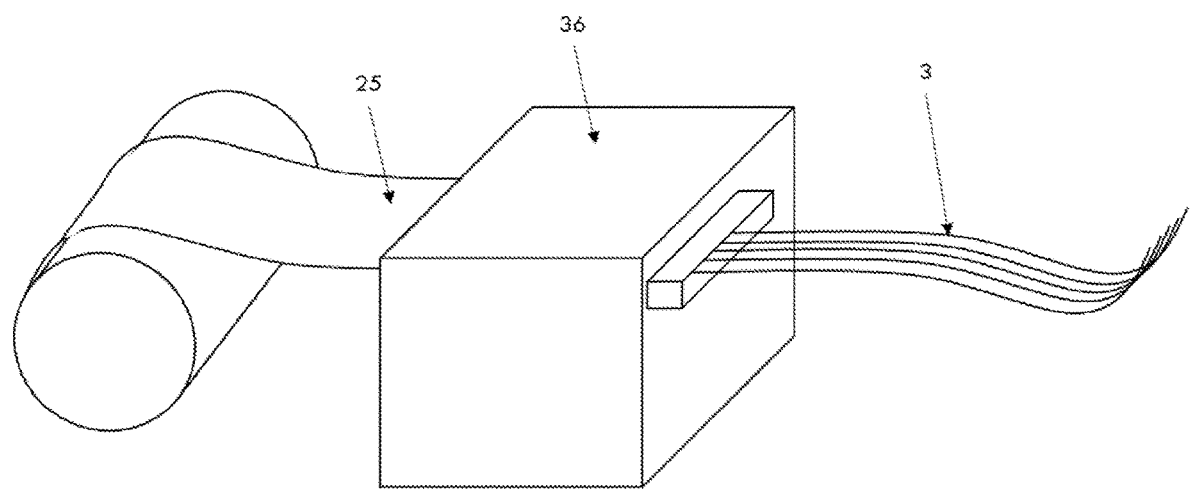
FIG. 28 depicts a method wherein standard industrial deknitting equipment is used to deknit a polymer-aerogel/textile composite into a polymer-aerogel/fiber composite can be used in accordance with some embodiments.

In some embodiments, a polymer-aerogel/textile composite is able to be deknit. For example, in FIG. 28 a polymer-aerogel/textile composite (25) is deknit using a commercial deknitting machine (36) into its constituent fibers or fibers, forming a polymer-aerogel/fiber composite (3). Those of ordinary skill in the art are familiar with deknitting, which involves reducing a knit textile to its fiber form. In some embodiments, a polymer-aerogel/textile composite may be prepared by the methods as described herein, and subsequently deknit to form a polymer-aerogel/fiber composite.

In some embodiments, a polymer-aerogel/fiber composite may be woven, knit, or otherwise incorporated into a textile. In some embodiments, a textile comprising polymer-aerogel/fiber composite may also comprise other fiber or fibers. In some embodiments, the composite fibers described herein make up at least 1 wt %, at least 5 wt %, at least 10 wt %, at least 15 wt %, at least 20 wt %, at least 25 wt %, at least 35 wt %, at least 50 wt %, at least 75 wt %, at least 90 wt % or more, or 100% of the textile.

In some embodiments, polymer-aerogel/fiber or polymer-aerogel/textile composites may be used in textile materials (including woven, knit, and non-woven textile materials). In some embodiments, these textiles may be integrated into apparel and garments (including but not limited to shirts, trousers, shorts, body suits, hats, and socks), outerwear (including but not limited to coats, pants, wet suits, and gloves), blankets, footwear, outdoor protective soft goods (including but not limited to modular sleeping systems, tents, backpacks, and sleeping bags), and temporary modular rigid wall structures.

In certain embodiments, polymer-aerogel/fiber or polymer-aerogel/textile composites may be used in textile materials (including woven, knit, and non-woven textile materials) that are integrated into aviation interiors (including but not limited to seats, seat covers, cushions, cabling, wall panels, floor panels, and galley furnishings); aerospace applications (including but not limited to spacesuits, satellites, antennas, radar cloaking, heat shielding, stealth shielding, temporary or permanent shelter construction, and thermal protection systems); automotive applications (including but not limited to seats, seat covers, seat cushions, engine compartments, cold storage, exhaust system insulation, heat shields, acoustic insulation, thermal insulation, and upholstery); construction, architecture, and exteriors and interiors of non-temporary buildings (including but not limited to wall systems, carpeting, upholstery, furniture); thermal protection systems for commercial cold train transport packaging for perishable goods and pharmaceuticals; and thermal management packages for courier services.

Apparel and similar soft goods are one application where the unique combinations and extreme values of materials properties afforded by aerogels may be particularly advantageous. Outdoor apparel, for example, often requires multiple function-specific layers (e.g., outer layer for repelling water) to achieve desired performance characteristics. Outdoor apparel articles typically comprise a textile layer or a lofty batting specifically designed to provide the wearer with protection from external cold or heat. In a winter jacket, for example, thermal insulation may be layered between other function-specific layers to provide heat retention, however such insulation typically adds bulk, weight, design complexity, and production cost. In some applications, the added bulk and weight from added insulation precludes the use of the article in many environments and for many people. Aerogels, however, may be used to make textile materials that can be simultaneously and intrinsically lightweight, flexible, water resistant, and, most of all, highly thermally insulative at low thicknesses, useful for providing the wearer protection from the cold, rain, and wind without limiting movement or adding significant weight. Therefore, the development of intrinsically insulating textile materials that incorporate aerogels is desirable.

Historically, aerogel materials have exhibited several drawbacks that have prevented or complicated their integration into textile-based applications such as apparel and soft goods. Among these drawbacks are poor mechanical properties, e.g., low compressive strength, low compressive stiffness, and poor facture toughness; susceptibility to damage and thus losing thermal insulating properties when washed; and difficulty in integrating into/onto fiber-based substrates. Fiber-reinforced silica aerogel composite blankets, for example, in which a lofty fibrous batting such as fiberglass mat is infiltrated with aerogel, or alternatively, in which discrete aerogel particles are glued together with bicomponent polymer fibers to form a coherent flexible substrate, have been commercially available for several years and provide the thermal insulating benefits of aerogels in a flexible and rollable form factor amenable to industrial and construction insulation applications. However, such blankets readily shed aerogel dust particles when handled or flexed, lose aerogel and/or are damaged and thus lose insulating ability when laundered, and require integration with additional textiles and encapsulating materials to be made practical for apparel and related soft goods.

Furthermore, traditional textiles cannot match the insulating ability of aerogels. Insulated apparel today relies on inclusion of dedicated layers of lofty insulation, typically constructed in garments or bonded to other functional layers required for garment durability and stability, environmental contact (e.g. moisture tolerance), and wearer comfort. The need for multiple, function-specific materials to achieve desired functionality in insulated apparel increases garment bulk and weight. Additionally, many traditional insulating materials (e.g., natural or synthetic down) rely on their loft to provide insulating benefit. The thermal insulating ability of these materials is significantly reduced when compressed or wetted, defeating the intended function of the garment under many circumstances in which the garment would be relied upon, for example, in the snow or rain and during physical activities outdoors. Furthermore, for certain articles of apparel in which there is limited room for incorporation of lofty insulation or a need for a high degree of flexibility, for example socks or gloves, current insulating technologies fall short of the functionality desired by the wearer.

Aerogels are a diverse class of low-density solid materials comprised of a porous three-dimensional nanostructured network. Many aerogels exhibit a diverse array of desirable and extreme materials properties such as high specific surface area, low bulk density, high specific strength and stiffness, low thermal conductivity, and low dielectric constant, among others.

Aerogels can be made of a wide variety of substances such as inorganic oxides, organic polymers, carbon, and numerous other substances and can take on substance-specific properties accordingly such as high-temperature stability, hydrophobicity, chemical resistance, and flexibility. Certain aerogel compositions combine multiple desirable materials properties into a single material envelope and thus may be advantageous for technological applications, for example, thermal insulation, acoustic insulation, lightweight structures, impact damping, electrodes, catalysts and catalyst supports, and sensors. Aerogel materials can also be produced in a variety of form factors to facilitate incorporation into different applications, such as monolithic shaped parts, fine particles, fiber-reinforced composite blankets, thin films, and coatings.

An aerogel comprises a solid component and an open-celled, tortuous pore network with mean pore sizes typically on the order of 2-50 nm, although in some cases may contain pores as large as several microns and/or less than 2 nm. The pores of an aerogel, which may be smaller than the mean free path of air molecules at standard temperature and pressure, may give rise to a phenomenon called the Knudsen effect, wherein convective transport of heat through the material is dramatically stifled. The solid component of the aerogel accordingly comprises a highly disordered, sparsely connected, typically nanostructured, fractal-like contiguous solid-phase network. As a result, aerogels exhibit low bulk densities, ranging from <1 mg/cc to 0.9 g/cc, with typical values for most materials of 0.05-0.3 g/cc. The low bulk density and sparsely connected solid-phase network in turn result in inefficient conductive transport of heat through the material. The combination of inefficient convective and conductive transport of heat through the material make aerogels exceptional thermal insulators, in some cases as low as 10 mW/m-K at a temperature and pressure which are approximately the standard temperature and pressure (STP). STP is defined as and understood to be a temperature of 273.15 K and an absolute pressure of 100 kPa. Silica aerogels with bulk densities around 0.11 g/cc for example routinely exhibit thermal conductivities 14 mW/m-K. Polymer aerogels can similarly exhibit low thermal conductivities, however in some cases such as polymer aerogels that exhibit high compressive moduli thermal conductivities may be as high as 80 mW/m-K due increased phonon transport in the solid-phase backbone of the aerogel giving rise to increased conductive transport of heat.

In certain embodiments, aerogels may be dry, nanoporous, nanostructured materials that exhibit a diverse array of extreme and valuable materials properties, e.g., low density, ultralow thermal conductivity, high density-normalized strength and stiffness, and high specific internal surface area, amongst others. Nanoporous refers to porous materials in which the pores are primarily nanopores, that is, in which at least 50% of the porosity comprises pores exhibiting mean pore diameters of less than 1 micron as determined by the Barrett-Joyner-Halena model of a nitrogen sorptimetry isotherm of the material.

In some embodiments, the aerogel is a polymer aerogel. In certain embodiments, the solid skeleton of the aerogel comprises greater than 10%, greater than 20%, greater than 30%, greater than 50%, greater than 80%, greater than 90%, greater than 95%, or greater than 98% polymer by mass.

Polymer-aerogel/aerogel composites may also be prepared, in which particles of one aerogel material are dispersed throughout a polymer aerogel. The aerogel particles may comprise hydrophobic and/or hydrophilic particles. For example, a composite in which hydrophobic silica aerogel particles with diameters ranging from 1-1000 μm are dispersed through a polymer aerogel. In certain embodiments, the aerogel particles may comprise trimethylsilyl-functionalized silica aerogel, wherein the silica aerogel may comprise sodium ions. In certain embodiments, the mass percent of the dispersant aerogel material, for example, silica aerogel particles, relative to the mass of the host aerogel, for example, a polymer aerogel, is less than 55%, less than 50%, less than 40%, less than 30%, less than 20%, less than 10%, less than 5%, less than 2%, or less than 1%.

As provided herein, in some embodiments polymer aerogel materials may comprise a solid-phase polymer-containing material that is primarily mesoporous (i.e., contains pores between 2-50 nm in diameter), comprising at least a 50% porosity by volume in which the solid-phase component comprises a 3D nanostructured solid network. In some embodiments, aerogels may contain pores as large as several microns in diameter, and/or pores less than 2 nm in diameter.

Polymer aerogels may be prepared in a variety of form factors. A form factor refers to the general shape and form taken on by an aerogel. Examples of common form factors of aerogels include monoliths, particles, thin films, and composite blankets. A monolith refers to a shaped contiguous macroscopic part exhibiting a smallest dimension of at least 1 mm. The term monolith does not, for example, refer to a microscopic domain within an aerogel material or to an individual network within an interpenetrating network aerogel. Particles refer to small, discrete pieces of aerogel material of irregular or regular shape with typical sizes ranging from 1 μm to 1 mm. The term particle when used to refer to form factor does not, for example, refer to the component particles that make up the solid skeleton of an aerogel, for example nanoparticles or microparticles that are linked together to form the aerogel material.

In some embodiments, a polymer aerogel may exhibit one or more morphologies. As presented herein, morphology refers to the geometric arrangement of solid and porosity, i.e., pores, that makes up the aerogel material. In some embodiments, a polymer aerogel material may exhibit a string-of-pearls morphology, wherein the solid skeleton of the aerogel comprises interconnected spheroidal substructures such as nanoparticles. In some embodiments, such nanoparticles are in and of themselves porous, exhibiting pores of <2 nm in diameter, referred to as secondary particles, which are in turn comprise smaller primary particles. In some embodiments, a polymer aerogel material may exhibit a fibrous or fiber-like morphology, wherein the solid-phase skeleton of the aerogel contains high-aspect-ratio substructures and/or takes on a web-like appearance. These fiber-like substructures are distinct in nature from macroscopic and microscopic fibers such as those used in apparel or in lofty batting. Polymer-aerogel/fiber composites provided herein accordingly may contain a polymer aerogel material with fiber-like substructures, and a non-aerogel fiber material that is composited with the aerogel material at the microscopic and/or macroscopic length scale. Fiber-like substructure or fibrous particles that comprise the morphology of a polymer aerogel material are distinct from an extraneous microfiber or macrofiber used, for example, to provide mechanical reinforcement of the aerogel material or that serves as a substrate for making a textile but is infused with an aerogel material.

The polymer aerogel may exhibit any suitable morphology. In some embodiments, the morphology of the polymer aerogel may be fiber-like, meaning the solid skeleton of the polymer aerogel comprises substructures that are linear in nature with a length-to-diameter ratio of greater than or equal to 10:1, i.e., visually resemble fiber when viewed using scanning electron microscopy (SEM). In some embodiments, the solid skeleton of the polymer aerogel comprises secondary particles, the secondary particles being comprised of smaller primary particles.

The polymer aerogel, (e.g., within a composite fiber and/or a composite textile) may exhibit any suitable pore structure. Pore width distribution, pore area distribution, and mean pore size may be calculated from the nitrogen desorption isotherm using the Barrett-Joyner-Halenda (BJH) method over ranges typically reemployed in measuring pore width and pore area distribution. Average pore width, e.g., mean pore size, (assuming cylindrical pores) may be calculated using pore width=4*(total specific volume)/(specific surface area) where total specific volume and specific surface area may also be calculated using BJH analysis of the desorption isotherm. In some embodiments, the average pore width is less than 10 nm, less than 20 nm, less than 30 nm, less than 40 nm, less than 50 nm, less than 60 nm, less than 70 nm, less than 80 nm, less than 90 nm, less than 100 nm, less than 500 nm, less than 1 µm, less than 10 µm, less than 100 µm, or less than 1 mm. In certain preferred embodiments, the average pore width is less than 50 nm. In some embodiments, the pore width distribution of the aerogel may be unimodal (i.e., exhibiting a single maximum). In some embodiments, the pore width distribution maximum is found at less than 10 nm, less than 20 nm, less than 30 nm, less than 40 nm, less than 50 nm, less than 60 nm, less than 70 nm, less than 80 nm, less than 90 nm, less than 100 nm, less than 500 nm, less than 1 µm, less than 10 µm, less than 100 µm, or less than 1 mm.

In some embodiments, the pore width distribution of the aerogel may be bimodal, or at least bimodal. In some embodiments, the aerogel material can have two distinct populations of pores, one with an average pore size less than a certain critical pore width, and one with an average pore size greater than some critical pore width. In some embodiments, the critical pore width is less than 10 nm, less than 20 nm, less than 30 nm, less than 40 nm, less than 50 nm, less than 60 nm, less than 70 nm, less than 80 nm, less than 90 nm, less than 100 nm, less than 500 nm, less than 1 µm, less than 10 µm, less than 100 µm, or less than 1 mm. In some embodiments, the aerogel may exhibit any suitable internal surface area. In some embodiments, the internal surface area of the aerogel is greater than 50 m$^2$/g, greater than 100 m$^2$/g, greater than 200 m$^2$/g, greater than 300 m$^2$/g, greater than 400 m$^2$/g, greater than 500 m$^2$/g, greater than 600 m$^2$/g, greater than 700 m$^2$/g, greater than 800 m$^2$/g, greater than 1000 m$^2$/g, greater than 2000 m$^2$/g, greater than 3000 m$^2$/g, less than 4000 m$^2$/g. In certain preferred embodiments, the internal surface area of the aerogel is between 50 m$^2$/g and 800 m$^2$/g, Values of the internal surface area of the aerogel outside of these ranges may be possible.

In some embodiments, an aerogel has a bulk density proportional to its gel precursor's bulk density. For example, a gel whose aerogel has 95% porosity will have a density equivalent to the sum of 95% of the solvent density and 5% of the backbone density, while a gel whose aerogel has 99% porosity will have a density equivalent to the sum of 99% of the solvent density and 1% of the backbone density. In some embodiments, the aerogel material's bulk density may serve as a meaningful indicator if its gel precursor has a bulk density appropriate such that evaporative drying of the gel precursor may result in a monolithic aerogel. In some embodiments, the bulk density of a material may be determined by dimensional analysis. For example, bulk density may be measured by first carefully machining a specimen into a regular shape, e.g., a block or a rod. The length, width, and thickness (or length and diameter) may be measured using digital calipers (accuracy±0.001"). These measurements may then be used to calculate the specimen volume by, in the case of a block, multiplying length*width*height, or in the case of a disc, multiplying the length*the radius squared*pi. Mass may be measured using a digital analytical balance with a precision of 0.001 g. Bulk density may then be calculated as density=mass/volume.

In some embodiments, the bulk density of the aerogel may be between 0.05 g/cc and 0.1 g/cc, between 0.05 g/cc and 0.2 g/cc, between 0.05 g/cc and 0.3 g/cc, between 0.05 and 0.4 g/cc, between 0.05 g/cc and 0.5 g/cc, between 0.05 g/cc and 0.6 g/cc, between 0.05 g/cc and 0.7 g/cc, or greater than 0.7 g/cc. In certain embodiments, the density may be between 0.15 g/cc and 0.7 g/cc.

In some embodiments, an aerogel may exhibit any suitable skeletal density. Skeletal density refers to density of the solid component of the aerogel (which does not include the volume of the pores) as opposed to the bulk density of the aerogel (which includes the volume of its pores). Skeletal density may be measured by measuring the skeletal volume of specimen using a pycnometer, for example, a Micromeritics AccuPyc II 1340 Gas Pycnometer, employing helium as the working gas. Specimens may be dried under a flow of nitrogen or helium prior to measurement to remove moisture or other solvent from the pores of the aerogel. Skeletal volume measurements may be taken by averaging 100 measurements. Mass may be measured using a digital analytical balance with a precision of 0.001 g. Skeletal density may be calculated as skeletal density=mass/skeletal volume. In some embodiments, the skeletal density of the aerogel is between 1 g/cc and 1.1 g/cc, between 1 g/cc and 1.2 g/cc, between 1 g/cc and 1.3 g/cc, between 1 g/cc and 1.4 g/cc, between 1 g/cc and 1.5 g/cc, between 1 g/cc and 1.6 g/cc, between 1 g/cc and 1.7 g/cc, between 1 g/cc and 1.8 g/cc, between 1 g/cc and 1.9 g/cc, between 1.1 g/cc and 1.3 g/cc, between 1.1 g/cc and 1.4 g/cc, between 1.8 g/cc and 2.1 g/cc, between 1.8 g/cc and 2.2 g/cc, between 3 g/cc and 4 g/cc, or between 4 g/cc and 5 g/cc.

In some embodiments, an aerogel may exhibit any suitable thermal conductivity. In certain embodiments, the thermal conductivity of the resulting aerogel is less than 60 mW/m-K, less than 50 mW/m-K, less than 40 mW/m-K, less than 30 mW/m-K, less than 20 mW/m-K, between 15 and 20 mW/m-K, between 15 and 30 mW/m-K, or between 15 and 40 mW/m-K.

Thermal conductivity may also be measured using the method outlined in ASTM C518-17 "Standard Test Method for Steady-State Thermal Transmission Properties by Means of the Heat Flow Meter Apparatus" followed as written.

In some embodiments, the aerogel may be subjected to uniaxial loading while thermal conductivity is measured. In some embodiments, load may be applied to the cold side of the thermal conductivity measurement apparatus, in the direction of the hot side of the apparatus. In some embodiments, the load applied to the aerogel is less than 0.5 kPa, less than 1 kPa, less than 2 kPa, less than 5 kPa, less than 10 kPa, less than 20 kPa, less than 40 kPa, less than 60 kPa, less than 80 kPa, or less than 100 kPa. In some embodiments, the thermal conductivity measured under load is increased by less than 50%, less than 40%, less than 30%, less than 20%, less than 10%, less than 5%, or less than 1% relative to the thermal conductivity measured without applied load.

In some embodiments, an aerogel material has a compressive modulus (also known as Young's modulus, in some embodiments approximately equal to bulk modulus) and yield strength which may be determined using standard uniaxial compression testing. Compressive modulus and yield strength may be measured using the method outlined in ASTM D1621-10 "Standard Test Method for Compressive Properties of Rigid Cellular Plastics" followed as written with the exception that specimens are compressed with a crosshead displacement rate of 1.3 mm/s (as prescribed in ASTM D695) rather than 2.5 mm/s.

In some embodiments, the aerogel may exhibit any suitable compressive modulus. In certain embodiments, the compressive modulus of the aerogel is greater than 100 kPa, greater than 500 kPa, greater than 1 MPa, greater than 10 MPa, greater than 50 MPa, greater than 100 MPa; or less than 100 MPa, less than 50 MPa, less than 10 MPa, less than 1 MPa, less than 500 kPa, less than 100 kPa, or less than 50 kPa. Combinations of the above noted ranges, or values outside of these ranges, are possible for the compressive modulus of the aerogel.

In some embodiments, the aerogel may exhibit any suitable compressive yield strength. In certain embodiments, the compressive yield strength of the aerogel is greater than 40 kPa, greater than 100 kPa, greater than 500 kPa, greater than 1 MPa, greater than 5 MPa, greater than 10 MPa, greater than 50 MPa, greater than 100 MPa, greater than 500 MPa; or less than 500 MPa, less than 100 MPa, less than 50 MPa, less than 10 MPa, less than 5 MPa, less than 1 MPa, less than 500 kPa, less than 100 kPa, or less than 50 kPa. Combinations of the above noted ranges, or values outside of these ranges, are possible for the compressive yield strength of the aerogel.

In some embodiments, the aerogel may exhibit any suitable compressive ultimate strength. In certain embodiments, the compressive ultimate strength of the aerogel is greater than 1 MPa, greater than 10 MPa, greater than 50 MPa, greater than 100 MPa, greater than 500 MPa, greater than 1000 MPa; or less than 1000 MPa, less than 500 MPa, less than 100 MPa, less than 50 MPa, less than 10 MPa, less than 5 MPa, or less than 1 MPa. Combinations of the above noted ranges, or values outside of these ranges, are possible for the compressive ultimate strength of the aerogel.

In some embodiments, the aerogel may exhibit any suitable elasticity. In some embodiments, aerogel materials that exhibit high elasticity may be produced. Elasticity may refer to the degree of strain a material may undergo relative to its unstrained state without retaining permanent deformation, e.g., its elastic deformation regime. In some embodiments, materials that exhibit a high degree of elasticity, e.g., greater than 2%, greater than 5%, greater than 10%, greater than 20%, greater than 30%, greater than 40%, greater than 50%, greater than 60%, greater than 70%, greater than 80%, or more, may be produced. In some embodiments, materials that exhibit a high degree of elasticity and exhibit bulk densities less than 0.05 g/cc or greater than 0.3 g/cc may be produced.

In some embodiments, the aerogel may be able to exhibit any suitable minimum radius of curvature without fracture. The minimum radius of curvature refers to the radius of the smallest cylinder around which the material can be flexed such that is tangent to and in contact with the surface throughout the curved region. In some embodiments, the minimum radius of curvature is dependent on the thickness of the material. In some embodiments, the radius of curvature for an aerogel with thickness of 1 cm is less than 100 cm, less than 50 cm, less than 25 cm, less than 10 cm, less than 5 cm, less than 4 cm, less than 3 cm, less than 2 cm, less than 1 cm, less than 0.5 cm, or less than 0.1 cm. In some embodiments, the radius of curvature for an aerogel with thickness of 0.5 cm is less than 100 cm, less than 50 cm, less than 25 cm, less than 10 cm, less than 5 cm, less than 4 cm, less than 3 cm, less than 2 cm, less than 1 cm, less than 0.5 cm, or less than 0.1 cm.

In some embodiments, the aerogel may exhibit hydrophobicity. Hydrophobicity of the aerogel can be expressed in terms of the liquid water uptake, as determined by the methods as described herein. An aerogel material which has superior or improved liquid water uptake relative to a different aerogel material is understood to have a lower uptake of liquid water. In some embodiments, the liquid water uptake may be less than 100 wt %, less than 80 wt %, less than 70 wt %, less than 60 wt %, less than 50 wt %, less than 40 wt %, less than 30 wt %, less than 20 wt %, less than 10 wt %, less than 5 wt %, less than 4 wt %, less than 3 wt %, less than 2 wt %, less than 1 wt %, or less than 0.1 wt % relative to the weight of aerogel before contact with liquid water.

Hydrophobicity of the aerogel can be expressed in terms of the water vapor uptake, as determined by the methods described herein. In some embodiments, the water vapor uptake may be less than 100 wt %, less than 80 wt %, less than 70 wt %, less than 60 wt %, less than 50 wt %, less than 40 wt %, less than 30 wt %, less than 20 wt %, less than 10 wt %, less than 5 wt %, less than 4 wt %, less than 3 wt %, less than 2 wt %, less than 1 wt %, or less than 0.1 wt % relative to the weight of the aerogel before exposure to water vapor.

Hydrophobicity of the aerogel material can be expressed in terms of the water contact angle. The term water contact angle refers to the equilibrium contact angle of a drop of water in contact with a surface of the aerogel material. Water contact angle may be determined by methods including but not limited to ASTM D7490 or any suitable standard for measuring water contact angle. An aerogel that has superior or improved hydrophobicity relative to a different aerogel material may have a higher water contact angle. In some embodiments, the water contact angle may be greater than 80°, greater than 90°, greater than 100°, greater than 110°, greater than 120°, greater than 130°, greater than 140°, greater than 150°, greater than 160°, greater than 170°, or between 170° and 180°.

In some embodiments, the aerogel has a maximum operating temperature. The maximum operating temperature of an aerogel is the temperature at which the material undergoes deleterious chemical, mechanical, phase, and/or density changes that cause the aerogel to lose mechanical integrity and/or most of its porosity. In some embodiments, the maximum operating temperature is determined by placing the aerogel in an oven at a temperature under a suitable atmosphere, allowing the aerogel to equilibrate to the temperature of the oven, and observing if the aerogel breaks into multiple pieces or densifies to a degree that it loses most of its porosity due to heating. Suitable atmospheres for determining maximum operating temperature include those atmospheres under which the aerogel is expected to operate. Suitable atmospheres for determining maximum operating temperature may include air, nitrogen, argon, vacuum, or any other suitable atmosphere. In certain embodiments, the maximum operating temperature of an aerogel is 100° C., 150° C., 200° C., 250° C., 300° C., 350° C., or any suitable temperature.

In some embodiments the dimensions of the aerogel may change when the aerogel is heated. Articles such as aerogels exist in a three-dimensional space and have three orthogonal dimensions, length, width, and height. The term thickness may also refer to one of these dimensions, e.g., height. In certain embodiments, the dimensions of the aerogel after exposure to a temperature of 200° C. fall within 2%, within 5%, within 10%, within 20%, or within 30% of the dimensions of the aerogel prior to exposure to said temperature. In certain embodiments, the dimensions of the aerogel after exposure to a temperature of 250° C. fall within 2%, within 5%, within 10%, within 20%, or within 30% of the dimensions of the aerogel prior to exposure to said temperature. In certain embodiments, the dimensions of the aerogel after exposure to a temperature of 300° C. fall within 2%, within 5%, within 10%, within 20%, or within 30% of the dimensions of the aerogel prior to exposure to said temperature. In certain embodiments, the dimensions of the aerogel after exposure to a temperature of 350° C. fall within 2%, within 5%, within 10%, within 20%, or within 30% of the dimensions of the aerogel prior to exposure to said temperature.

U.S. Provisional Patent Application No. 62/914,298, filed Oct. 11, 2019, and entitled "Polymer-Aerogel/Fiber and Polymer-Aerogel/Textile Composites, and Related Systems and Methods," and U.S. Provisional Patent Application No. 62/914,354, filed Oct. 11, 2019, and entitled "Insulative Polyimide-Aerogel/Fiber Composites for Apparel and Methods of Production," are each incorporated herein by reference in its entirety for all purposes.

EXAMPLES

The following examples are intended to illustrate certain embodiments of the present invention, but do not exemplify the full scope of the invention.

Example 1: Synthesis of a Polyimide-Aerogel/PET-Fiber Composite Produced from Reaction of Amines and Anhydrides, Applied to the Fiber in a Batch Process, and Dried Via Supercritical $CO_2$ Extraction A 38 g spool of 150 denier multi-stranded PET (i.e., polyethylene terephthalate, i.e., polyester) fiber was prepared by running the fiber through a tension controller with a 6 g tension set point while the receiving spool of fiber was spun at a rate of 2000 RPM and traversed up and down linearly over a 3 inch range at a rate of 60 inches/minute for a total of 45 complete traverses. This spool was then wrapped in a single-layer of knit PET textile material.

A polyimide-aerogel-precursor solution was synthesized by reaction of an amine and an anhydride. 2.12 g 2,2'-dimethylbenzidine was dissolved in 266.01 g N-methyl-2-pyrrolidone. The mixture was stirred until 2,2'-dimethylbenzidine was fully dissolved (no particulates visible). After 10 minutes of stirring, 5.87 g of 3,3',4,4'-biphenyltetracarboxylic dianhydride was added to this mixture, and stirred for 10 minutes. After 10 minutes of stirring. 6.87 g of 4,4'-[1,3-phenylenebis(1-methyl-ethylidene)]bisaniline was added to this mixture, and stirred for 10 minutes. After 10 minutes of stirring, 5.87 g of 3,3',4,4'-biphenyltetracarboxylic dianhydride was added to this mixture, and stirred for 10 minutes. After 10 minutes of stirring. 1.80 g of 4,4'-oxydianiline was added to this mixture, and stirred for 10 minutes. After 10 minutes, a mixture of 0.45 g Desmodur N3300A and 26.60 g N-methyl-2-pyrrolidone was added to the first mixture, and stirred for 10 minutes. After 10 minutes of stirring 32.57 g acetic anhydride and 8.07 g triethylamine were added in rapid succession. The resulting sol was stirred for 2-5 minutes until well mixed, then poured into a container with the spool of fiber described previously, such that the spool of fiber was completely submerged. The container was then closed and allowed to sit for 20 minutes. After 20 minutes, the polyimide-aerogel-precursor-infiltrated spool of fiber was removed from the sol, placed in an air tight container, and left for 24 hours at room temperature, during which time gelation of the polyimide-aerogel precursor solution occurred on and/or within the spool of fiber, creating a polyimide-gel/fiber composite.

After 24 hours, the spool of polyimide-gel/fiber composite was removed from the container and rewound onto another spool without controlling the tension or speed of winding. This new spool of polyimide-gel/fiber composite was then placed in a solvent exchange bath, i.e., a sealed container partially filled with approximately 1500 mL acetone. It remained submerged in acetone in the container for a total of 72 hours, during which time the acetone was decanted and replaced with an equivalent volume of new acetone twice.

After solvent exchange was complete, the spool of fiber was transferred to a pressure vessel and submerged in excess acetone. The pressure vessel was then sealed and liquid $CO_2$ was introduced into the pressure vessel. The $CO_2$-acetone mixture was drained periodically while simultaneously supplying fresh liquid $CO_2$ until practically all of the acetone has been removed. Then, the pressure vessel was isolated from the $CO_2$ supply while still filled with liquid $CO_2$. The pressure vessel was heated until the internal temperature reached 54° C., during which time pressure increased. Pressure was regulated by actuation of a solenoid valve, and was not allowed to exceed 1400 psi. The $CO_2$ inside the vessel was at that time in the supercritical state, and was held at these conditions for three hours, at which point the autoclave was slowly vented isothermally, such that the supercritical fluid entered the gaseous state without forming a two-phase liquid-vapor system, until the pressure vessel returned to atmospheric pressure. The pressure vessel was then cooled to room temperature before the spool of polyimide-aerogel/fiber composite was retrieved.

The resulting polyimide-aerogel/fiber composite was a pale-yellow fiber with an approximate 19% aerogel mass loading, a thermal conductivity of 38 mW/m-K when laid up into a mat and measured by the Calibrated Hot Plate (CHP) method described herein, and a BET surface area of 80 $m^2$/g, Optical microscopic imaging showed the polyimide aerogel to both be over the external surfaces of the fiber and within the pores of the multi-stranded fiber. Optical microscopic imaging also showed parts of the composite fiber to have substantially continuous polyimide aerogel along the length of the composite fiber and other parts of the composite showed the polyimide aerogel to be discontinuous.

Example 2: Forming a Knit Textile from a Polyimide-Aerogel/PET-Fiber Composite Produced from Reaction of Amines and Anhydrides, Applied to the Fiber in a Batch Process, and Dried Via Supercritical $CO_2$ Extraction A spool of 150 denier multi-stranded PET was prepared as described in Example 1. A polyimide-aerogel precursor solution was synthesized as described in Example 1. And the spool of PET fiber followed the same processing steps as the spool described in Example 1 from exposing the spool to the polyimide-aerogel-precursor solution through drying.

The resulting polyimide-aerogel/fiber composite was then mechanically textured using an air jet texturing machine to break-up the strands of the composite fiber and remove excess aerogel material. The resulting textured polyimide-aerogel/fiber composite was then knit into a textile using a circular knitting machine.

The resulting textile comprising the textured polyimide-aerogel/fiber composite was a pale-yellow knit textile with a BET surface area of 11 $m^2$/g and a thermal conductivity of 48 mW/m-K when measured by the Calibrated Hot Plate (CHP) method described herein.

The resulting textile comprising the textured polyimide-aerogel/fiber composite was then laundered according to the AATCC LP1 standard for home laundering. The laundered textile comprising the textured polyimide-aerogel/fiber composite was a pale-yellow knit textile with a BET surface area of 8 $m^2$/g and a thermal conductivity of 49 mW/m-K when measured by the Calibrated Hot Plate (CHP) method described herein.

Example 3: Synthesis of a Polyimide-Aerogel/Nylon-Fiber Composite Produced from Reaction of Amines and Anhydrides, Applied to the Fiber in a Batch Process, and Dried Via Supercritical $CO_2$ Extraction A 47 g spool of 270 denier multi-stranded Nylon fiber was prepared by running the fiber through a commercially available tension controller with a 6 g tension set point while the receiving spool of fiber was spun at a rate of 2000 RPM and traversed up and down linearly over a 3 inch range at a rate of 60 inches/minute for a total of 45 complete traverses. This spool was then wrapped in a single-layer of knit PET textile material.

A polyimide-aerogel precursor solution was synthesized as described in Example 1. The spool of Nylon fiber followed the same processing steps as the spool of PET fiber described in Example 1 from exposing the spool to the polyimide-aerogel-precursor solution through drying.

The resulting polyimide-aerogel/fiber composite was a pale-yellow fiber with an approximate 12% aerogel mass loading and a thermal conductivity of 44 mW/m-K when laid up into a mat and measured by the Calibrated Hot Plate (CHP) method described herein.

Example 4: Synthesis of a Polyimide-Aerogel/PET-Fiber Composite Produced from Reaction of Amines and Anhydrides with Silica Aerogel Particle Additive, Applied to the Fiber in a Roll-to-Roll Process, and Dried Via Supercritical $CO_2$ Extraction A polyimide-aerogel-precursor solution was synthesized as described in Example 1 through the addition of acetic anhydride. Following the addition of acetic anhydride, 5.42 g of trimethylsilyl-functionalized silica aerogel particles comprising sodium ions, namely Cabot® MT1200 silica aerogel particles, were added to the mixture and stirred until the particles were homogenously dispersed (no particulate clumps visible). After dispersion of silica aerogel particles, 8.07 g triethylamine was added to the mixture and the resulting sol was stirred for 2-5 minutes until well mixed. The resulting sol was then poured into a container wherein a roller was partially submerged in the sol.

A 150 denier multi-stranded PET fiber was fed underneath the partially submerged roller onto a receiving spool, such that the fiber was exposed to, and infiltrated with, the sol in a roll-to-roll fashion without controlling the tension of the fiber or winding speed of the receiving spool. Approximately 10 g of the PET fiber passed through the sol and would onto the receiving spool. The receiving spool was then placed in an air tight container, and left for 24 hours at room temperature.

After 24 hours, the spool of polyimide-gel/fiber composite was removed from the container and rewound onto another spool without controlling the tension or speed of winding. This new spool of polyimide-gel/fiber composite was processed according to the procedures outlined in Example 1 through drying.

The resulting polyimide-aerogel/fiber composite was a pale-yellow fiber with an approximate 18% aerogel mass loading, BET surface area of 59 $m^2/g$, and a thermal conductivity of 34 mW/m-K when laid up into a mat and measured by the Calibrated Hot Plate (CHP) method described herein.

The resulting polyimide-aerogel/fiber composite was then laundered according to the AATCC LP1 standard for home laundering.

The laundered polyimide-aerogel/fiber composite was a pale-yellow fiber with a BET surface area of 53 $m^2/g$, and a thermal conductivity of 36 mW/m-K when laid up into a mat and measured by the Calibrated Hot Plate (CHP) method described herein.

Example 5: Synthesis of a Polyurea-Aerogel/Fiber Composite Produced from Reaction of Isocyanate with In-Situ-Formed Amines, Applied to the Fiber in a Batch Process, and Dried Via Atmospheric Sublimation of $CO_2$ A 40 g spool of 150 denier single-stranded PET fiber is prepared by running the fiber through a tension controller with a 6 g tension set point while the receiving spool of fiber is spun at a rate of 2000 RPM and traversed up and down linearly over a 3 inch range at a rate of 60 inches/minute for a total of 45 complete traverses. This spool is then wrapped in a single-layer of knit PET textile material.

A polyurea aerogel precursor is synthesized from an isocyanate. 158.12 g Desmodur N3300 (isocyanurate trimer of hexamethylene diisocyanate) is dissolved in 592.3 g acetone and stirred until homogenous (approximate 15 minutes). To this mixture 11.14 g deionized water is added, and stirred for 5 minutes. Finally, 0.762 g triethylamine is added to the mixture, and stirred an additional 5 minutes. The resulting sol is then poured into a container with the spool of fiber as described previously, such that the spool of fiber is completely submerged. The container is then closed and allowed to sit for 30 minutes in a controlled-temperature environment which is set to 15° C. After 30 minutes, the polyurea-aerogel-precursor-infiltrated spool of fiber is removed from the sol, placed in an air tight container, and left for 24 hours in a controlled-temperature environment which is set to 15° C., during which time gelation of the polyurea-aerogel precursor solution occurred on and/or within the spool of fiber, creating a polyurea-gel/fiber composite.

After 24 hours, the spool of polyurea-gel/fiber composite is removed from the container and rewound onto another spool without controlling the tension or speed of winding. This new spool of polyurea-gel/fiber composite is then placed in a solvent exchange bath. The volume of the solvent exchange bath is approximately 5 times that of the gel, and is ACS Reagent Grade acetone. The acetone is replaced two times with clean acetone (once every 24 hours).

After solvent exchange is complete the spool of polyurea-gel/fiber composite is transferred to a pressure vessel and submerged in excess acetone. The pressure vessel is then sealed and liquid $CO_2$ is introduced into the pressure vessel. The $CO_2$-acetone mixture is drained from the vessel periodically while simultaneously supplying fresh liquid $CO_2$ until practically all of the acetone is removed. Then, the pressure vessel is isolated from the $CO_2$ supply while still filled with liquid $CO_2$. The pressure vessel is then rapidly drained, dropping the pressure to ambient over the course of about 30 seconds. In this process, the excess $CO_2$ is rapidly drained from the vessel, and the liquid $CO_2$ within the spool of polyurea-gel/fiber composite freezes, forming solid $CO_2$ within the pores of the material. The vessel is then slowly heated at ambient pressure, allowing the frozen $CO_2$ to sublimate from the frozen polyurea-gel/fiber composite, until the internal temperature of the vessel reaches 20° C. The spool of polyurea-aerogel/fiber composite is then retrieved.

The resulting polyurea-aerogel/fiber composite is a white fiber with an approximate 15% aerogel mass loading and an approximate thermal conductivity of 35 mW/m-K when laid up into a mat and measured by the Calibrated Hot Plate (CHP) method described herein.

Example 6: Synthesis of a Polyurethane-Aerogel/Fiber Composite Produced from Reaction of and Isocyanate with a Polyol, Applied to the Fiber in a Batch Process, and Dried Via Atmospheric Sublimation of $CO_2$ A spool of 150 denier multi-stranded PET is prepared as described in Example 1.

A polyurethane gel is synthesized from an isocyanate and a polyol. 43.4 g Desmodur RE (triisocyanato aminophenylmethane), a solution of 80.6 wt % in ethyl acetate, is mixed with 513.78 g acetone and stirred until well mixed (approximately 5 minutes). To this mixture 29.88 g 1,1,1-Tris(4-hydroxyphenyl)ethane is added, and stirred for 5 minutes. Finally, 1.03 g dibutyltin dilaurate is added, and the mixture is stirred an addition 5 minutes. The resulting sol is then poured into a container with the spool of fiber as described previously, such that the spool of fiber is completely submerged. The container is then closed and allowed to sit for 30 minutes in a controlled-temperature environment which is set to 15° C. After 30 minutes, the polyurethane-aerogel-precursor-infiltrated spool of fiber is removed from the sol, placed in an air tight container containing acetone vapor, and left for 24 hours in a controlled-temperature environment which is set to 15° C., during which time gelation of the polyurethane-aerogel precursor solution occurred on and/or within the spool of fiber, creating a polyurethane-gel/fiber composite.

The polyurethane-gel/fiber composite is then solvent exchanged and dried as described in Example 5.

The resulting polyurethane-aerogel/fiber composite is a light pink/purple fiber with an approximate 15% aerogel mass loading and an approximate thermal conductivity of 40 mW/m-K when laid up into a mat and measured by the Calibrated Hot Plate (CHP) method described herein.

Example 7: Synthesis of a Polyamide-Aerogel/Fiber Composite Produced from Reaction of and Isocyanate with a Polyol, Applied to the Fiber in a Batch Process, and Dried Via Atmospheric Sublimation of $CO_2$ A spool of 150 denier multi-stranded PET is prepared as described in Example 1.

A polyamide gel is synthesized by reaction of an amine and an acyl chloride. The synthesis takes place in an inert nitrogen atmosphere. 2.02 g anhydrous calcium chloride is dissolved in 83.05 g N-methyl-2-pyrrolidone and stirred until fully dissolved (no particulates visible). 2.35 g p-phenylenediamine is added to the mixture and stirred until fully dissolved (no particulates visible). The mixture is cooled to 5° C. in an ice water bath. After the mixture reaches the target temperature, 4.25 g terephthaloyl chloride is added. The mixture is then stirred for 2 minutes (remaining in the ice bath for continued cooling). The resulting sol is then poured into a container with the spool of fiber as described previously, such that the spool of fiber is completely submerged. The container is then closed and allowed to sit for 30 minutes. After 30 minutes, the polyamide-aerogel-precursor-infiltrated spool of fiber is removed from the sol, placed in an air tight container, and left for 24 hours at room temperature, during which time gelation of the polyurethane-aerogel precursor solution occurred on and/or within the spool of fiber, creating a polyamide-gel/fiber composite.

The polyamide-gel/fiber composite is then solvent exchanged and dried as described in Example 5.

The resulting polyamide-aerogel/fiber composite is a light gray fiber with an approximate 15% aerogel mass loading and an approximate thermal conductivity of 55 mW/m-K when laid up into a mat and measured by the Calibrated Hot Plate (CHP) method described herein.

Example 8: Synthesis of a Polymer Crosslinked Oxide-Aerogel/Fiber Composite Produced From Reaction of and Isocyanate with a Polyol, Applied to the Fiber in a Batch Process, and Dried Via Atmospheric Sublimation of $CO_2$ A spool of 150 denier multi-stranded PET is prepared as described in Example 1.

A gel is made by reinforcing the oxide backbone of a silica gel with a conformal polyisocyanate network. A solution referred to as part A is made by mixing 36.23 g acetonitrile, 7.77 g tetramethoxysilane, and 2.38 g (3-aminopropyl)triethoxysilane. A solution referred to as part B is made by mixing 36.23 g acetonitrile and 16.15 g deionized water. Both solutions are then cooled by placing their mixing beakers in an acetone-dry ice bath until the temperature equilibrates. Part B (which at this point is a slush) is then added to Part A, and the combined mixture is stirred aggressively. After the two parts are well mixed (<1 minute of aggressive stirring) the sol is then poured into a container with the spool of fiber as described previously, such that the spool of fiber is completely submerged. The container is then closed and allowed to sit for 2 hours in this environment. After two hours, excess gel is removed from the outside of the spool of fiber and the silica-gel/fiber composite is transferred to a bath of acetonitrile (approximately 10× the gel volume). The spool remains in acetonitrile for 72 hours, during which time the acetonitrile is replaced with clean acetonitrile two times (at 24 and 48 hours). After 72 hours the spool is transferred to a second bath containing a well-mixed solution of 314.4 g acetonitrile and 80.57 g Desmodur N3200 (biuret of hexamethylene diisocyanate), in which it soaks for 24 hours. The spool is then subjected to another three solvent exchanges into acetonitrile, identical to the first three. The gel is dried using the same process as outline in Example 5 with the exception that the solvent within the gels and in which the gels are initially submerged is acetonitrile, not acetone, and therefore the mixture drained from the pressure vessel is $CO_2$-acetonitrile rather than $CO_2$-acetone.

The resulting polymer-crosslinked-silica-aerogel/fiber composite is a white fiber with an approximate 15% aerogel mass loading and an approximate thermal conductivity of 35 mW/m-K when laid up into a mat and measured by the Calibrated Hot Plate (CHP) method described herein.

Example 9: Synthesis of a Polyimide-Aerogel/PET-Fiber Composite Produced from Reaction of Amines and Anhydrides, Applied to the Fiber in a Batch Process, and Dried in a Batch Process Via Atmospheric Sublimation of Tert-Butanol A polyimide-gel/fiber composite was prepared as described in Example 1. The spool of polyimide-gel/fiber composite was then placed in a solvent exchange bath, i.e., a sealed container partially filled with approximately 1500 mL tert-butanol. The spool remained submerged in tert-butanol in the container for 120 hours, during which time the tert-butanol was decanted and replaced with an equivalent volume of new tert-butanol four times.

After solvent exchange was completed, the spool of fiber was transferred to a cold chamber, and the tert-butanol in the polyimide-gel/fiber composite was allowed to freeze. After it was frozen, cold air was flowed over the composite for 14 days, until the tert-butanol had completely sublimated, at which point the polyimide-aerogel/fiber composite was removed.

The resulting polyimide-aerogel/fiber composite was a pale-yellow fiber with an approximate 19% aerogel mass loading and an approximate thermal conductivity of 38 mW/m-K when laid up into a mat and measured by the Calibrated Hot Plate (CHP) method described herein.

Example 10: Synthesis of a Polyimide-Aerogel/PET-Fiber Composite Produced from Reaction of Amines and Anhydrides, Applied to the Fiber in a Batch Process, and Dried in a Roll-to-Roll Process Via Atmospheric Sublimation of Tert-Butanol A polyimide-gel/fiber composite is prepared as described in Example 9, including the solvent exchange into tert-butanol. The polyimide-gel/fiber composite spool of fiber is then transferred to a cold chamber. Inside the cold chamber, the fiber is unwound from the spool onto a roller. Between the spool and the roller, the fiber is impinged with a jet of cold air to freeze the tert-butanol in the polyimide-gel/fiber composite. The fiber moves through a series of rollers within the cold chamber, until the tert-butanol has sublimated completely from the fiber, at which time it is then rewound onto another spool. This process runs continuously until the sending spool has been exhausted, and the tert-butanol has been sublimated from the entire length of the fiber, resulting in a dried spool of polyimide-aerogel/fiber composite. The polyimide-aerogel/fiber composite spool is then removed.

The resulting polyimide-aerogel/fiber composite is a pale-yellow fiber with an approximate 19% aerogel mass loading and an approximate thermal conductivity of 38 mW/m-K when laid up into a mat and measured by the Calibrated Hot Plate (CHP) method described herein.

Example 11: Synthesis of a Polyimide-Aerogel/FRPET-Fiber Composite Produced from Reaction of Amines and Anhydrides, Applied to the Fiber in a Two-Step Process, and Dried in a Continuous Process Via Atmospheric Sublimation of Tert-Butanol A polyimide-aerogel-precursor solution is synthesized by reaction of an amine and an anhydride and applied to a 300 denier multi-stranded flame-retardant PET (FRPET) in a two-step process. 2.12 g 2,2'-dimethylbenzidine is dissolved in 266.01 g N-methyl-2-pyrrolidone. The mixture is stirred until 2,2'-dimethylbenzidine is fully dissolved (no particulates visible). After 10 minutes of stirring. 5.87 g of 3,3',4,4'-biphenyltetracarboxylic dianhydride is added to this mixture and stirred for 10 minutes. After 10 minutes of stirring. 6.87 g of 4,4'-[1,3-phenylenebis(1-methyl-ethylidene)] bisaniline is added to this mixture, and stirred for 10 minutes. After 10 minutes of stirring. 5.87 g of 3,3',4,4'-biphenyltetracarboxylic dianhydride is added to this mixture and stirred for 10 minutes. After 10 minutes of stirring. 1.80 g of 4,4'-oxydianiline is added to this mixture and stirred for 10 minutes. After 10 minutes, a mixture of 0.45 g Desmodur N3300A and 26.60 g N-methyl-2-pyrrolidone is added to the first mixture and stirred for 10 minutes. After 10 minutes of stirring 32.57 g acetic anhydride is added to this mixture and stirred for approximately 1 minute. Following the addition of acetic anhydride, 5.42 g of trimethylsilyl-functionalized silica aerogel particles comprising sodium ions, namely Cabot® MT1200 silica aerogel particles, is added to the mixture and stirred until the particles are homogenously dispersed (no particulate clumps visible). This mixture is the Part A polyimide-aerogel-precursor solution. A Part B polyimide-precursor solution is 8.07 g of triethylamine. The part A and part B solutions are then poured into separate containers wherein rollers are partially submerged in the solutions.

A single strand of 300 denier fire-resistant PET is controlled to a tension of 6 g using a tension controller is then fed underneath the partially submerged roller in the Part A solution, over a roller not in any solution, and then underneath the partially submerged roller in the Part B solution. After passing through both solutions, Part A and Part B solutions in the fiber react and gel to form a polyimide-gel/fiber composite. The polyimide-gel/fiber composite is then directly run through a 10 meter-long bath of tert-butanol at a speed of 10 m/min to allow complete solvent exchange of the pore fluid. The polyimide-gel/fiber composite is then directly run into to a cold chamber where the fiber is impinged with a jet of cold air to freeze the tert-butanol in the polyimide-gel/fiber composite. The fiber then moves through and around a series of rollers within the cold chamber, for a total residence distance of approximately 90 meters. This distance is adequate to completely sublimate the tert-butanol from the fiber, at which time it exits the cold chamber and is then rewound onto another spool. This process runs continuously until the sending spool has been exhausted, and the tert-butanol has been sublimated from the entire length of the fiber, resulting in a dried spool of polyimide-aerogel/fiber composite.

The resulting polyimide-aerogel/fiber composite is a pale-yellow fiber with an approximate 19% aerogel mass loading and an approximate thermal conductivity of 38 mW/m-K when laid up into a mat and measured by the Calibrated Hot Plate (CHP) method described herein. The resulting polyimide-aerogel/fiber composite after being submerged under water at 25° C. for 24 h, the composite uptakes a mass of water within its outer boundaries of approximately 19% of the dry mass of the composite prior to submerging in the water.

The resulting polyimide-aerogel/fiber composite is then mechanically textured using an air jet texturing machine to break-up the strands of the composite fiber and remove excess aerogel material. The resulting textured polyimide-aerogel/fiber composite is then knit into a textile using a circular knitting machine.

The resulting textile comprising the textured polyimide-aerogel/fiber composite is a pale-yellow knit textile that passes the FAR 25.853 standard for flammability testing.

Example 12: Synthesis of a Polyimide-aerogel/PET-textile Composite Produced from Reaction of Amines and Anhydrides, Applied to the Textile in a Batch Process, and Dried Via Supercritical $CO_2$ Extraction A 4 inch-wide jersey knit textile comprising 150 denier multi-stranded PET fiber was wrapped around a 6 inch-long.

2 inch-diameter spool such that a total of 20 g of textile was wound on the spool. A polyimide-aerogel precursor solution was synthesized as described in Example 1. The polyimide-aerogel precursor solution was then poured into a container with the spool of textile described previously, such that the spool of textile was completely submerged. The container was then closed and allowed to sit for 20 minutes. After 20 minutes, the polyimide-aerogel-precursor-infiltrated spool of textile was removed from the sol, placed in an air tight container, and left for 24 hours at room temperature, during which time gelation of the polyimide-aerogel precursor solution occurred on and/or within the spool of textile, creating a polyimide-gel/textile composite.

After 24 hours, the spool of polyimide-gel/textile composite was removed from the container and rewound onto another spool. This spool of polyimide-gel/textile was then processed through the solvent exchange and drying processes to become polyimide-aerogel/textile composite in the same manner as described in Example 1 for the polyimide-aerogel/fiber composite.

The resulting polyimide-aerogel/textile composite was a pale-yellow textile with an approximate 18% aerogel mass loading, a BET surface area of 30 $m^2/g$, and an approximate thermal conductivity of 41 mW/m-K when measured by the Calibrated Hot Plate (CHP) method described herein. Optical microscopic imaging showed the polyimide aerogel to both be over the external surfaces of the textile and within the pores of the textile. Optical microscopic imaging also showed parts of the composite textile to have substantially continuous polyimide aerogel over the surface of a cross-section of the composite textile and other parts of the composite showed the polyimide aerogel to be discontinuous.

Example 13: Synthesis of a
Polyimide-Aerogel/Nylon-Textile Composite
Produced from Reaction of Amines and
Anhydrides, Applied to the Fiber in a Batch
Process, and Dried Via Supercritical $CO_2$
Extraction A 4 inch-wide jersey knit textile comprising 270 denier Nylon fiber is wrapped around a 6 inch-long. 2 inch-diameter spool such that a total of 20 g of textile is wound on the spool. This spool of textile then follows the same processing steps as the spool of PET textile described in Example 12 from exposing the spool to the polyimide-aerogel-precursor solution through drying.

The resulting polyimide-aerogel/textile composite is a pale-yellow textile with an approximate 18% aerogel mass loading and an approximate thermal conductivity of 41 mW/m-K when measured by the Calibrated Hot Plate (CHP) method described herein. Optical microscopic imaging shows the polyimide aerogel to substantially conformally coat the textile.

Example 14: Synthesis of a
Polyimide-aerogel/PET-textile Composite Produced
from Reaction of Amines and Anhydrides with
Silica Aerogel Particle Additive, with Continuous
Preparation of Polymer-Aerogel Precursor Solution
Applied to the Textile in a Roll-to-Roll Process,
and Dried Via Supercritical $CO_2$ Extraction A spool of PET textile is prepared as described in Example 12. A polyimide-aerogel precursor solution comprising silica aerogel particles is prepared as described in Example 4, excluding the addition of the trimethylamine. This Part A solution is then mixed with a Part B solution of 8.07 g of trimethylamine in an on-demand fashion using a commercially available static mixing device, to create a polyimide-aerogel precursor solution. This solution is combined and dispensed at a constant rate into a trough over a period of time, such that the rate of dispensing matches the rate at which the textile removes the solution from said trough. The textile is fed underneath a partially submerged roller in the trough onto a receiving spool at a rate of 2 m/min, such that the textile is exposed to, and infiltrated with, the solution in a roll-to-roll fashion. The receiving spool of textile infiltrated with polyimide-aerogel precursor solution then follows the same processing steps as the spool of textile described in Example 12 from gelation of the spool through drying.

The resulting polyimide-aerogel/textile composite is a pale-yellow textile with an approximate 18% aerogel mass loading, an approximate BET surface area of 60 $m^2/g$, an approximate thermal conductivity of 41 mW/m-K when measured by the Calibrated Hot Plate (CHP) method described herein, and an approximate thickness of 0.03 inches.

The resulting polyimide-aerogel/textile composite is then laundered according to the AATCC LP1 standard for home laundering.

The resulting laundered polyimide-aerogel/textile composite is a pale-yellow textile with an approximate BET surface area of 50 $m^2/g$ and an approximate thermal conductivity of 45 mW/m-K when measured by the Calibrated Hot Plate (CHP) method described herein.

Example 15: Synthesis of a
Polyimide-Aerogel/PET-Textile Composite
Produced from Reaction of Amines and
Anhydrides, Applied to the Fiber in a Batch
Process, and Dried in a Batch Process Via
Atmospheric Sublimation of Tert-Butanol A spool of polyimide-gel/PET-textile composite is prepared as described in Example 12. The spool then follows the same processing steps as the spool of fiber described in Example 9 from solvent exchange through drying.

The resulting polyimide-aerogel/textile composite is a pale-yellow textile with an approximate 18% aerogel mass loading and an approximate thermal conductivity of 41 mW/m-K when measured by the Calibrated Hot Plate (CHP) method described herein.

Example 16: Synthesis of a
Polyimide-Aerogel/PET-Fiber Composite Produced
from Reaction of Amines and Anhydrides, Applied
to the Fiber in a Batch Process, and Dried in a
Roll-to-Roll Process Via Atmospheric Sublimation
of Tert-Butanol A spool of polyimide-gel/PET-textile composite is prepared and solvent exchanged as described in Example 9. The spool of textile is then dried as described in Example 10.

The resulting polyimide-aerogel/textile composite is a pale-yellow textile with an approximate 18% aerogel mass loading and an approximate thermal conductivity of 41 mW/m-K when measured by the Calibrated Hot Plate (CHP) method described herein.

Example 17: Synthesis of a Polyimide-Aerogel/FRPET-Cotton-Blend-Textile Composite Produced from Reaction of Amines and Anhydrides, Applied to the Fiber in a Two-Step Process, And Dried in a Continuous Process Via Atmospheric Sublimation of Tert-Butanol A polyimide-aerogel-precursor solution is synthesized by reaction of an amine and an anhydride and applied to a blended woven textile comprising both flame-retardant PET (FRPET) and cotton fibers in a two-step process. 2.12 g 2,2'-dimethylbenzidine is dissolved in 266.01 g N-methyl-2-pyrrolidone. The mixture is stirred until 2,2'-dimethylbenzidine is fully dissolved (no particulates visible). After 10 minutes of stirring. 5.87 g of 3,3',4,4'-biphenyltetracarboxylic dianhydride is added to this mixture and stirred for 10 minutes. After 10 minutes of stirring. 6.87 g of 4,4'-[1,3-phenylenebis(1-methyl-ethylidene)]bisaniline is added to this mixture, and stirred for 10 minutes. After 10 minutes of stirring. 5.87 g of 3,3',4,4'-biphenyltetracarboxylic dianhydride is added to this mixture and stirred for 10 minutes. After 10 minutes of stirring, 1.80 g of 4,4'-oxydianiline is added to this mixture and stirred for 10 minutes. After 10 minutes, a mixture of 0.45 g Desmodur N3300A and 26.60 g N-methyl-2-pyrrolidone is added to the first mixture and stirred for 10 minutes. After 10 minutes of stirring 32.57 g acetic anhydride is added to this mixture and stirred for approximately 1 minute. Following the addition of acetic anhydride, 5.42 g of trimethylsilyl-functionalized silica aerogel particles comprising sodium ions, namely Cabot® MT1200 silica aerogel particles, is added to the mixture and stirred until the particles are homogenously dispersed (no particulate clumps visible). This mixture is the Part A polyimide-aerogel-precursor solution. A Part B polyimide-precursor solution is 8.07 g of triethylamine. The part A and part B solutions are then poured into separate containers wherein rollers are partially submerged in the solutions.

The FRPET-Cotton blend textile is fed underneath the partially submerged roller in the Part A solution, over a roller not in any solution, and then underneath the partially submerged roller in the Part B solution. After passing through both solutions, Part A and Part B solutions in the textile react and gel to form a polyimide-gel/textile composite. The polyimide-gel/textile composite is then directly run through a 10 meter-long bath of tert-butanol at a speed of 10 m/min to allow complete solvent exchange of the pore fluid. The polyimide-gel/textile composite is then directly run into to a cold chamber where the textile is impinged with a jet of cold air to freeze the tert-butanol in the polyimide-gel/textile composite. The textile then moves through and around a series of rollers within the cold chamber, for a total residence distance of approximately 90 meters. This distance is adequate to completely sublimate the tert-butanol from the textile, at which time it exits the cold chamber and is then rewound onto another carrier. This process runs continuously until the sending carrier has been exhausted, and the tert-butanol has been sublimated from the entire length of the textile, resulting in a dried roll of polyimide-aerogel/textile composite.

The resulting polyimide-aerogel/textile composite is them mechanically finished by running the composite over and through a series of textured rollers to remove excess polyimide aerogel material.

The resulting polyimide-aerogel/textile composite is a pale-yellow textile with an approximate 19% aerogel mass loading and an approximate thermal conductivity of 34 mW/m-K when measured by the Calibrated Hot Plate (CHP) method described herein. The resulting polyimide-aerogel/textile composite after being submerged under water at 25° C. for 24 h, the composite uptakes a mass of water within its outer boundaries of approximately 19% of the dry mass of the composite prior to submerging in the water. The resulting polyimide-aerogel/textile composite passes the FAR 25.853 standard for flammability testing.

Example 18: Synthesis of a Polyurea-Aerogel/Textile Composite Produced from Reaction of Isocyanate with In-Situ-Formed Amines, Applied to the Textile in a Batch Process, and Dried Via Supercritical $CO_2$ Extraction A spool of PET textile is prepared as described in Example 12.

A polyurea aerogel precursor solution is prepared as described in Example 5. The resulting solution is then poured into a container wherein a roller is partially submerged in the sol. The textile is fed underneath the partially submerged roller onto a receiving spool, such that the textile is exposed to, and infiltrated with, the solution in a roll-to-roll fashion. The receiving spool of textile infiltrated with polyurea-aerogel precursor solution then follows the same processing steps as the spool of textile described in Example 12 from gelation of the spool through drying.

The resulting polyurea-aerogel/textile composite is a white textile with an approximate 18% aerogel mass loading and an approximate thermal conductivity of 30 mW/m-K when measured by the Calibrated Hot Plate (CHP) method described herein.

The resulting polyurea-aerogel/textile composite is able to be de-knit using commercial de-knitting equipment such that a polyurea-aerogel/fiber composite is produced.

Example 19: Synthesis of a Polyurethane-Aerogel/Textile Composite Produced from Reaction of and Isocyanate with a Polyol, Applied to the Textile in a Batch Process, and Dried Via Supercritical $CO_2$ Extraction A spool of PET textile is prepared as described in Example 12 with the exception that a non-woven PET textile is used instead of a jersey-knit.

A polyurethane aerogel precursor solution is prepared as described in Example 6. The resulting solution is then poured into a container wherein a roller is partially submerged in the sol. The textile is fed underneath the partially submerged roller onto a receiving spool, such that the textile is exposed to, and infiltrated with, the solution in a roll-to-roll fashion. The receiving spool of textile infiltrated with polyurea-aerogel precursor solution then follows the same processing steps as the spool of textile described in Example 12 from gelation of the spool through drying.

The resulting polyurethane-aerogel/textile composite is a light pink/purple textile with an approximate 18% aerogel mass loading and an approximate thermal conductivity of 38 mW/m-K when measured by the Calibrated Hot Plate (CHP) method described herein.

Example 20: Synthesis of a Polyamide-Aerogel/Textile Composite Produced from Reaction of and Isocyanate with a Polyol, Applied to the Textile in a Batch Process, and Dried Via Supercritical $CO_2$ Extraction A spool of PET textile is prepared as described in Example 12.

A polyamide aerogel precursor solution is prepared as described in Example 6. The resulting solution is then poured into a container wherein a roller is partially submerged in the sol. The textile is fed underneath the partially submerged roller onto a receiving spool, such that the textile is exposed to, and infiltrated with, the solution in a roll-to-roll fashion. The receiving spool of textile infiltrated with polyurea-aerogel precursor solution then follows the same processing steps as the spool of textile described in Example 12 from gelation of the spool through drying.

The resulting polyamide-aerogel/textile composite is a light gray textile with an approximate 18% aerogel mass loading and an approximate thermal conductivity of 50 mW/m-K when measured by the Calibrated Hot Plate (CHP) method described herein.

Example 21: Synthesis of a Polymer Crosslinked Oxide-Aerogel/Textile Composite Produced from Reaction of and Isocyanate with a Polyol, Applied to the Textile in a Batch Process, and Dried Via Supercritical $CO_2$ Extraction A spool of PET textile is prepared as described in Example 12

A gel is made by reinforcing the oxide backbone of a silica gel with a conformal polyisocyanate network. A solution referred to as part A is made by mixing 36.23 g acetonitrile. 7.77 g tetramethoxysilane, and 2.38 g (3-aminopropyl)triethoxysilane. A solution referred to as part B is made by mixing 36.23 g acetonitrile and 16.15 g deionized water. Both solutions are then cooled by placing their mixing beakers in an acetone-dry ice bath until the temperature equilibrates. Part B (which at this point is a slush) is then added to Part A, and the combined mixture is stirred aggressively. After the two parts are well mixed (<1 minute of aggressive stirring) the sol is then poured into a container with the spool of textile as described previously, such that the spool of textile is completely submerged. The container is then closed and allowed to sit for 2 hours in this environment. After two hours, excess gel is removed from the outside of the spool of textile and the silica-gel/textile composite is transferred to a bath of acetonitrile (approximately 10× the gel volume). The spool remains in acetonitrile for 72 hours, during which time the acetonitrile is replaced with clean acetonitrile two times (at 24 and 48 hours). After 72 hours the spool is transferred to a second bath containing a well-mixed solution of 314.4 g acetonitrile and 80.57 g Desmodur N3200 (biuret of hexamethylene diisocyanate), in which it soaks for 24 hours. The spool is then subjected to another three solvent exchanges into acetonitrile, identical to the first three. The gel is dried using the same process as outline in Example 12 with the exception that the solvent within the gels and in which the gels are initially submerged is acetonitrile, not acetone.

The resulting polymer-crosslinked-silica-aerogel/textile composite is a white textile with an approximate 18% aerogel mass loading and an approximate thermal conductivity of 30 mW/m-K when measured by the Calibrated Hot Plate (CHP) method described herein.

Example 22: Synthesis of a Polyimide-Aerogel/PET-Textile Composite Comprising a Garment Produced from Reaction of Amines and Anhydrides, Applied to the Textile in a Batch Process, and Dried Via Supercritical $CO_2$ Extraction A polyimide-aerogel precursor solution was synthesized as described in Example 1. The solution was then poured over a 40 g section of textile comprising a section of a garment, in this case PET knit shirt sleeve. The garment, now infiltrated with polyimide-aerogel precursor solution then follows the same processing steps as the spool of textile described in Example 12 for gelation through drying.

The resulting polyimide-aerogel/textile composite is a pale-yellow textile with an approximate 18% aerogel mass loading, an approximate BET surface area of 60 $m^2$/g, an approximate thermal conductivity of 41 mW/m-K when measured by the Calibrated Hot Plate (CHP) method described herein.

Example 23: Synthesis of a Polyimide-Aerogel/PET-Textile Composite Comprising a Garment Produced from Reaction of Amines and Anhydrides, Applied to the Textile in a Two-Part Liquid and Vapor Process, and Dried Via Supercritical $CO_2$ Extraction A Part A polyimide-aerogel precursor solution is prepared as described in Example 17. A spool of PET fiber is likewise prepared as described in Example 17. The fiber is then moved through the Part A solution as described in Example 17. After this, the fiber is then moved through a chamber a saturated vapor atmosphere of triethylamine at 50° C. After this, the fiber is wound onto a receiving spool. This spool of fiber, infiltrated with polyimide-aerogel precursor solution, is process from gelation through drying to produce a polyimide-aerogel-fiber composite. The resulting polyimide-aerogel/fiber composite is a pale-yellow fiber with an approximate 19% aerogel mass loading and an approximate thermal conductivity of 38 mW/m-K when laid up into a mat and measured by the Calibrated Hot Plate (CHP) method described herein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in some embodiments, to A without B (optionally including elements other than B); in some embodiments, to B without A (optionally including elements other than A); in some embodiments, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in some embodiments, to at least one, optionally including more than one, A, with no B present (and optionally including elements other than B); in certain embodiments, to at least one, optionally including more than one, B, with no A present (and optionally including elements other than A); in certain embodiments, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A composite fiber, comprising:
   a fiber; and
   a polymer aerogel material conformally coating an external surface of the fiber,
   wherein the composite fiber has an average cross-sectional diameter of at least 5 microns and less than or equal to 3 millimeters, and
   wherein the composite fiber has an aspect ratio of at least 100 to 1.

2. The composite fiber of claim 1, wherein the fiber is a multi-stranded fiber.

3. The composite fiber of claim 1, wherein the fiber is a single-stranded fiber.

4. The composite fiber of claim 1, wherein the fiber comprises a polyester, a polyamide, and/or cotton.

5. The composite fiber of claim 1, wherein the polymer aerogel material comprises polyimide.

6. The composite fiber of claim 1, wherein the mass fraction of polymer aerogel in the composite is greater than 1%.

7. The composite fiber of claim 1, wherein the composite fiber is incorporated into a textile.

8. The composite fiber of claim 1, wherein the composite can be woven and/or knit into a textile.

9. The composite fiber of claim 1, wherein the polymer aerogel material is substantially continuous along a length of the composite fiber.

10. The composite fiber of claim 1, wherein the composite exhibits a thermal conductivity of less than 80 mW/m-K when the composite is laid up into a mat and measured by a Calibrated Hot Plate (CHP) method.

11. The composite fiber of claim 1, wherein the composite exhibits a Brunauer-Emmett-Teller (BET) surface area of greater than 10 $m^2/g$.

12. The composite fiber of claim 1, wherein the composite may be laundered according to the AATCC LP1 standard for home laundering, and the laundered material exhibits a BET surface area of at least 10 $m^2/g$.

13. The composite fiber of claim 1, wherein the mass fraction of polymer aerogel in the composite fiber is greater than 10%.

14. A textile comprising the composite fiber of claim 1, wherein the textile passes the FAR 25.853 flammability testing.

15. A textile comprising the composite fiber of claim 1, wherein the textile passes at least one of the following flammability tests: ASTM D6413, 16 CFR 1615, CPAI-84, ASTM D1230.

* * * * *